United States Patent [19]

Shibayama et al.

[11] Patent Number: 5,182,796
[45] Date of Patent: Jan. 26, 1993

[54] MULTI-SCREEN SETTING CONDITION DISPLAY SYSTEM

[75] Inventors: Yoshinaru Shibayama; Takao Ohtake, both of Kanagawa, Japan

[73] Assignee: Fuji Xerox Co., Ltd., Tokyo, Japan

[21] Appl. No.: 875,192

[22] Filed: Mar. 31, 1992

Related U.S. Application Data

[63] Continuation of Ser. No. 327,199, Mar. 22, 1989, abandoned.

[30] Foreign Application Priority Data

Mar. 23, 1988 [JP] Japan .................. 63-68380

[51] Int. Cl.⁵ .............................. G06F 15/62
[52] U.S. Cl. .................... 395/156; 395/155; 395/161; 355/209
[58] Field of Search .............. 364/518–521; 340/706, 721; 355/208, 209; 395/155–161

[56] References Cited

U.S. PATENT DOCUMENTS 4,728,985 3/1988 Nakashima et al. ............ 355/7
4,937,762 6/1990 Todome ..................... 364/521

FOREIGN PATENT DOCUMENTS 3043081 5/1981 Denmark .
62-255965 11/1987 Japan .
1-118858 5/1989 Japan .
1-118858 5/1989 Japan .
1-118861 5/1989 Japan .

OTHER PUBLICATIONS

Patent Abstracts of Japan, vol. 7, No. 109 (P-196)[1254], May 12, 1983 and JP-A-58 031 347 (Ricoh K.K.) Feb. 24, 1983.

Primary Examiner—Gary V. Harkcom
Assistant Examiner—Almis Jankus
Attorney, Agent, or Firm—Finnegan, Henderson, Farabow, Garrett and Dunner

[57] ABSTRACT

A display control system for controlling a display unit used as a user interface in a recording apparatus for the purposes of selecting recording functions and setting execution conditions where each of the functions includes a corresponding plurality of function groups comprising, an arrangement for controlling the display unit to display selection-mode screens for each function group and to instruct the operator of the recording apparatus to enter values to set the execution conditions, and a screen control for controlling the display unit to display an area that indicates the set state of each of the function groups for each of the functions whereby the operator can see at one time all of the function group settings.

17 Claims, 41 Drawing Sheets

FIG. 5(a)
| NO | SLAVE NAME | Tx, Rx, FOR SYSTEM | | NEXT SLAVE Tx DATA (min) | NEXT SLAVE Tx TIMING ti (ms) |
|---|---|---|---|---|---|
| | | Tx DATA (max) (SYS→SLAVE) | Rx DATA (max) (SLAVE→SYS) | | |
| 1 | UI | 7 | 15 | 2 | 26.0 |
| 2 | OPTICAL | 6 | 4 | 2 | 11.6 |
| 3 | INPUT | 5 | 4 | 2 | 10.4 |
| 4 | MARKING | 8 | 6 | 2 | 16.4 |
| 5 | OUTPUT | 6 | 4 | 2 | 11.6 |
| 6 | IEL | 6 | 6 | 2 | 14.0 |
| 7 | RESERVED | 5 | 4 | 2 | 10.4 |
| TOTAL COMMUNICATION QUANTITY | | 43 + 43 = 86 BYTE | | COMMUNICATION CYCLE | 100.4ms |
FIG. 5(b)
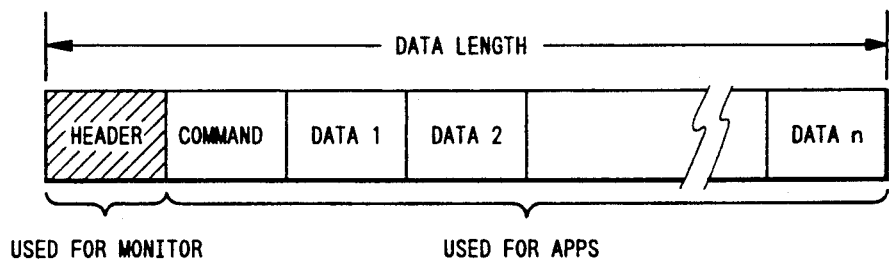
FIG. 5(c)
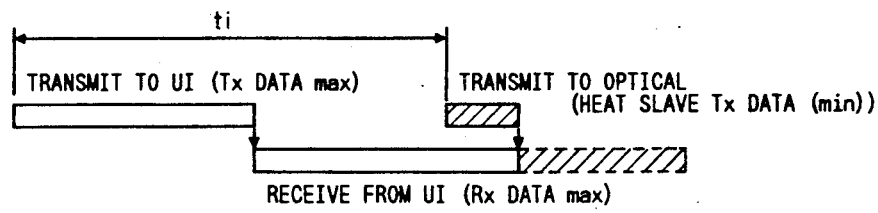

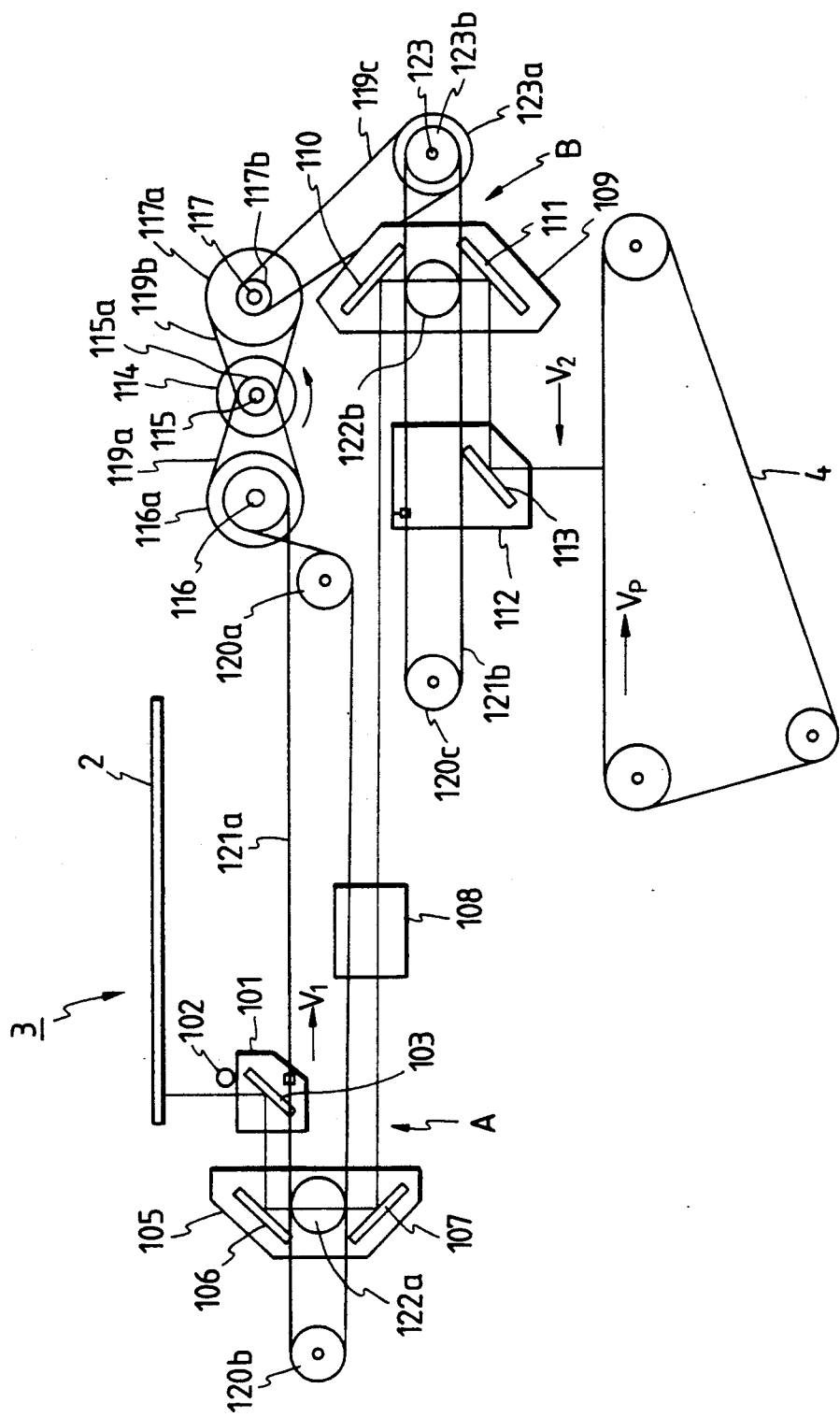

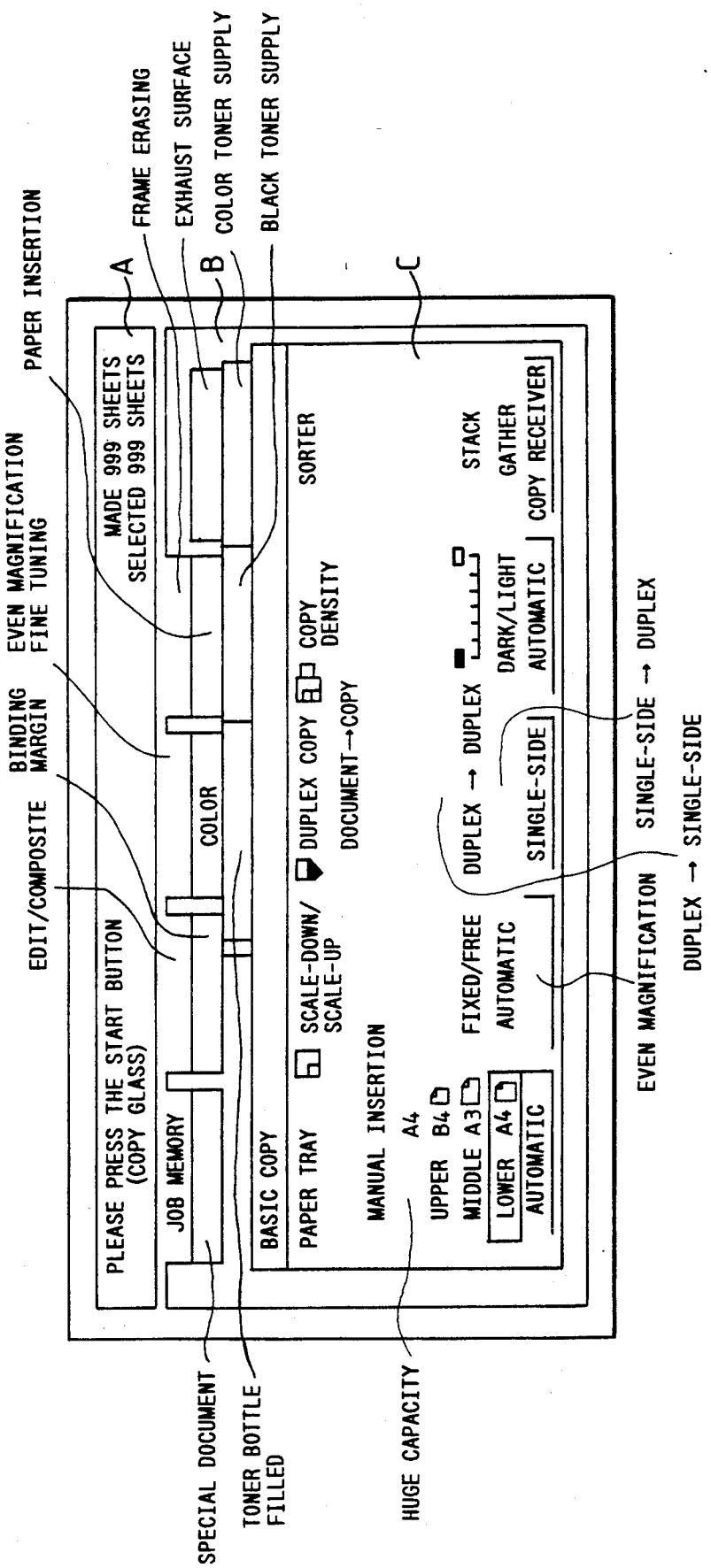

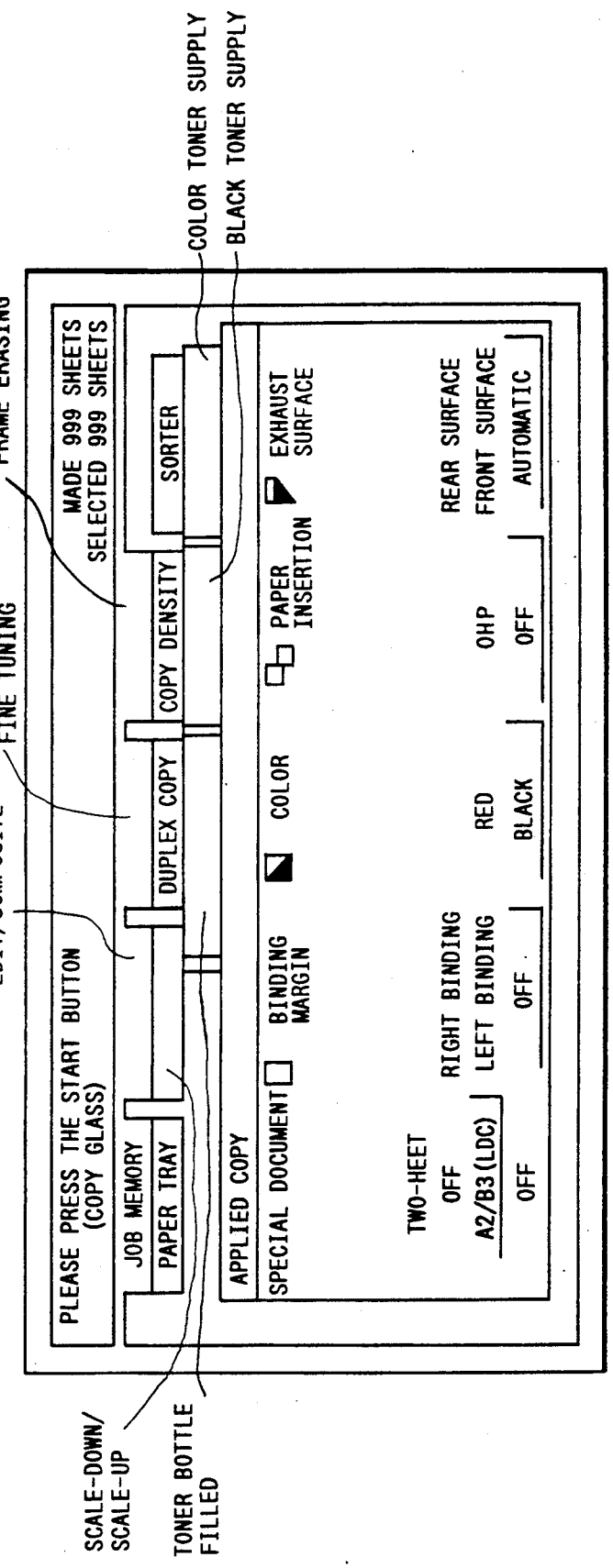

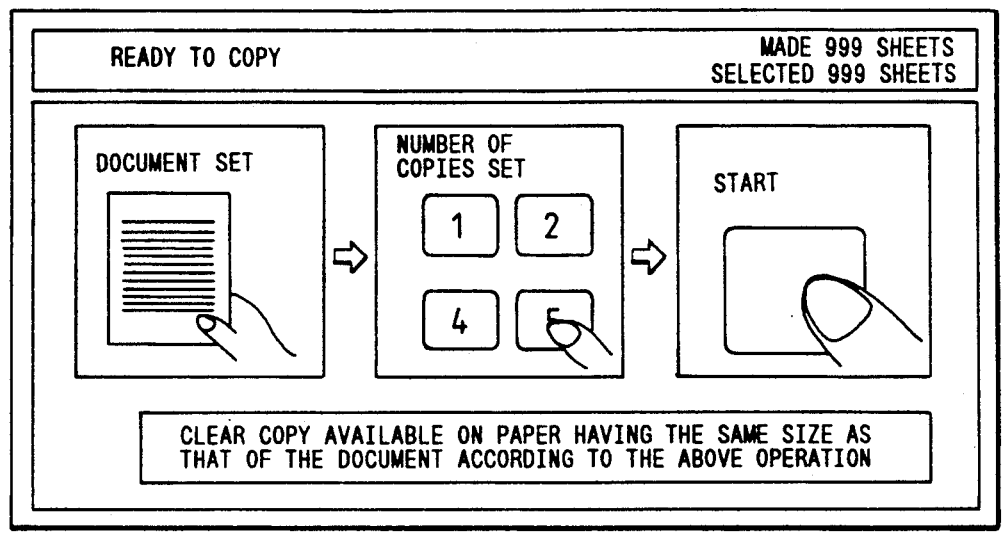

```
INFORMATION        HOW TO MAKE A COPY

1- BASIC COPY            2- APPLIED COPY         3- SPECIAL COPY

11 STATE OF DOCUMENT     21 TWO-HEET             31 JOB MEMOPY
12 MANUAL INSERTION      22 A2/B3 DOCUMENT       32 EDIT
13 SCALE-DOWN/SCALE-UP   23 PAPER FOR COMPUTER   33 COMPOSITE
14 DUPLEX COPY           24 BINDING MARGIN       34 FRAME ERASING
15 COPY DENSITY          25 PAPER INSERTION
```

PICTURE MODE

PLEASE PRESS THE START BUTTON  
(COPY GLASS)

MADE 999 SHEETS  
SELECTED 999 SHEETS

FIG. 34(a)

| SCAN \ DATA | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 2 | 3 | 4 | 5 | 6 | 7 | 8 |
| 2 | 9 | 0 | C | P | START | STOP | INTERRUPT | AC |
| 3 | POWER SAVE | VACANCY | INFOR- MATION | BASIC COPING | MORE FEATURE | VACANCY | ADVANCED FEATURE | REVIEW SELECTION |
| 4 | # 1 UP | # 2 UP | # 3 UP | # 4 UP | # 5 UP | # 5 DOWN | DUAL LANGUAGE | VACANCY |
| 5 | # 1 DOWN | # 2 DOWN | # 3 DOWN | # 4 DOWN | | | | |
| 6 | | | | | | | | |
| 7 | | | | | | | | |

FIG. 34(b)

| SCAN \ DATA | 0 | 1 | 2 | 3 | 4 | 5 | 6 | 7 |
|---|---|---|---|---|---|---|---|---|
| 0 | INTER-RUPT | POWER SAVE | BASIC COPING | MORE FEATURE | ADVANCED FEATURE | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |

FIG. 36

| ADDRESS FROM CPU | | CRT C MEMORY ADDRESS | CRT SCREEN | |
|---|---|---|---|---|
| V-RAM H | V-RAM L | | | |
| 4000 | 4001 | 0 | LINE 1, PLACE 1 | |
| 4002 | 4003 | 1 | LINE 1, PLACE 2 | |
| 4004 | 4005 | 2 | LINE 1, PLACE 3 | |
| ⋮ | ⋮ | ⋮ | ⋮ | |
| 4076 | 4077 | 3B | LINE 1, PLACE 60 | |
| 4078 | 4079 | 3C | LINE 2, PLACE 1 | 1st V-RAM |
| ⋮ | ⋮ | ⋮ | ⋮ | |
| 4706 | 4707 | 383 | LINE 15, PLACE 60 | |
| ⋮ | ⋮ | ⋮ | NO DISPLAY | |
| 47FE | 47FF | 3FF | | |
| 4800 | 4801 | 400 | LINE 1, PLACE 1 | |
| 4802 | 4803 | 401 | LINE 1, PLACE 2 | |
| ⋮ | ⋮ | ⋮ | ⋮ | 2nd V-RAM |
| 4F06 | 4F07 | 783 | LINE 15, PLACE 60 | |
| ⋮ | ⋮ | ⋮ | NO DISPLAY | |
| 4FFE | 4FFF | 7FF | | |

MULTI-SCREEN SETTING CONDITION DISPLAY SYSTEM

This application is a continuation of application Ser. No. 07/327,199 filed Mar. 22, 1989, now abandoned.

FIELD OF THE INVENTION

The present invention relates to picture information recording apparatus, such as a duplicator, a fascimile, a printer and the like, having a user interface including a display unit for performing operational display for the dual purpose of selecting functions and setting execution conditions. More particularly, the present invention relates to a multi-screen setting state display system in which the set state of all screens can be checked collectively on a divided screen.

BACKGROUND OF THE INVENTION

Recently, functions employed in recording apparatus such as a duplicator, have been diversified by the use of a computer for performing control and data processing operation. Many and various operations have been required for setting conditions to select functions and execute the selected functions. It is difficult for operators to know all of the various operations, and operation errors caused by operator mistakes are likely to occur. To facilitate proper operations, a console panel has been employed. The console panel includes various kinds of key switches and operating means such as ten keypads and includes indication lamps or indicators for displaying messages to assist in function selection, state sitting, and operation guidance.

In general, console panels on which keys, LEDs and liquid crystal indicators are arranged, such as for example back-lit type console panels, message display type console panels and the like, have been used in conventional user interfaces. The backlit type console panel has an indication plate in which fixed messages are respectively arranged in predetermined positions so as to be selectively indicated by illuminating the indication plate from the back by use of lamps or the like. The message display type console panel, for example, has liquid crystal display elements by which various messages can be selectively displayed without enlargement of the display area. Selection between the two types is determined in due consideration of the complexity in system construction of the duplicator, the operation property thereof, and the like.

Referring to FIG. 42, there is shown an example of the console panel employed in a duplicator, which has been proposed in patent applications previously filed by the assignee of the present application (for example, in Japanese Patent Application nos. 62-278653 to 62-278655).

The proposed console panel 70 has a menu indication panel 702 arranged in the upper portion thereof and provided with panel portions (703 to 708), the contents of which are respectively indicated with characters.

Of these, a sorter panel 703 has a switch 709 and two indication lamps 710 by which a sorting mode (a stack mode and a verification mode) can be selected in the case where a sorter is connected.

A function selection panel 704 has a switch 711 for performing picture edition, modification or check, a switch 712 for making a job memory work, and a switch 713 for setting various duplication forms such as a rapid sequence paging function, a frame removing function, a binding margin setting function, and the like. A switch 714 selects double side-duplication, and indication lamps 715 indicates the switches that have been selected.

A monochromatic color emphasis panel 705 has four indication lamps 715 for indicating the kind (color) or a currently used color developer. Indication lamps 715 are arranged in the uppermost portion thereof. In the remaining portion, there are provided four switches 716 to 719 and indication lamps 710 for indicating which of the switches 716 to 719 is set. The switches 716 to 719 are named as "marking color switch 716," "partly color conversion switch 717," "rapid sequence color synthesis switch 718." and "monochromatic color switch 719," respectively.

A copy density panel 706 has indication lamps 710 for indicating which one of five copy density steps is selected, and shift keys 720 and 721 for selecting one of the five copy density steps. When, for example, the upper shift key 720 is pushed, the copy density steps is successively decreased so that the copy density becomes lower. When, for example, the lower shift key 721 is pushed the copy density steps are successively increased so that copy density becomes higher. For example, the coy density can be adjusted in 16 steps. An automatic density adjusting switch 723 is arranged under the copy density panel 706. By the operation of the automatic density adjusting switch 723, the mode is set to an automatic density adjusting mode and an automatic density indication lamp 722 is turned on.

A magnification/paper selection panel 707 has a left portion to set and indicate magnification, and a right portion to perform paper selection. The left portion to set and indicate magnification includes shift keys 724 and 725 for setting a suitable magnification, a magnification indication display portion 723A, a fixed magnification key 726, fixed magnification indication plates 727, and indication lamps 710. The fixed magnification key 726, the fixed magnification indication plates 727 and the indication lamps 710 are arranged adjacent to the shift keys 724 and 725 and the magnification display portion 723A. The right portion for performing selection of paper includes eight indication plates 728 for indicating paper size and paper type, and shift keys 729 and 730. To the left of the eight indication plates, indication lamps 710 are arranged to indicate selected paper size and paper type. Further, an automatic paper/magnification selection switch 731 for selecting a present combination of magnification and paper size is disposed under the magnification/paper selection panel 707.

A display panel 708 located at the right of the magnification paper selection panel 707 has a schematic diagram 732 of the duplicator, and a liquid crystal display portion 733. The diagram 732 indicates the selected supply tray and the area where a paper jam has occurred. The liquid crystal display portion 733 displays various messages including if appropriate Japanese Kanji characters and visually indicates function selection and setting execution conditions.

Further, various keys or buttons are arranged under the display panel 708. These keys or buttons include: an all clear button 734 for returning the duplicator to the basic state; a ten key keypad 735 used for inputting numerical values; an interrupt button 736 used for selecting interrupting operation in the continuous copy mode; a stop clear button 737 used for stopping copier operation, setting the number of sheets to be copied, and for setting a sorter bin; a start button 738 for starting copier operation; a selection key 739 for moving a cursor in accordance with the message displayed on the liquid crystal display portion 733; a setting key 740 used for performing setting according to a position pointed to by the cursor; and the like.

The aforementioned console panel has a basic operation area related to basic operations such as paper selection and copy density setting, and an applied operation area related to applied operations such as function selection and monochromatic color emphasis, the two areas being arranged separately. In addition, the applied operations are assisted by displaying messages including Kanjis and Kanas (used in Japanese writing) on the liquid crystal display portion 733, to minimize the occurrence of operation errors in the panel operation.

In the case of a duplicator, the possible functions vary depending on the attached optional devices, such as a sorter, a duplex auto document feeder, a middle tray capable of double-side duplication and a IC card device. The functions vary depending on the combination of the above-mentioned devices, and the number of function selection switches arranged in the console panel. Further, the arrangement of indication lamps and indicators and the number thereof vary correspondingly.

With the increase in use of this type duplicator in offices, the requirements of users have become more of diverse necessity on to increase in the number of functions. In order to improve operation property, the construction of the console panel needs to be changed to make it possible to determine the arrangement and size of keys or indicators corresponding to the optional devices.

Recording apparatus, such as duplicators, are required to be reduced in size for the purpose of efficiently using working space. However, as described above, as the number of functions in the console panel increases, the number of switches and the number of indicators used for selection thereof and for setting operating conditions increases. There arises a problem in that space required for the console becomes too large.

The applicant of this application has proposed a recording apparatus using a CRT display unit instead of employing the above-described type console panel in a user interface. The selection area of the CRT screen is set by key operation to carry out the selection of functions and the setting of execution conditions, to minimize the number of keys. In the case where such a CRT display unit is used, however, the quantity of information increases as the number of functions increases. The display unit requires a wide display area, and is not compatible with the requirement to reduce it in size. If the CRT display unit is made small in size, it is not possible to provide all of necessary information on one screen in an understandable format. According to the aforementioned proposal, this problem is solved by using a screen dividing and display method. However, in the case where one screen is divided into a plurality of parts to be switched and displayed to carry out the function setting not all parts will displayed to the same time. Consequently, screen parts must be selectively switched for displaying and it is required to check the set state of the parts not being displayed. Operation becomes complicated and setting errors will occur.

SUMMARY OF THE INVENTION

An object of the present invention is to provide a multi-screen setting state display system for recording apparatus such as a duplicator which has a CRT display unit reduced in size with a divided screen for the dual purpose of selecting functions and setting execution conditions.

Another object is a multi-serum setting state display system in which the set state of the multiple screens is checked easily.

A further object of the present invention is a multi-serum setting state display system configured to avoid operation setting errors.

These and other objects are accomplished by a display control system for controlling a display unit used as a user interface in a recording apparatus for the purposes of selecting recording functions and setting execution conditions where each of the functions includes a corresponding plurality of function groups comprising display control means for controlling the display unit to display selection-mode screens for each function group and to instruct the operator of the recording apparatus to enter values to set the execution conditions, and screen control means for controlling the display unit to display an area that indicates the set state of each of the function groups for each of the functions whereby the operator can see at one time all of the function group settings.

BRIEF DESCRIPTION OF THE DRAWINGS

The manner by which the above objects and other objects features, and advantages of the present invention are attained will be fully apparent from the following detailed description when it is considered in view of the drawings, wherein:

FIGS. 5(a), 5(b), and 5(c) are views showing the structure of transfer data in serial communication and the transmission timing thereof;

FIGS. 8(a), 8(b), and 8(c) are views showing the arrangement of a scanning exposure device;

FIGS. 27(a), 27(b), and 27(c) are views for explaining selection mode screens;

FIGS. 28(a), 28(b), 28(c), and 28(d) are views showing examples of screens other than the selection mode screens;

FIG. 34(a) is a view showing an example of a set map for keyboard scanning;

FIG. 34(b) is a view showing an example of a set map for LED scanning;

FIG. 36 is view showing an example of address correspondence in V-RAMs;

DETAILED DESCRIPTION

Figure 1:
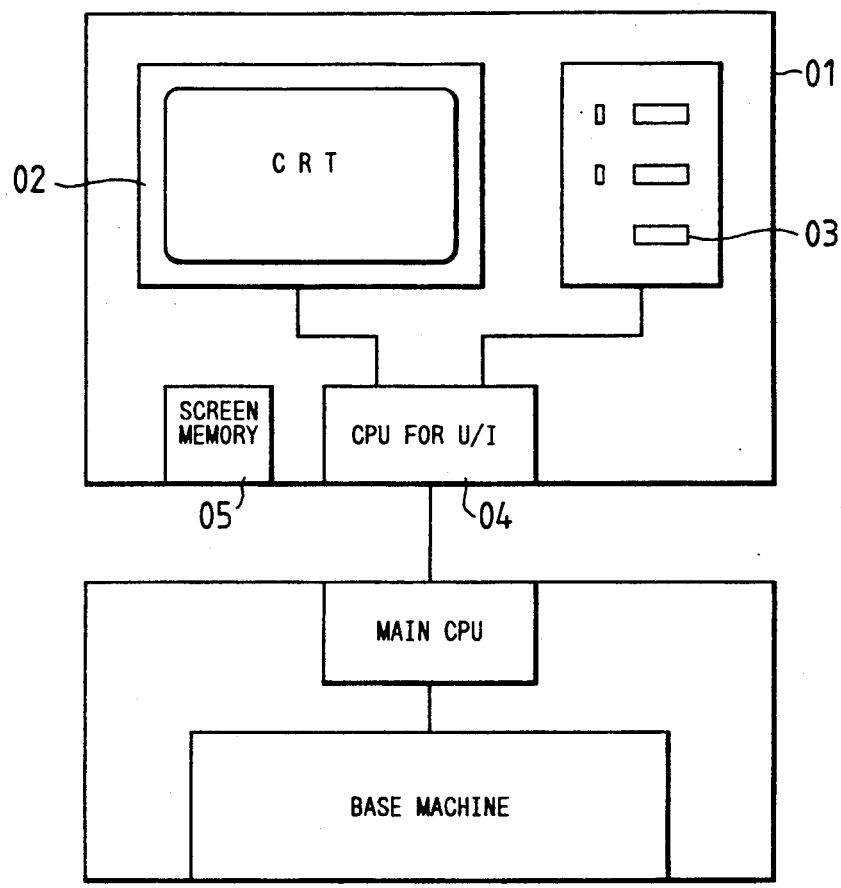
FIG. 1 is a view showing the arrangement of a first embodiment of the recording apparatus using a display unit in accordance with the present invention.

As shown in FIG. 1, according to the present invention, in a recording apparatus a display unit 02 is provided in a user interface 01 for the dual purpose of selecting functions and setting execution conditions. The functions are divided into a plurality of function groups to set selection-mode screens 05 for every function group so that the selection-mode screens are switched and displayed on the display unit 03 according to a screen switching instruction entered through a key board 02 under the control of a U/I CPU. An area for displaying the set state of the respective screens is provided in one screen of the display unit 02.

In the multi-screen setting state display system according to the present invention, an area for displaying the set state of the respective screens is provided in one screen, so that the set state of all screens can be always viewed and checked on one screen. The set state of the respective screens can be checked so easily that the performance of the operators can be improved. Further, different display forms are provided on the basis of distinction between a standard mode (automatic setting mode) and a specific setting mode (a setting mode other than the standard mode), to aid in identification.

Preferred embodiments of the present invention will be described with reference to a duplicator such as a recording apparatus. In the following description, (I) to (II) are sections setting forth an outline of the construction of a complete duplicator to which the present invention applies and (III) is a section showing detailed embodiments of the present invention as used in a duplicator.

(I) Outline of Apparatus

(I-1) Configuration of apparatus

Figure 2:
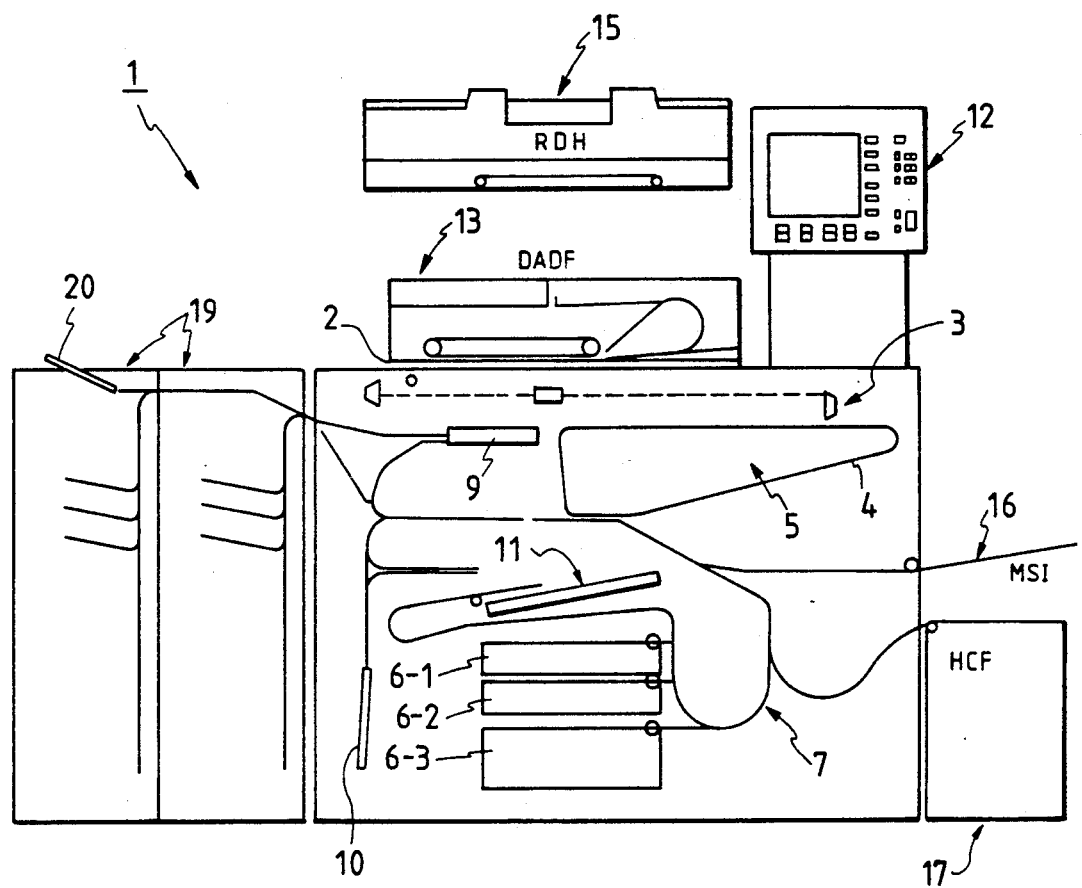
FIG. 2 is a schematic view showing the arrangement of the whole recording device of FIG. 1.
Figure 2:
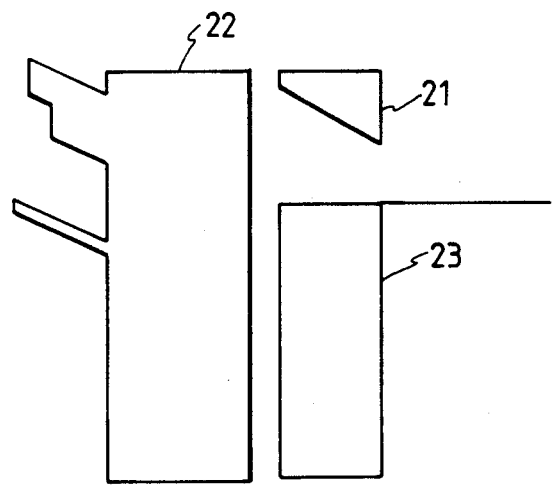

Referring to FIG. 2, there is shown an example of the construction of a complete duplicator to which the present invention applies. The duplicator includes a base machine 1 and some additional devices attachable to the base machine 1. The base machine includes a glass platen 2 provided for supporting an original document (hereinafter simply referred to as "document"), an optical system 3, and a marking system 5. An upper tray 6-1, a middle tray 6-2, and a lower tray 6-3 are installed in the base machine 1. These paper supply trays can be removed through the front of the base machine 1. Inverters 9 and 10 and a duplex tray 11 are arranged in a paper feed system 7 for feeding paper from the paper supply trays. A user interface 12 having a CRT display unit is mounted on the base machine 1. A DADF (duplex auto document feeder) 13 is attached on the glass platen 2. A card device can be attached to the lower portion of the user interface 12 which is of a stand type.

The following additional devices can be attached to the base machine 1, The DADF 13 can be replaced by any one of an RDH 15 (a recirculating document handler) an ADF (automatic document feeder), a platen with an editor pad (coordinate input device), and a platen cover. An MSI (a multi-sheet inserter, that is, a manual insertion tray) 16 and an HCF (a high capacity feeder) 17 can be attached to the supply side of the paper feed system 7. One or more sorters 19 can be provided to the output side of the paper feed system 7. In the case where the DADF 13 is mounted on the base machine 1, a simple catch tray 20 or one or more sorters 19 can be attached thereto. In the case where the RDH 15 is mounted on the base machine 1, an offset catch tray 21 for piling up collated document copies and a finisher 22 for stapling the document copies be attached, and a folder 23 can also be attached.

(I-2) Functions and features of the system (A) Functions

The present invention has a significant feature in that an entire duplicating operation is executed automatically with various functions corresponding to the needs of the users Menus relating the possible functions, execution conditions, and the like are displayed on the CRT display unit in the user interface 12 to attain simple and easy handling.

The main functions of the duplicator are as follows. Menus for the selection of the functions, execution conditions, and the like, can be displayed for every mode selected from a basic copy mode, an applied copy mode, and a special copy mode by switching display screens on the CRT display unit. Furthermore, selection/designation of functions and input of execution condition data can be made by key instructions to scroll the screen.

The duplicator to which the present invention applies includes a main function, an automatic function, an additive function, a display function, a diagnostic function, and the like.

In respect to the main function, unfixed-size paper as well as fixed-size paper of A6-A2 and B6-B3 can be used. As described above, three-paper feed trays G-1, G-2, and G-3 are incorporated in the base machine 1. Seven-step fixed magnifications can be used selectively and continuous magnification adjustment at 1% increments can be made. Furthermore, fine adjustment at every 0.15% can be made in the range of from 99% to 101%. In addition, there are provided a density selection function of seven fixed steps in a photograph mode, a duplex function, a binding margin setting function for separately setting right and left margins in the range of from 1 mm to 16 mm, a billing function, and the like.

In respect to the automatic function, there are provided an automatic paper selection function for automatically selecting paper size corresponding to the size of the original paper, an automatic magnification selection function for automatically selecting magnification corresponding to the designation of paper, an automatic density control function, an automatic starting function for automatically starting a copying operation just after a fuser assumes the ready state after the duplicator is powered on, an automatic clearing and power saving function that is operated with the passage of a predetermined time after completion of the copying operation, and the like.

In respect to the additional functions, there are provided a synthetic copying function, an interrupt function, a preheating mode function, a set number clearing function, an all clearing function for the auto mode, an information function for operation explanation, a P key for use of an IC card, a maximum lock document returning and full job recovery function for limiting the set number and for use of the DADF, a purge function for removing paper except a jam portion, a full-scale copying function without edging (edge blanketing), an editor function for editing a document before copying, a job program function for calling jobs one by one and processing them, a blank paper inserting function for one-by-one inserting blank paper between successive sheets of copied paper, a centering/framing (center/frame blanketing) function used for making a book, and the like.

In respect to the display function, a CRT display unit or the like can be used. The display function includes a jam display function, a residual toner quantity display function, a full recovered toner notice display function, a function for displaying waiting time for heating the fuser, a message display function for giving operators information related to improper function selection, and the like.

In respect to the diagnostic function, there are provided an NVRAM initializing function, an input check function, an output check function, a performance history function for accumulating the number of times a jam has occurred and the number of times paper has been fed, a function for setting initial values used in process codes in the vicinity of a marking and a sensitive belt, a registration gate-on timing adjusting function, a function for setting a configuration, etc.

In addition, options such as MSI, HCF, a second developer color (red, blue, green, brown), an editor and the like can be used.

(B) Features

The system of the present invention having the aforementioned functions has the following features as a whole.

(a) Attainment of Electric Power Saving:

The high-speed and high-performance duplicator requires electric power of 1.5 kVA. Therefore, a control system for supplying 1.5 kVA in every operational mode is determined and the allocation of electric power to every function for setting the target value is determined. Further, an energy distribution table decides energy transmission routes, so that controlling and verification can be carried out on the basis of the energy distribution table.

(b) Attainment of High Picture Quality:

In this apparatus, a micro carrier formed of ferrite is used in toner particles to attain fine picture quality. Further, a developing system using a rebound magnetic field is employed in the apparatus. A high-sensitive chromatical organic material belt formed by applying coats of an organic photosensitive material is used as a photosensitive material. Further, middle tones can be expressed in a pictorial mode by the use of set points. Consequently, improvement in copy clarity and reduction of black points are attained.

(c) Improvement in Operation Property:

The user interface comprises a limited number of keys and LEDs arranged corresponding to the screen in the CRT display unit and its vicinity, so that mode setting can be made using a display menu that is easy to see and simple to operate. Further, a predetermined operation can be automated by storing the copy mode and its execution conditions in a nonvolatile storage or in an IC card in advance.

(C) Examples of Discrimination

The functions of the duplicator to which the present invention applies depend on programs stored in IC cards. Accordingly, use of the duplicator can be discriminated by changing the programs card-by-card. Some easy to understand examples will be described.

The first example is where a duplicator is commonly used by a number of independent businesses or by a number of different sections of a business. In the latter case, discrimination of use of the duplicator is necessary for budgetary control and in the past, the use has been recorded by devices such as a copy counter.

It can be assumed that the duplicator is a relatively highly systemized duplicator having a base machine 1 as shown in FIG. 2, an IC card device, a DADF 13, a sorter 19, a user interface 12, supply trays (6-1 to 6-3), and a duplex tray 11. Some users or sections may need the DADF 13 or the sorter 19, while others may require optional devices. It is desirable to allocate costs for the optional devices to only those users who utilize them.

This can be done by rising IC cards specific to the users. The IC cards are arranged to specify the functions of the authorized for the user. For example, a user that has the highest-degree IC card is authorized to use the DADF 13, the sorter 19, the supply trays (6-1 to 6-3) and the duplex tray 11 by operating the duplicator after inserting its IC card in the IC card device. On the contrary, another user who does not need the sorter will be able to reduce copying expenses by using an IC card that authorize only the catch tray 20.

A second example is the operation of a self copy service shop.

A plurality of duplicators are set up in the shop and IC card devices 22 are attached to each of the duplicators, A customer requests an IC card authorizing only the function it needs and sets the IC card in a duplicator to perform a self service copying operation. Another customer having little knowledge of the duplicator may request an IC card containing a program causing the display of the operational features and uses the IC card to display information concerning the various operations on the UI 12, so that the copying work can be performed with no mistakes. The use of DADF 13, multi-color recording, and the like is determined by the IC cards.

The IC cards can impose limitations on the kinds of machines which can be used, so that differential fees can be charged. Furthermore, actual copying results, such as the number of copies and the size of the copy paper, can be written onto the IC cards, so that a demand for payment can be made easily and accurately.

As a third example, the IC card may contain a program for a specific user. For example, official patent reports scaled down by photoengraving are must be enlarged by a scaled up in the relatively large enlargement ratio of up to 200% when copied so that the size of the copied paper can be made equal to the original size of the reports. When drawings for submission to a government office are made, work for scaling down or up the original size of the drawings little by little is made corresponding to the demand thereof. A further exemplary task is a city or ward office that copies a resident certificate and finds it desirable to delete certain information for protection of a person's privacy.

If the functions of the duplicator were established to satisfy all needs, the console panel would be exceedingly complicated and the ROM in the duplicator would have to be enlarged in size. By using IC cards for specific users, a duplicator having the optimum functions can be attained for every user.

For example, in the case of the aforementioned patent attorney's office, a fixed magnifications can be selected easily by buying an exclusive-use IC card. Further, the magnification can be set in a range requiring fine adjustment, for example, at every 1%. Further, in the case of the section for issuing resident certificates, the IC card can control operation such that information to be eliminated can be indicated on the display unit by instructions entered through the keyboard.

(I-3) Construction of electric control system of the duplicator

Figure 3:
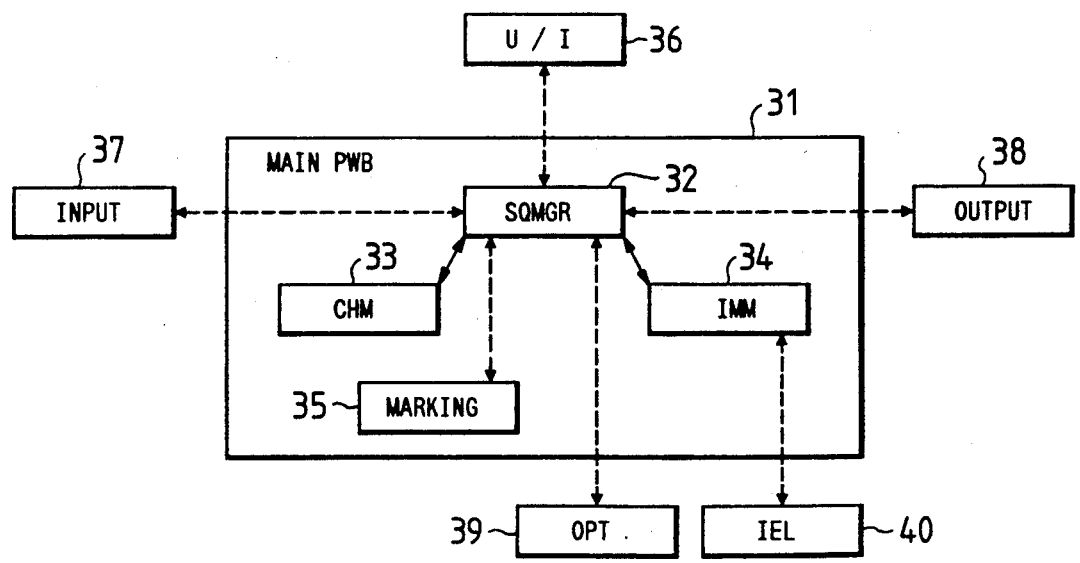
FIG. 3 is a diagram showing the construction of a control system of the recording apparatus of FIG. 1.
Figure 4:
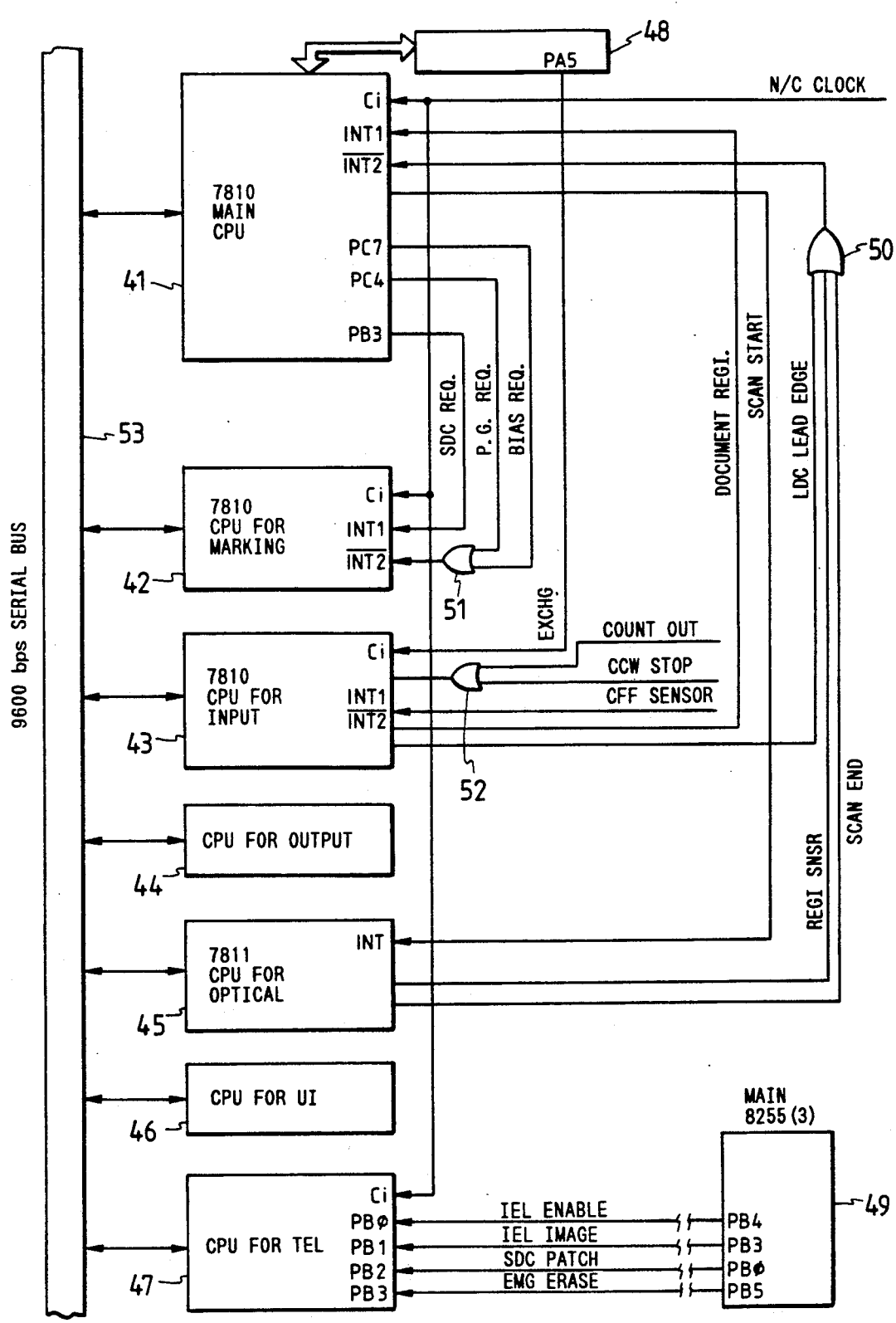
FIG. 4 is a diagram showing the hardware arrangement of CPUs used in the apparatus of FIG. 1.

FIG. 3 shows the construction of sub-systems in the duplicator to which the present invention applied. FIG. 4 shows a diagram showing the construction of hardware using a CPU.

The system in the duplicator to which the present invention applies is composed of nine sub-systems as shown in FIG. 3. Of these, four sub-systems are arranged on a main substrate 31 and comprise an SQMGR sub-system 32, a CHM sub-system 33, an IMM sub-system 34 and a marking sub-system 35. The CHM sub-system 32 and the SQMGR sub-system 32 are operated by software under control of a main CPU 41. However, other sub-systems are connected to the SMGR sub-system 32 by serial communication interfaces (shown by the broken line), because these sub-systems are operated by software under control of another CPU.

The SQMGR sub-system 32 serves as a sequence manager which gives operating and synchronization instructions to the respective sub-systems on the basis of copy mode setting information received from the U/I sub-system 36 and continuously monitors the state of the respective sub-systems.

The CHM sub-system 33 is a sub-system that controls the paper housing tray, the duplex tray, and the manual insertion tray, and also controls the feeding and purging of copy paper.

The IMM sub-system 34 performs panel division on the sensitive-material belt and controls the running/stopping of the sensitive-material belt, the main motor and the sensitive-material belt.

The marking sub-system 35 controls a corotron, an exposure lamp, a developer, the potential of the sensitive-material belt, and the toner concentration.

The U/I sub-system 36 controls all of the user interfaces, displays the state of the machine, and performs job management to determine the copy mode and job recovery.

The INPUT sub-system 37 controls the auto document feeder (DADF), a semi-auto document feeder (SADF), large-size document conveyer (LDC), computer form feeder (CFF), two-documents automatic feed (2-UP) and recycle document handler (RDH) and detects the size of the document paper.

The OUTPUT sub-system 38 controls the sorter and finisher and outputs the copies on the basis of the respective modes of sorting, stacking and non-sorting, or filing up the copy.

The OPT sub-system 39 performs scanning control, lens moving control, shutter control and PIS/NONPIS control in exposure of the document and also performs carriage moving control in the LDC mode.

The IEL sub-system 40 is a sub-system that controls the erasing of unnecessary images on the sensitive-material belt, and the erasing of the forward/backward end of images and images corresponding to the edition mode.

Seven CPUs as shown in FIG. 4 are arranged as the nuclei of the aforementioned system, so that the system can be flexibly matched with the combination of the base machine 1 and additional devices surrounding the base machine 1. In the system, a main CPU 41, is arranged on a main substrate of the base machine 1 and which contains the software for the SQMGR sub-system 32, the CHM sub-system 33, and the IMM sub-system 34. The CPU 41 is electrically connected to respective CPUs 42 to 47 through a serial bus 53. The respective CPUs 42 to 47 have a one-to-one correspondence to the sub-systems connected by serial communication interfaces as shown in FIG. 3. The serial communications between the main CPU 41 and other CPUs 42 to 47 may be established on a predetermined timing with a communication cycle of 100 msec, for example. Therefore, strict timing is required in view of mechanism.

In the case where a signal cannot be synchronized with the timing of serial communications, interrupt processing is made through a corresponding interrupt (INT terminal signal) of the respective CPUs which forms a hot line different from the serial bus 53. If a copying operation at a process speed of 64 cpm (A4-LEF) and 309 mm/sec is made on the set registration-gate control accuracy of ±1 mm, a job unadaptable to the aforementioned communication cycle of 100 msec occurs. The hot line is required for securing the execution of such a job.

Accordingly, this duplicator can employ software system constructions corresponding to the various kinds of additional devices that can be attached to this duplicator.

One of the reasons why such constructions are employed is that if all programs for controlling the operations of the additional devices are provided in the base machine 1, very large memory capacity is required. Another reason is that newly-developed additional devices can be utilized without requiring the exchange or increase of the ROMs (read-only memories) in the base machine 1.

The base machine 1 has a basic storage region for controlling the base portions of the duplicator, and an additional storage region for storing programs taken together from IC cards with functional information for implementing the present invention. In the additional storage region, various programs, such as program for controlling the DADF 13 and a program for controlling the user interface 12, are stored. When a certain IC card is set in the IC card device 22 while a predetermined additional device is attached to the base machine 1, a program necessary for copying operation is read out through the user interface 12 and loaded on the additional device. The loaded program controls the copying operation in cooperation with a program written in the basic storage region. In this embodiment, the memory is a nonvolatile memory made of a random access memory backed up by a battery. Of course, other storage media such as an IC card, a magnetic card, and a floppy disk can be used as a nonvolatile memory. This duplicator is constructed so that picture density and magnification can be preset in order to lighten the work load on the operator. Preset values are stored in the nonvolatile memory.

(I-4) Serial communication system

Figure 6:
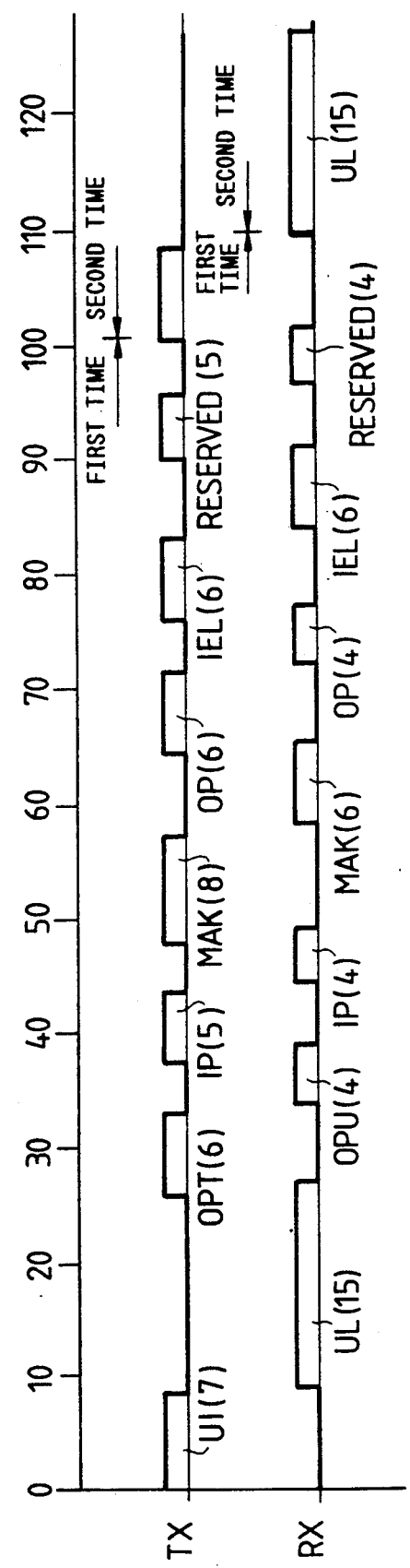
FIG. 6 is a timing chart showing data transfer in one communication cycle.

FIGS. 5(a), 5(b), and 5(c) are views showing a transfer data structure and transmission timing in the serial communication. FIG. 6 is a timing chart showing a mutual communication interval in one communication cycle.

In the serial communication between the main CPU 41 and respective CPUs (42 to 47), such data quantities as shown in FIG. 5(a) are allocated to each. In the case of user interface, the transmission data TX from the main CPU 41 is composed of 7 bytes; the receiving data RX is composed of 15 bytes; and the transmission timing $T_i$ (FIG. 5(c)) to the next slave, that is, the optical CPU 45, is 26 µs. In this embodiment, the total data communication quantity is 86 bytes and the cycle is about 100 µs for a communication rate of 9600 BPS. The data length is determined by a header, a command and data as shown in FIG. 5(b). If a maximum data length based on FIG. 5(a) is used for data transmission and data receiving, the communication cycle as the whole is as in FIG. 6. In FIG. 6, the time required for transmission of one byte is established to be 1.2 µs on the basis of the communication rate of 9600 BPS. Further, the time required for a slave to start transmission after ending receiving is established to be 1 µs. As this result, one communication cycle is 100 ms.

(1-5) State division

Figure 7:
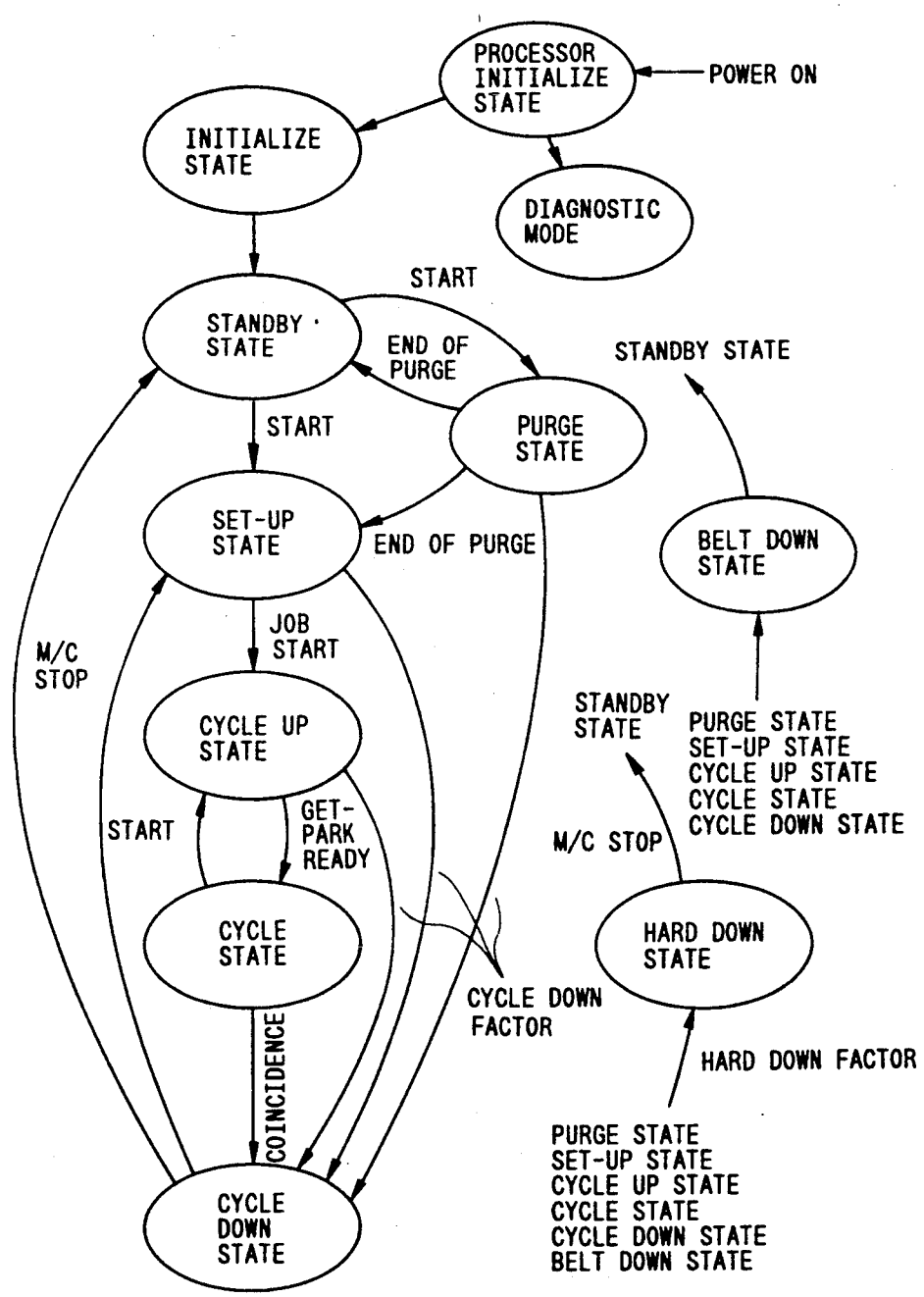
FIG. 7 is a view showing the state transition of the processor.

FIG. 7 is a view showing the state division of the main system. The state of the main system from the step of POWER ON to the step of END-OF-COPY is divided into several states. Jobs to be performed in the respective states are predetermined. The state division is constructed so that the main system cannot be shifted to the next state before a job in a current state is entirely terminated. This enables efficiency and accuracy of control to be attained. Flags are set according to the states. By reference to the flags, the respective sub-systems can determine the state of the main system. The state in each of the sub-system is also divided into several states. Also in each of the sub-systems, flags are set according to the states. By making reference to the flags, the main system can determine the states of the respective sub-systems and control them.

When the duplicator is powered on, the main system assumes a processor initialize state in which a judgment as to which one of a diagnostic mode or a user mode (copy mode) is to be valid. The diagnostic mode is a mode which used by a serviceman in which various kinds of test are made under the conditions set in the NVM.

In an "initialize" state in the user mode, initialization is made on the basis of the contents of the NVM. For example, the carriage is set to a home position, the lens magnification is set to a 100% position, and initialize instructions are sent to the respective sub-systems. When initialization is finished, the state of the main system is shifted to "standby."

The "standby" state indicates that all of the sub-systems are initialized. In the "standby" state, the message "PLEASE WAIT" is displayed automatically on the display unit. Further, a quartz lamp is turned on and the fuser is rotated for a predetermined time. When the temperature of the fuser is at a predetermined level, the U/I displays the message "READY FOR COPY."

In the "set-up" state the necessary arrangements for copying work are made after the starting button is pushed. In the "set-up" state, a main motor and a sorter motor are started, and constants such as $V_{DDP}$ of the sensitive-material belt are set. Further, an AFD motor is turned on so that the first one of the documents is fed automatically. When the first document reaches the registration-gate, the size of the document is detected. In the APMS mode, a suitable tray and a suitable magnification are decided. The first document is then laid on a platen. The second document is then fed to the registration-gate, and the state of the main system is shifted to "cycle up."

In the "cycle up" a state panel management is made while dividing the belt into several pitches before a first panel reaches a get-park point. In short, the pitch is determined in accordance with the copy mode and the magnification is reported to the optical sub-system to perform lens movement. The copy mode is reported to the CHM sub-system and the IMM sub-system, so that when the magnification setting is recognized, the scanning length is determined on the basis of the magnification and paper size and reported to the optical sub-system. The copy mode is reported to the marking sub-system. When the energizing of the marking sub-system is finished, the panel L/E decide on the basis of the pitch is checked by the IMM sub-system. When the first copy panel reaches the get-park point, the state of the main system is shifted to "cycle."

The "cycle" state is operable during the copying operation. In the "cycle" state, the copying operation is repeated while the ADC (automatic density control), AE (automatic exposure), DDP control, and the like are performed. When R/L reaches a predetermined count, the document is exchanged. When the procedure is repeated for the selected number of sheets of the documents, a coincidence signal is generated so that the state of the main system is shifted to "cycle down."

The "cycle down" is a state in which carriage scanning and paper feeding are stopped to make after-adjustment of the copying operation. In the "cycle down" state, the corotrons and the developers are turned off. Further, panel management is made so that a panel next to the last used panel is stopped in a stop-park position in order to avoid fatigue of a specific panel due to the excessive use thereof.

Usually, the "cycle down" state of the main system is followed by the "standby" state. In the case of "restart" by pushing the start key again in the copying operation in a platen mode, the state of the main system is returned to the "set-up" state. If a paper jam occurs, the "setup" or "cycle up" state is shifted to the "cycle down" state immediately.

The "purge" state arises when a jam occurs. When jammed paper is removed, other paper in the transparent path is automatically exhausted. Upon occurrence of a jam, the state of the main system is shifted to "cycle down"→"standby"→"purge" from any state. At the end of the "purge" state, the main system is shifted to "standby" or "set-up," but if a jam occurs again, the state of the main system is shifted to "cycle down."

The "belt down" state arises when a jam occurs on the tray side with respect to a tacking point. In the "belt down" state, belt driving is stopped by releasing a belt clutch so that paper in the paper path can be exhausted.

"Hard down" is a state which arises in the case where interlocking is opened to cause a dangerous condition or in the case where uncontrollable machine clock failure occurs. In the "hard down" state, the 24 V electric source supply is cut off.

If the factors causing "belt down" and "hard down" are removed, the state of the main system shifts "standby."

(II-1) Optical system

Figure 8B:
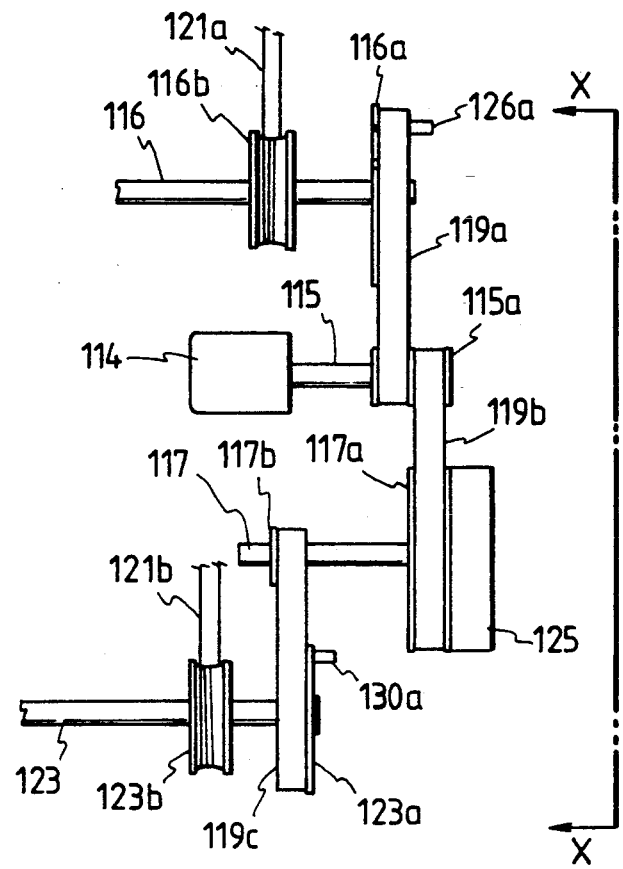
Figure 8C:
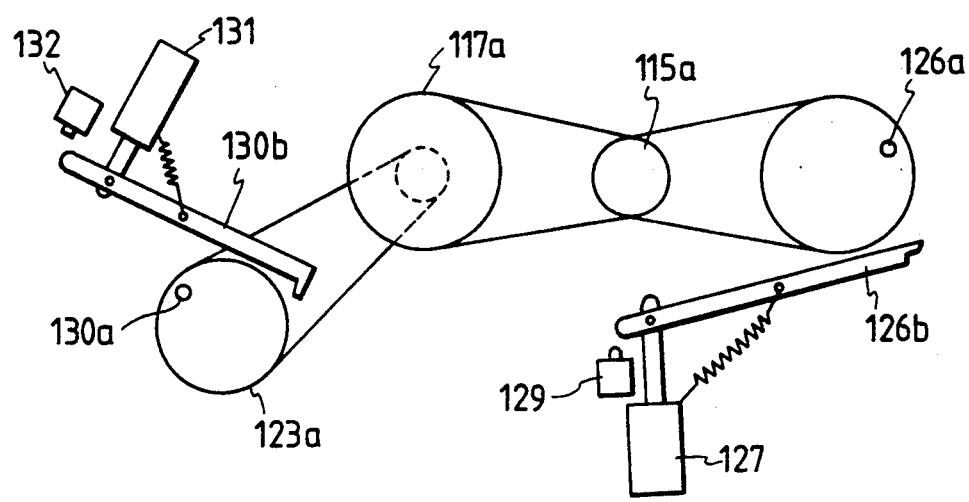

FIG. 8(a) is a schematic side view of an optical system. FIG. 8(b) is a plan view of the same, and FIG. 8(c) is a side view taken along the line X—X in FIG. 8(b).

In this embodiment, the scanning exposure device 3 employs a PIS (precision imaging system) for performing exposure of an image onto a sensitive material at a higher speed than the moving speed of the sensitive-material belt 4, and a system in which a first, movable, scanning series A is provided separately from a second, fixed, scanning series B. The first scanning series A for scanning a document put on the platen glass 2 is composed of a first carriage 101 and a second carriage 105. The first carriage 101 has an exposure lamp 102 and a first mirror 103. The second carriage 105 has a second mirror 106 and a third mirror 107. The second scanning series B is composed of a third carriage 109 and a fourth carriage 112. The third carriage 108 has a fourth mirror 110 and a fifth mirror 111. The fourth carriage 112 has a sixth mirror 113. A movable lens 108 is arranged on the optical axis between the third mirror 107 and the fourth mirror 110. The lens 108 can be moved by a lens motor to a position corresponding to the selected magnification but is fixed during scanning exposure.

These first and second scanning series A and B are driven by a direct-current carriage motor 114. Transmission shafts 116 and 117 are provided at both sides of an output shaft 115 of the carriage motor 114. Timing belts 119a and 119b are provided between a timing pulley 115a fixed to the output shaft 115 and timing pulleys 116a and 117. A capstan pulley 116b is fixed to the transmission shaft 116. A first wire cable 121a is provided between follower rollers 120a and 120b so as to be crossed between the capstan pulley 116b and the follower rollers 120a and 120b. The first carriage 101 is fixed to the first wire cable 121a, which is wound on a reduction pulley 122a provided in the second carriage 105. When the carriage motor 114 is rotated in the direction of an arrow shown in FIG. 8(a), the first carriage 101 is moved in the direction of another arrow shown in FIG. 8(a) at a speed of $V_1$ and, at the same time, the second carriage 105 is moved in the same direction at a speed of $V_1/2$.

A timing belt 119c is provided between a timing pulley 117b fixed to the transmission shaft 117 and a timing pulley 123a of a transmission shaft 123 arranged opposite to the timing pulley 117b. A second wire cable 121b is provided between a capstan pulley 123b of the transmission shaft 123 and a follower roller 120c arranged opposite to the capstan pulley 123b. The fourth carriage 112 is fixed to the wire cable 121b, which is wound on a reduction pulley 122b provided in the third carriage 109. When the carriage motor 114 is rotated in the direction of an arrow shown in FIG. 8(a), the fourth carriage 112 is moved in the direction of another arrow shown in FIG. 8(a) at a speed of $V_2$ and, at the same time, the third carriage 109 is moved in the same direction at a speed of $V_2/2$.

Further, as shown in FIG. 8(b), the transmission shaft is provided with a PIS clutch 125 (electromagnetic clutch) for transmitting the rotation of the timing pulley 117a to the timing pulley 117b. When the electric supply for the PIS clutch 125 is turned off, the timing pulleys 117a and 117b are engaged so that the rotation of the output shaft 115 can be transmitted to the transmission shafts 117 and 123. On the contrary, when the electric supply for the PIS clutch 125 is turned on, the timing pulleys 117a and 117b are disengaged so that the rotation of the output shaft 115 cannot be transmitted to the transmission shafts 117 and 123. Further, as shown in FIG. 8(c), an engagement projection 126a is provided on a side of the timing pulley 116a. When the electric supply for an LDC-lock solenoid 127 is turned an engagement piece 126b is engaged with the engagement projection 126a to fix the transmission shaft 116, that is to say, to fix the first scanning series A to thereby turn on an LDC-lock switch 129. On the other hand, an engagement projection 130a is provided on a side of the timing pulley 123a. When the electric supply for a PIS-lock solenoid 131 is turned on, an engagement piece 130b is engaged with the engagement projection 130a to fix the transmission shaft 123, that is to say, to fix the second scanning series B to turn on a PIS-lock switch 132.

In the scanning exposure device thus constructed, two exposure systems, that is, a PIS mode exposure system (precision imaging system) and a NON-PIS mode exposure system, can be selected by the operation of the PIS clutch 125. In the case of PIS mode, for example, when the magnification is not less than 65%, the PIS clutch 125 is turned on to move the second scanning series B at a speed of $V_2$ to thereby move the exposure point of the sensitive-material belt 4 in the direction reverse to that of the sensitive material. As a result, the optical scanning speed $V_1$ is increased so as to be relatively higher than the process speed $V_P$, thereby attaining an increase of the number of copied sheets per unit time. When the magnification is represented by M, the equation $V_1 = V_P \times 3.5/(3.5 M - 1)$ is obtained. Let M be 1, and let $V_P$ be 308.9 mm/s, then $V_1 = 432.5$ mm/s. As $V_2$ is determined by the diameters of the timing pulleys 117b and 123a, the equation $V_2 = (\frac{1}{3} \sim \frac{1}{4})V_1$.

In the case of NON-PIS mode, for example, when the magnification is not larger than 64%, the PIS clutch 125 is released and, at the same time, the PIS-lock solenoid is turned on, to fix the second scanning series B and fix the exposure point for scanning. As the result, increase of driving system load and increase of document illumination power are prevented. In short, the NON-PIS mode is used in a scale-down copying operation for the purposes of preventing increase of speed of the scanning series; preventing increase of illumination power; and saving electric power.

Figure 9A:
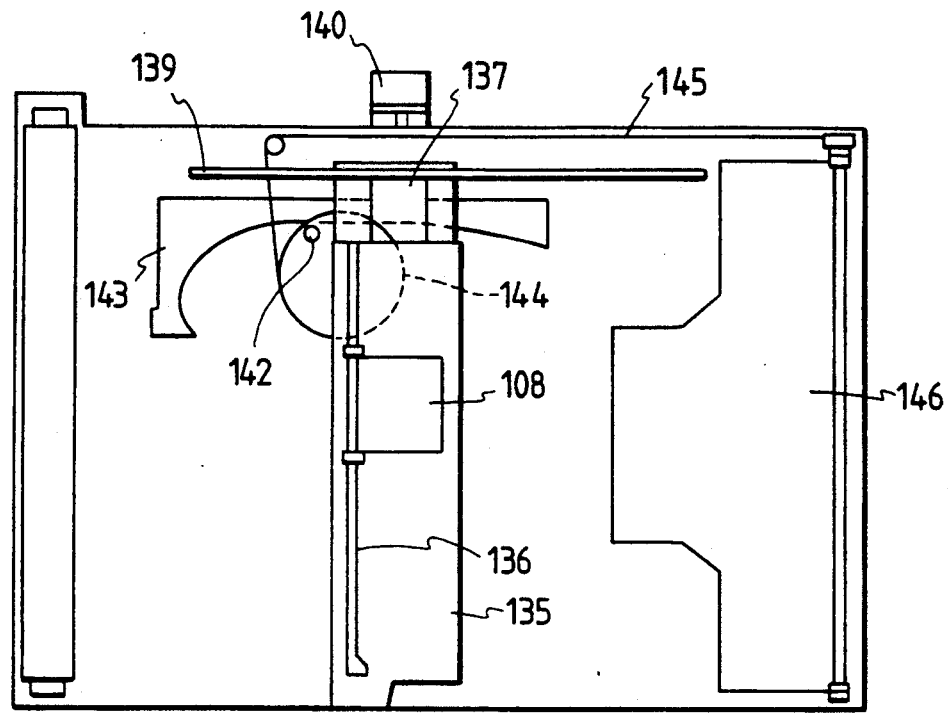
FIGS. 9(a) and 9(b) are views showing the arrangement of a lens driving system.

The aforementioned lens 108, as shown in FIG. 9(a), is slidably mounted to a support shaft 136 fixed to a lens carriage 135 arranged under the platen glass 2. The lens 108 is connected to a lens motor Z 137 with wire (not shown), so that the magnification is changed when moving the lens 108 in the Z direction (vertically in the drawing) along the support shaft 136 corresponding to the rotation of the lens motor Z 137. The lens carriage 135 is slidably mounted on a base-side support shaft 139 and connected to a lens motor X 140 with wire (not shown), so that the magnification is changed by moving the lens carriage 135 in the X direction (horizontally in the drawing) along the support shaft 139 corresponding to the predetermined magnification by the rotation of the lens motor X 140.

Figure 9B:
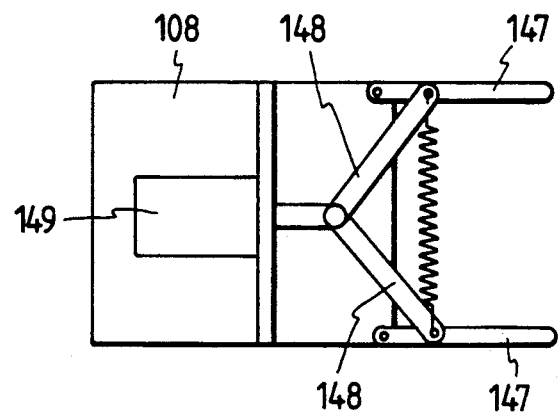

Further, as shown in FIG. 9(b), a lens shutter 147 is provided on a side of the lens 108 and is operated by a link mechanism 148. By switching on and off a shutter solenoid 149, the lens shutter 147 is opened during image scanning and is closed after image scanning Shading the light by the lens shutter 147 is for the double purpose of forming DDP patches and ADC patches on the sensitive material of the belt and preventing the image from fading out when the second scanning series B is returned in the PIS mode.

Figure 10:
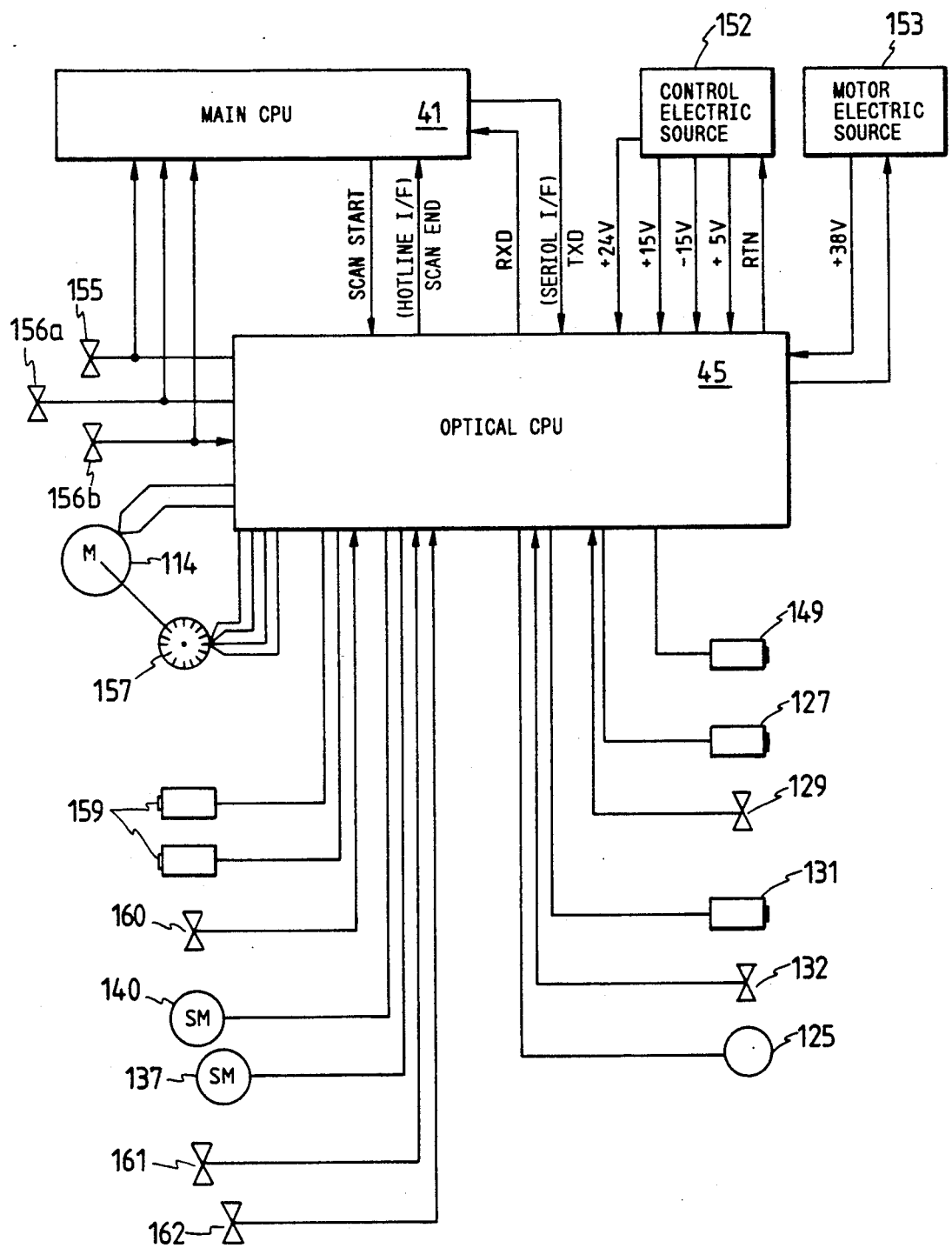
FIG. 10 is a diagram showing the arrangement of an optical control system.

FIG. 10 is a schematic block diagram of the optical subsystem. The optical CPU 45 is connected to the main CPU 41 through a serial communication and the hot line. The optical CPU 45 controls the respective carriages, lens, and the like to form a latent image on the sensitive material in the copy mode transmitted from the main CPU 41. A control electric source 152 has a logic supply voltage (5 V), analog supply voltages solenoid/clutch supply voltage (24 V). A motor electric source 153 has a voltage of 38 V.

A carriage registration-sensor 155 is located in a position corresponding to the registration position of the first mirror 101. When an actuator mounted to the first scanning series A misses the carriage registration-sensor 155, the carriage registration-sensor 155 generates a signal. The signal is sent to the optical CPU 45 and is used for determining a position or timing of registration or for determining a home position P at the return of the first scanning series A. Further, a first home sensor 156a and a second home sensor 156b are provided to detect the carriage position. The first home sensor 156a is arranged in a predetermined position between the registration position and the stop position of the first scanning series A, so that the first home sensor 156a detects the position of the first scanning series A to generate a signal. Similarly, the second home sensor 156b detects the second scanning series to generate a signal.

A rotary encoder 157 generates A-phase and B-phase pulse signals having the phase shifted by 90° corresponding to the rotation angle of the carriage motor 114. For example, the rotary encoder 157 is arranged so that the shaft pitch of the timing pulley in the first scanning series is 0.1571 mm per pulse when the rotary encoder 157 generates 200 pulses per rotation. A variable-power solenoid 159 serves to move a variable-power lens (not shown) vertically under the control of the CPU 45. The movement of the variable-power lens is checked by the ON/OFF operation of a variable-power switch 161. Lens home sensors 161 and 162 are provided to detect the home positions of the lens X motor 140 and the lens Z motor 137. The LDC-lock solenoid 127 locks the first scanning series A at a predetermined position under the control of the CPU 45. The lock is checked by the LDC-lock switch 129. The PIS-lock solenoid 131 locks the second scanning series B when the PIS clutch 125 is released at the time of NON-PIS mode. The lock is checked by the pIS-lock switch 132. The PIS clutch 125 is released when energized and turned on when de-energized. Accordingly, electric power in the PIS mode can be saved to contribute to the realization of 1.5 KVA.

Figure 11A:
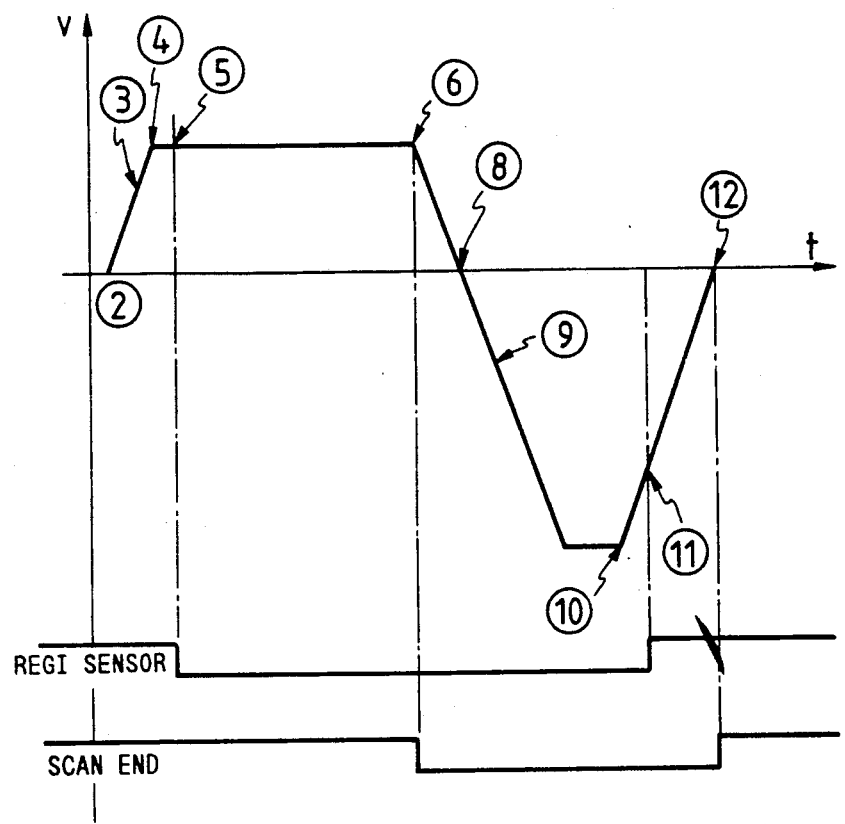
FIGS. 11(a) and 11(b) are signal diagrams for explaining the operation of the optical system.
Figure 11B:
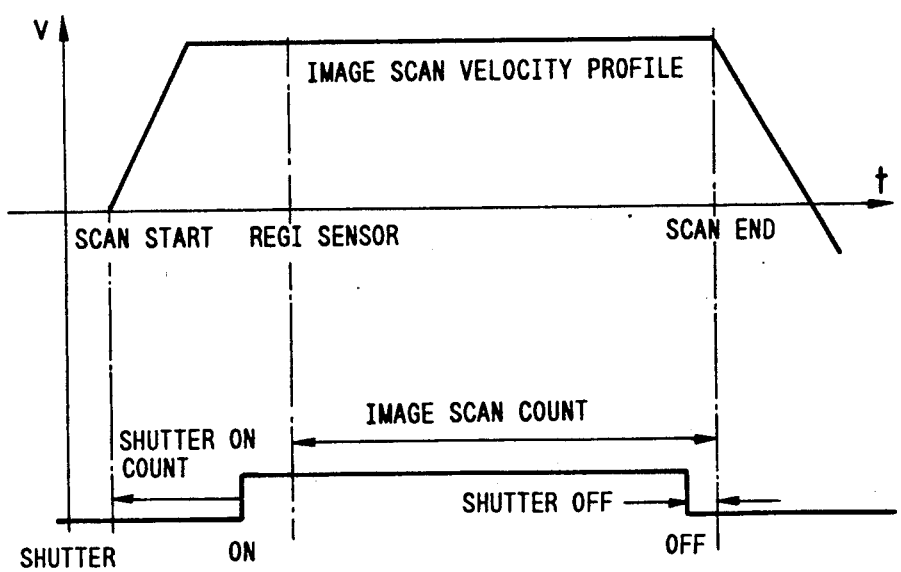

FIGS. 11(a) and 11(b) show the scanning cycle control in the optical system. The control is based on scanning the first scanning series A with predetermined magnification and scanning length. The control is started when a scanning start signal is received from the hot line. An image scanning count which is an encoder clock count from registration-sensor interruption to scanning end (the end of scanning), is calculated from scanning length data received from the main CPU. After setting the reference clock data corresponding to the magnification, the carriage motor is rotated in the scanning direction (CW) in Step 2 so that acceleration control at scanning is carried out (Step 3). Then, in Step 4, a PLL (phase control) mode is set. If an interrupt signal in the OFF state of the registration-sensor is present. Image scanning starts in Step 5. When the encoder clock count reaches a value equivalent to the scanning length (Step 6), the PLL mode is released so that a speed mode is set to rotate the carriage motor in the returning direction (CCW). Then, in Step 8, a judgment is made as to whether interruption from CW to CCW (reverse signal) exists or not. If interruption exists, accelerating control at the time of returning is carried out (Step 9). When the count of the encoder reaches a predetermined brake start point (Step 10), reduction control at the time of returning is carried out (Step 11). If the reverse signal is sent again, the carriage motor is stopped (Step 12).

As shown in FIG. 11(b), a count for opening the shutter, that is to say, a shutter-on count, is set. When the encoder clock count is not less than the shutter-on count, the shutter is opened. When the encoder clock count is not less that the shutter-off count, the shutter is closed to terminate the image scanning.

(II-2) Belt and its vicinity

The belt and its vicinity are separated into an imaging system and a marking system. The imaging system is controlled by the IMM sub-system 34 to perform writing and erasing of latent images. The marking system is controlled by the marking subsystem 35 to perform charging exposure, surface potential detection, development, transfer and the like. In the present invention, the IMM sub-system 34 and the marking sub-system 35 cooperate with each other for the purpose of panel management, patch formation, and the like on the belt, as will be described later, to attain a high speed of the copy operation and high quality of the copied picture.

Figure 12:
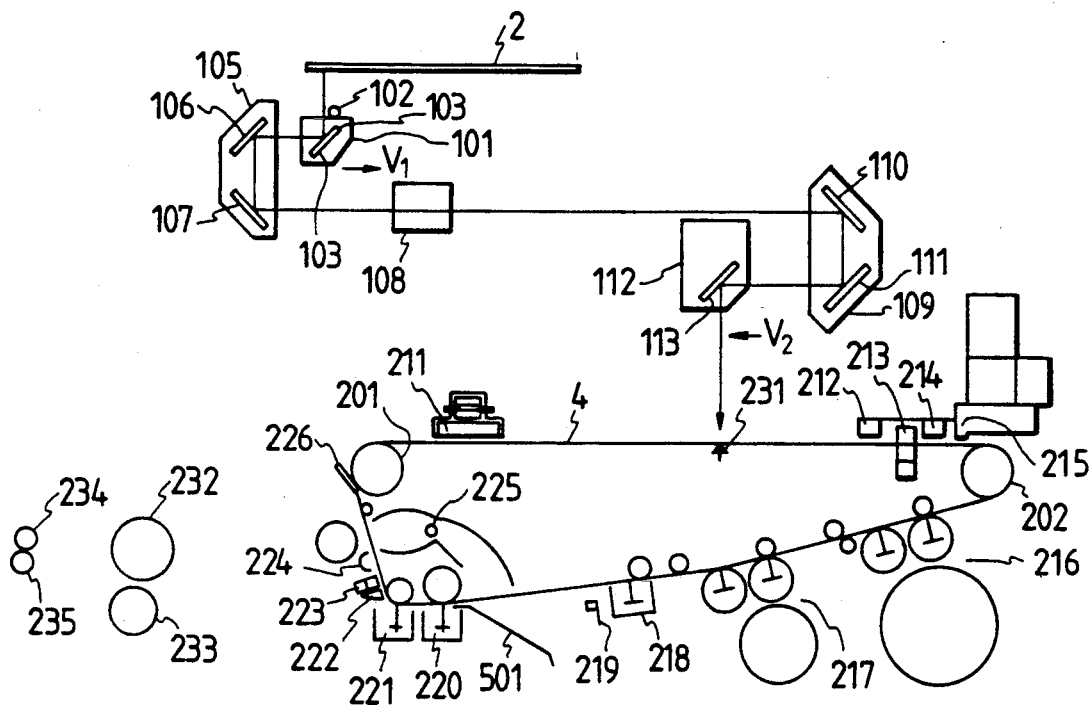
FIG. 12 is a schematic view for explaining a marking system.

FIG. 12 is a schematic view of a belt and its vicinity.

An organic sensitive-material belt 4 is arranged within the base machine 1. The organic sensitive-material belt is formed by a large number of coating layers such as charge generating layers and transfer layers. Accordingly, the degree of freedom of the belt is more than that of a photo-sensitive drum including a sensitive material formed by evaporation of Se. Accordingly, the belt can be produced easily, so that cost can be reduced. Further, the space around the belt can be enlarged, so that layout can be facilitated.

On the other hand, the belt is so elastic as to be able to expand and contract. Further, the diameter of the roll varies according to a variation in temperature. A belt hole is provided in the belt at a predetermined distance from the belt seam. A pulse corresponding to the rotational speed of the main motor is generated by an encoder to form a machine clock signal. By detecting the belt hole and counting the one-round machine clock at all times, the pitch signal as a standard of carriage start and the timing of the registration-gate are corrected corresponding to the expansion and contraction of the belt.

In this apparatus, the organic sensitive-material belt 4 has a length of 1 m or more. Four sheets of A4-size paper or three sheets of A3-size paper can be placed on the belt. As the belt has a seam, it is impossible to take a copy of a predetermined panel without continuous panel management (management of imaging area formed on the belt). For this reason, the panel position is determined by reference to the belt hole provided at a predetermined distance from the seam. Further, the number of panels (pitch number) which can be placed on the belt is determined corresponding to the copy mode designated by the user and the paper size. In addition, when the panel to be copied first reaches the get-park position in the vicinity of the roll 201 after pushing the start button, a signal is generated to report that a copy can be made from here.

The organic sensitive-material belt 4 is arranged so as to be electrified uniformly by a charging corotron (electrifier) 211 and is driven clockwise in the drawing at a fixed speed. When the first panel is a predetermined time in advance of the registration (exposure) position 231, a pitch signal is generated so that synchronization between carriage scanning and paper feeding can be made by reference to the pitch signal. The surface of the belt charged by the corotron 211 is exposed to the light at the exposure position 231. The optical image of the document placed on the glass platen 2 arranged in the upper surface of the base machine 1 enters the exposure position 231. Therefore, the exposure lamp 102, the plurality of mirrors 101 to 113 for transmitting light reflected from the surface of the document illuminated by the exposure lamp 102, and the optical lens 108 are arranged. Of these, the mirror 101 is scanned for reading the document.

The mirrors 110, 111 and 113 form a second scanning optical series which is called as "PIS" (precision image scanning). Because the process speed has its upper limit, the relative copying speed is increased by scanning the second scanning optical series in the direction of movement of the belt and in the reverse direction for the purpose of increasing the copying speed without increasing the process speed. Consequently, the maximum speed of 64 copies per minute can be attained.

An electrostatic latent image corresponding to the document is formed on the organic sensitive-material belt 4 by picture information exposed to the slit-like light at the exposure point 231. Then the electrostatic latent image is subjected to an IEL (inter image lamp) 215 for performing erasing of the unnecessary image, inter erasing, and side erasing. Thereafter, the electrostatic latent image is developed by a black toner developer 216 or a color toner developer 217 to form a toner image. The toner image is moved together with the rotation of the organic sensitive-material belt 4 and is passed by a pre-transfer corotron 218 and a transfer corotron 220. The pre-transfer corotron 218 weakens the electrical adhesive power of the toner by alternating-current impression to facilitate the transfer of the toner. In addition, the belt is formed of a transparent matter, so that the electrical adhesive power of the toner is further weakened by shining the light of a pre-transfer lamp 225 (which serves as an eraser) onto the belt from the back before transfer.

Copy paper housed in the supply tray of the base machine 1 or copy paper fed along the hand-feeding tray (multi-sheet inserter) 16 is sent out by the feed roll, guided by a feed path 501 and passed through between the organic sensitive-material belt 4 and the transfer corotron 220. As a general rule, paper feeding is made by LFD (long edge feed). The opening and closing of the registration-gate is controlled so that the top end of the paper and the exposure start position coincide with each other at the tacking point. As a result, the toner image is transferred onto the copy paper.

The paper and the sensitive-material belt 4 are separated from each other by a detach corotron 221 and a strip finger 222. After transfer, the copy paper is passed between a heat roll 232 and a pressure roll 233 to be heat-fixed and is further passed between conveyer rolls 234 and 235 to be outputted to an output tray (not shown).

After paper separation, the sensitive-material belt 4 is treated by a pre-clean corotron 225. Unnecessary charge is then erased by shining the light of the lamp 225 onto the belt 4 from the back. Impurities such as unnecessary toner and dust are scraped off of the belt 4 by a blade 226.

Patches between images are formed on the belt 4 by the patch generator 212. The electrostatic potential of the patch portion is detected by an ESV sensor 214 for the purpose of adjusting density. As described above, the belt hole is detected by the belt hole sensor 213 to detect the belt speed, so that process speed control can be carried out. Furthermore, the quantity of light reflected from the toner placed on the patch portion and the quantity of light reflected from the patch portion without the toner placed thereon are compared with each other by an ADC (auto density control) sensor 219, to detect the degree of deposition of the toner. In addition, a pop sensor 223 serves to detect the case where the paper is not separated from the belt but is wound on the belt.

Figure 13:
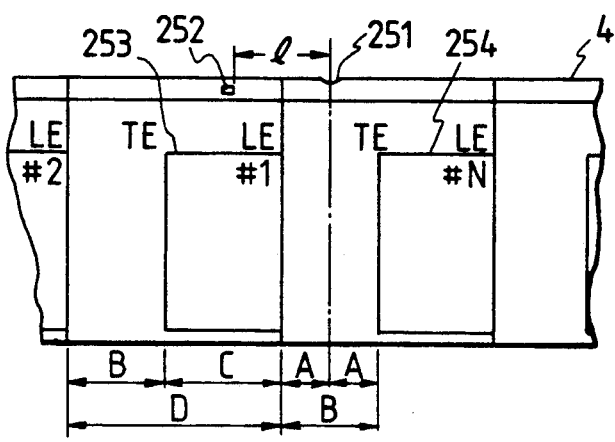
FIG. 13 is a view for explaining panel division on a sensitive-material belt.

FIG. 13 shows the condition of panel division on the sensitive-material belt 4. Because the belt 4 has the seam portion 251, the belt 4 is so constructed that an image is not placed on the seam portion 251. In short, the belt hole 252 is located in a position at a predetermined distance 1 from the seam portion. For example, in the case where the belt length is 1158 mm, l is established to be 70 mm. In the drawing, the reference numerals 253 and 254 designate first and last panels in the case where the surface of the sensitive-material belt is divided into N pitches. In the drawing, $\beta$ is the distance between adjacent panels, C is the length of a panel, and D is the pitch length of a panel. In the case of 4-pitch division, D is 289.5 mm. In the case of 3-pitch division, D is 386 mm. In the case of 2-pitch division, D is 579 mm. The equation $A = \beta/2$ is established to locate the seam 251 in the middle between the LE (lead edge) of the panel 253 and the TE (tail edge) of the panel 254.

Coincidence between the LE of the panel and the LE of the paper is necessary, but coincidence in TE is not always necessary. The TE of the panel coincides with the TE of the maximum size paper allowable.

Figure 14:
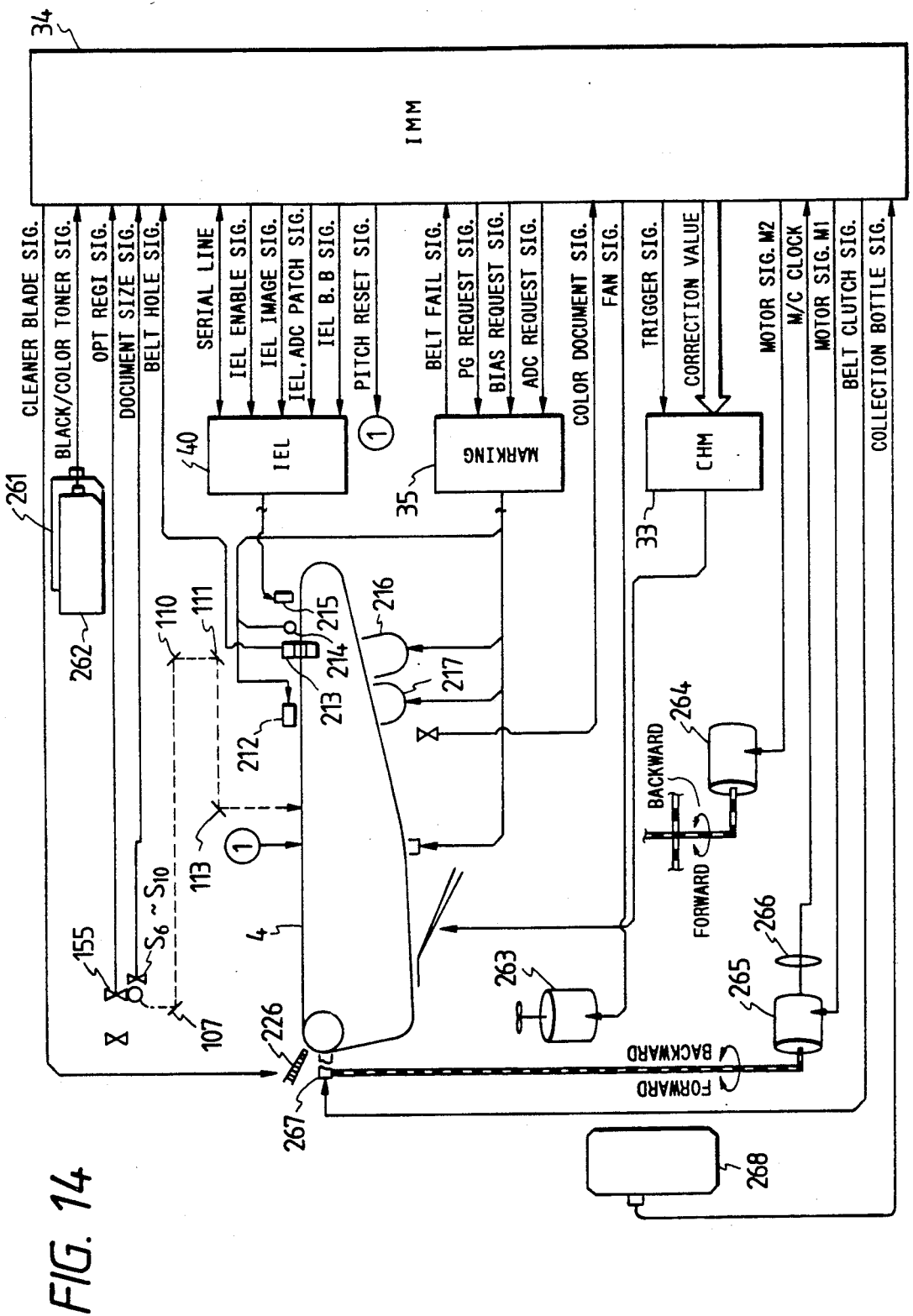
FIG. 14 is a schematic diagram showing the function of the marking system.

FIG. 14 is a schematic block diagram showing the IMM subsystem. In brief, the function of the IMM sub-system 34 is as follows. The IMM sub-system 34 performs serial communication with the IEL sub-system 40 by bus line. The IMM sub-system 34 performs management of image formation by sending an interrupt signal by hot line for the purpose of high-accuracy control. The IMM sub-system 34 controls the belt and its vicinity by sending a control signal to the marking sub-system 35 and the CHM sub-system 33.

The IMM sub-system 34 detects the hole provided in the organic sensitive-material belt 4 to control the main motor and, at the same time, determines the position of a panel to be formed to perform panel management. Further, in the case of low-temperature circumstances, the fixing roll is kept at a predetermined temperature by the void rotation of the fuser to perform a rapid copying operation. A "set-up" state is established by pushing the start key. In the "set-up" state, invariables such as Vddp are set up before the copying operation. In the "copy cycle" state, a necessary image area is formed by erasing the forward and backward edges of the image corresponding to the size of the document paper. Further, a patch is formed in the inter image area for the purpose of adjusting the density of the toner. In addition, when jam and hard down conditions, e.g., belt failure are detected, the belt is stopped or the machine is stopped by communication with the sequence manager.

A toner detection signal from the black toner bottle 261 or the color toner bottle 262 is inputted to detect the residual quantity of the toner. An optical registration signal from the optical registration sensor 155 is inputted as a reference signal for a PG request signal, a bias request signal and an ADC request signal fed to the marking sub-system from the IMM sub-system. The size of document from platen document size sensors S6 to S10 is inputted, so that the area erased by the IEL 215 is determined on the basis of the size of document and the size of copy paper.

A belt hole signal from the belt hole sensor 213 is inputted to correct scatter in the period of the belt with respect to the process speed controlled by two main motors 264 and 265. The two main motors are arranged to be operated so efficiently that motor power is produced efficiently corresponding to the loading condition. Further, regenerative braking due to the motors is made for the dual purpose of utilizing electric power effectively and improving accuracy in stop position. In addition, the motors can be operated reversibly, for the purpose of removing paper dust and toner residue which are collected in the front of the blade when the sensitive-material belt is cleaned by the blade being in contact with the belt. The belt driving by the motors is made through a belt clutch 267, so that the belt can be selectively stopped. Pulses are generated from the encoder in synchronization with the rotation of the motors. The pulses are used as a machine clock which can be obtained corresponding to the belt speed.

If the belt hole cannot be detected by the belt hole sensor 213 for a predetermined time or if the size of the hole is changed, this information is transmitted from the IMM sub-system to the sequence manager to stop the machine. Further, the IMM sub-system makes serial communication with the IEL sub-system 40 and sends an interrupt signal to the IEL sub-system 40 through the hot line. In short, the IMM sub-system sends out an IEL enable signal, an IEL image signal, an ADC patch signal, and an IEL black band signal. The IEL image signal is used for erasing unnecessary images. The ADC patch signal is used for the double purpose of defining the form and area of a patch portion formed by the patch generator 212 and adjusting the charge quantity to adjust the electrostatic potential to a constant value of 500 to 600 V. The IEL black band signal is used to form a black band between images at every predetermined distance to deposit toner as a kind of lubricant to prevent the belt 4 from being injured by the blade 226. In particular, even in the case where the document is almost white so that the quantity of toner required for copying is small, the belt 4 can be prevented from being injured by the blade.

Further, the IMM sub-system communicates with the marking sub-system 35 through the hot line to send out a patch generator request signal, a bias request signal and an ADC request signal by reference to the optical registration signal. Upon reception of these signals, the marking sub-system 35 operates the patch generator 212 to form a patch, operates the ESV sensor 214 to detect the electrostatic potential, and operates the developers 216 and 217 to form a toner image. In addition, this performs driving control of the pre-transfer corotron 218, transfer corotron 220, and detach corotron 221.

A pitch reset signal (1) is sent out from the IMM subsystem, so that the carriage can be started timely by reference to the signal. A detection signal indicating that a color developer unit is installed is inputted to judge whether the toner of the currently used developer is black or not.

The IMM sub-system sends a registration-gate trigger signal to the CHM sub-system 33 to control the end of the image so as to coincide with that of the paper at the tacking point. At the same time, the IMM sub-system sends a correction value if the timing for opening the registration-gate should be corrected.

The toner scraped off by the blade 226 is collected in a toner collection bottle 268. At this time, a detection signal for reporting the quantity of toner existing in the bottle is inputted into the IMM sub-system, so that, if the quantity exceeds a predetermined value, an alarm can be given.

In addition, the IMM sub-system operates a fan motor 263 to prevent overheating, so that the environmental temperature is limited within a permissible temperature range to attain stable picture quality in the copied paper.

Figure 15:
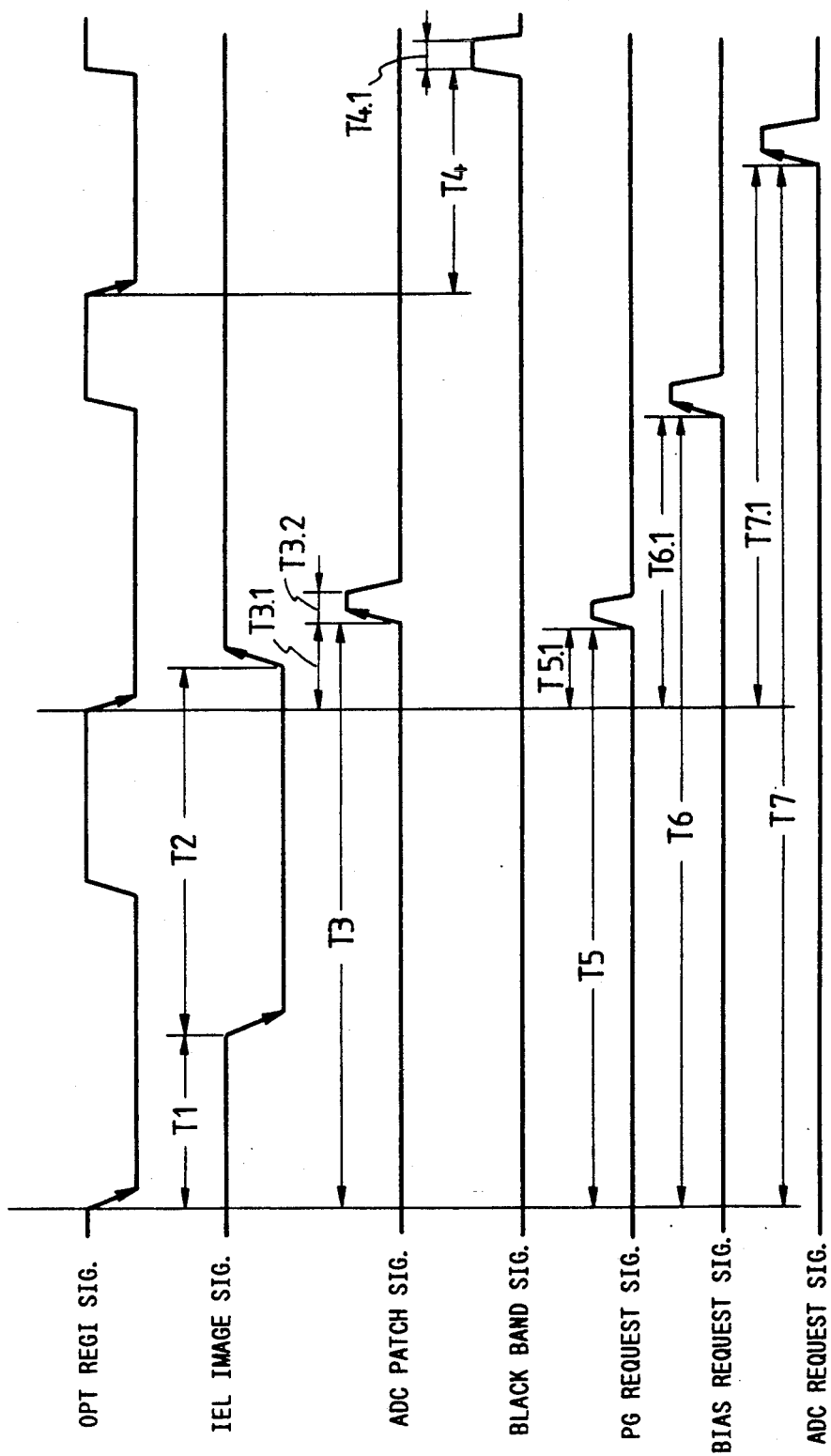
FIG. 15 is a timing chart of the sequence for controlling the marking system.

FIG. 15 is a timing chart. The basic time for controlling is related to the position of the optical registration sensor. After the optical registration sensor ON/OFF signal is continued for a predetermined period (T1), the IEL is turned off. In other word, the IEL is in the ON state for a period T1 to erase the forward end of the image, whereas the IEL is turned on again with the passage of a period T2 to erase the back end of the image. Thus, image formation is made by the IEL image signal. At the same time, the forward end of the paper is adjusted to the forward end of the image at the tacking point by controlling the registration-gate timing. After the image formation is finished, the ADC patch signal is generated on the basis of the patch generator request signal (with the passage of T5 from the basic time) to generate an inter-image patch. After the generation of the patch, the bias request signal is given (with the passage of T7) to detect the toner density. Further, a black band is formed in the inter image area on the basis of the black band signal.

During the AE (auto exposure) scanning period, the ON/OFF operation of the IEL image signal is not carried out.

(II-3) Paper feed system

Figure 16:
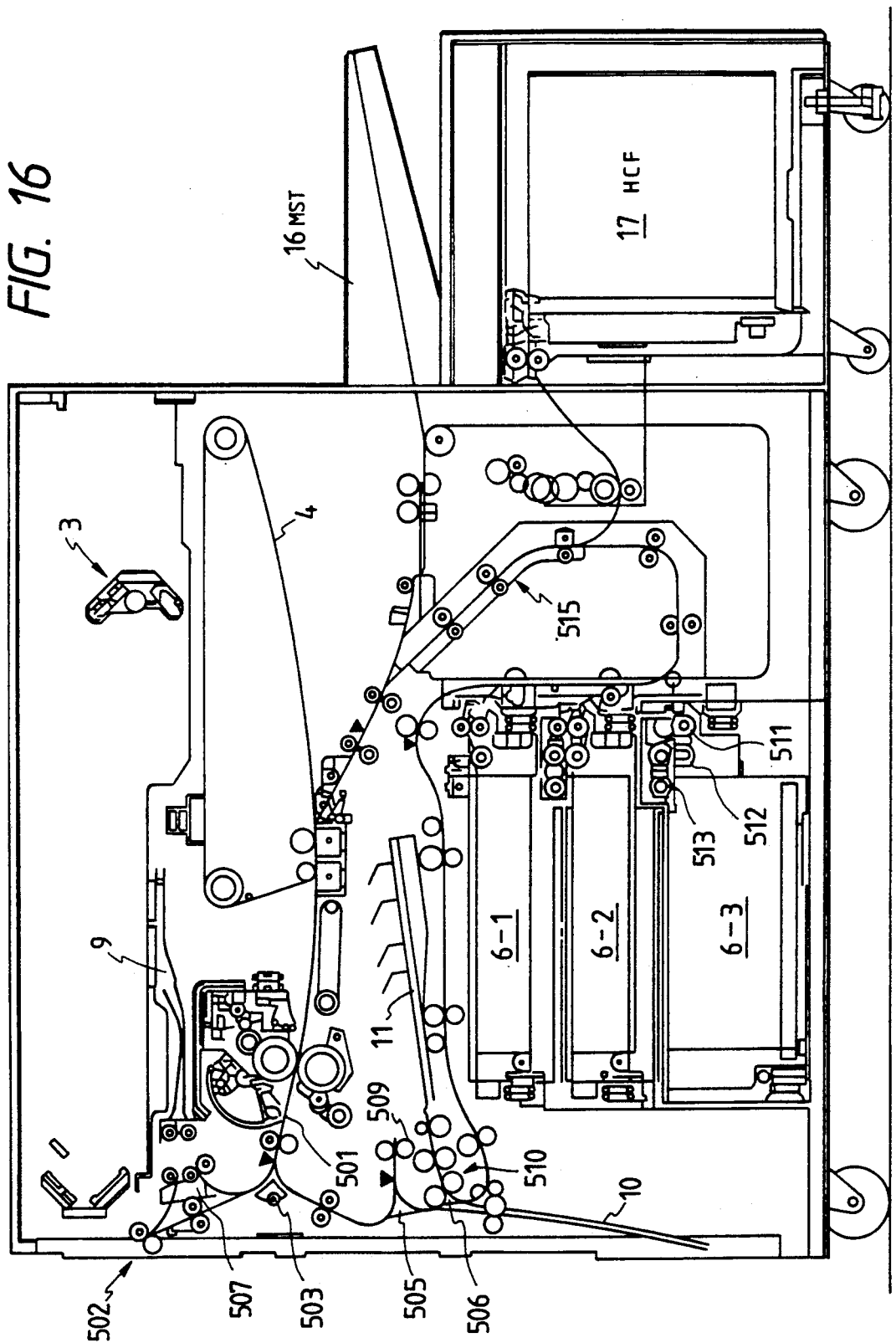
FIG. 16 is a side view for explaining a paper conveyance system.

In FIG. 16, paper trays such as an upper tray 6-1, a middle tray 6-2, a lower tray 6-3 and a duplex tray 11 are installed in the base machine. Further, a huge capacity tray (huge capacity feeder HCF) 17 and a hand-feeding tray (multi-sheet inserter: MSI) 16 can be optionally attached to a side of the base machine. Each tray has a "no paper" sensor, a size sensor, a clutch, etc., if necessary. The "no paper" sensor is a sensor for detecting the presence of copy paper housed in the supply tray. The size sensor is a sensor for discriminating the size of copying paper housed in the tray. The clutch is a part for the ON/OFF control of the operation of each paper feed roll. If copying paper of the same size is provided in more than one supply tray when the supply of copying paper in one supply tray has run out, copying paper of the same size is automatically supplied from another supply tray.

The feeding of copying paper is made by an exclusive-use feed stepping motor. Whether the feeding of copying paper is normal or not is detected by a feed sensor. A gate solenoid for registration is used for adjusting the forward end of the copying paper which has been sent out. The gate solenoid is different from a general type solenoid. In the gate solenoid used herein, the gate is opened to pass copying paper when energized. Accordingly, it is not necessary to supply electric power to the gate solenoid in the standby state. In the standby state, the gate is kept open without the supply of electric power. Accordingly, electric power is saved. Just before the arrival of copying paper, the gate solenoid is energized so that the gate is closed to block the passage of copying paper. Thereafter, at the point of time that the feeding of copying paper should be restarted, the electric supply for the gate solenoid is stopped in predetermined timing so that the gate is opened. According to the aforementioned controlling system, the positional change of the gate is reduced at the point of time when the passage of the forward end of the copying paper is blocked, so that exact positioning can be made even in the case where copying paper is pressed to the gate by a relatively strong force.

In the case of a duplex mode used for copying on both sides of the paper or in the case of a composite mode used for applying a plurality of copying operations to a single side of paper, copying paper is guided to a conveyance path to be stacked on the duplex tray 11. In the case of the duplex mode, copying paper is stacked onto the duplex tray 11 directly from the conveyance path. In the case of the composite mode, copying paper is once conveyed from the conveyance path to a composite mode inverter 10 for inverting the copying paper and the inverted copying paper is guided to the duplex tray 11. A gate 503 is provided in a junction of the conveyance path 501 from which the path is bifurcated, one to an exit 501 for outputting paper to a sorter and the like and the other to the duplex tray 11. Gates 505 and 506 for switching the conveyance path are provided in duplex tray 11-side junctions for guiding paper to the composite mode inverter 10. A gate 507 is provided in the paper exit 502, so that the paper inverted by the tri-roll inverter 9 can be exhausted from the paper exit 502, the copied surface being face up.

Figure 17:
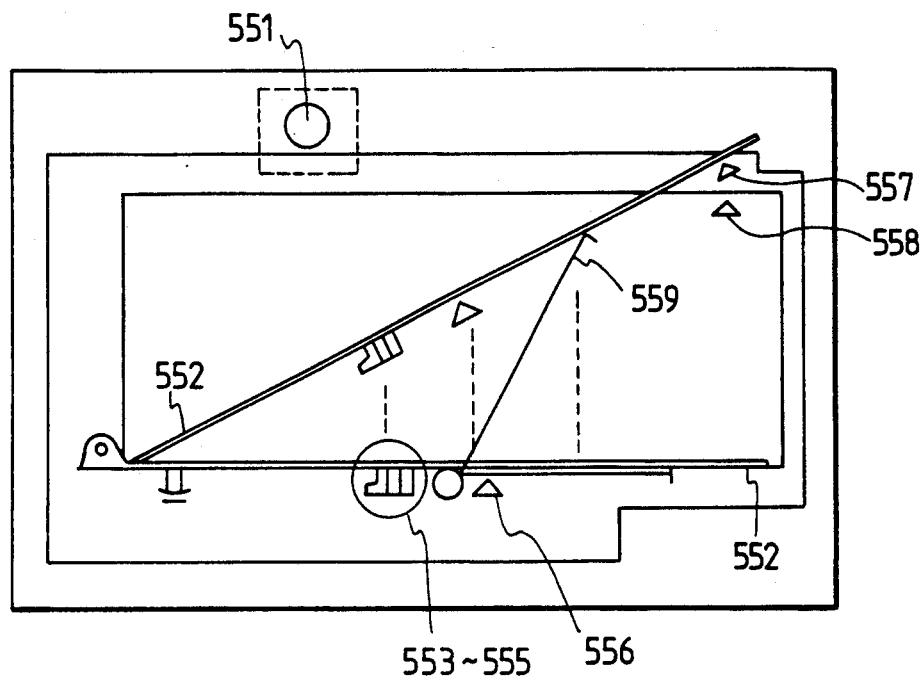
FIG. 17 is a side view of a paper tray.

Each of the upper tray and the middle tray has a capacity for about 500 sheets of paper, the size selected from A3 size to B5 size, legal size, letter size, special B4 size, and 11×17 size. As shown in FIG. 17, the tray is provided with a tray motor 551 for inclining the tray 552 as the quantity of paper is reduced. With respect to sensors, the tray 552 has three paper size sensors 553 to 555 for detecting paper size, a "no paper" sensor 556 for detecting a "no paper" condition, and a surface control sensor 557 used for adjusting the height of the tray. Further, the tray 552 has an emergency switch 558 for preventing the tray from rising excessively. The lower tray has a capacity for about 110 sheets of paper, the size being the same as described above for the upper and middle trays.

Figure 18:
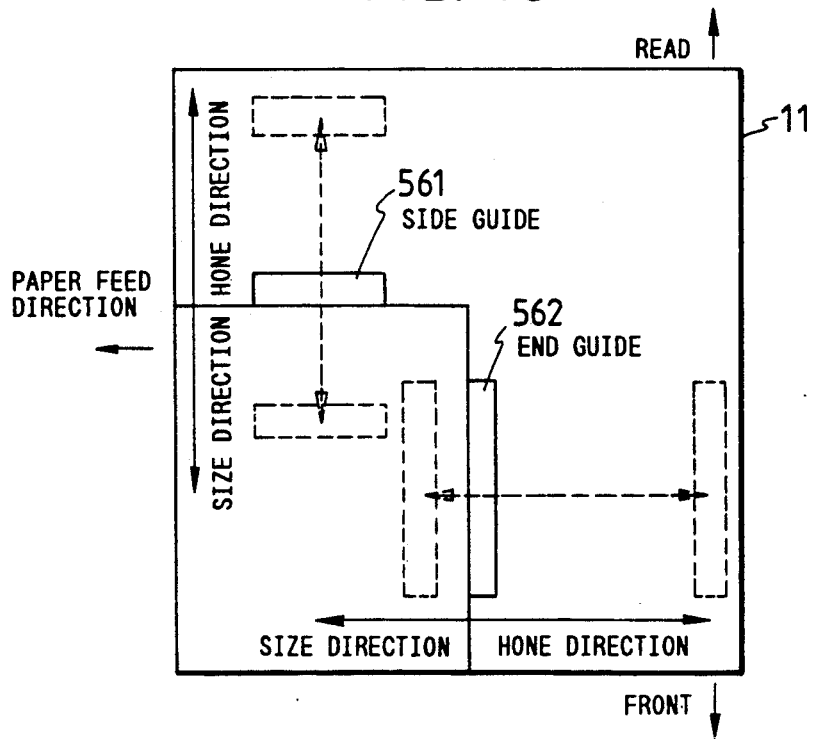
FIG. 18 is a plan view of a duplex tray.

In FIG. 16, the duplex tray has a capacity for about 50 sheets of paper, the size being the same as described above. The duplex tray can store copied paper temporarily in the case where a plurality of copying operations are carried out on one side of the paper or in the case where copying operations are carried out alternately on two sides of the paper. A feed roll 507 and a gate 505 are arranged in the conveyance path in the entrance side of the duplex tray 11. Switching control of the paper conveyance path can be made by the gate 505 corresponding to the composite mode and the duplex mode. For example, in the case of duplex mode, the paper conveyed from the upper tray is guided toward the feed roll 509 by the gate 505. For example, in the case of the composite mode, the paper conveyed from the upper tray is once guided to the composite mode inverter 10 by the gates 505 and 506 and then the paper is inverted by the inverter 10 and guided to the feed roll 510 and the duplex tray 11 by the gate 506. In general, a tray inclination angle of 17° to 20° is required for dropping the paper freely to a predetermined edge position on the duplex tray 11. However, the duplex tray 11 in this embodiment has an inclination angle of 8° or less, because the duplex tray 11 is placed in a narrow space for size reduction of the apparatus. Therefore, the duplex tray 11 has a side guide 561 and an end guide 562 as shown in FIG. 18. These side and end guides serve to control the stop position of the paper in accordance with the size of the paper.

The huge capacity tray (HCF) is a supply tray having a capacity for thousands of copying sheets. For example, in most cases, customers having no need of scale-up or scale-down copying work and customers needing a small quantity of copying work may find adequate a duplicator having a single unit base machine. On the contrary, customers needing a large quantity of copying work and customers needing complicated copying work will likely need the duplex tray and huge capacity tray. As a measure to satisfy such various needs, this duplicator system has a structure so that additional devices can be attached and detached easily. Further, a plurality of independent CPUs (central processing units) are provided for some additional devices so that decentralized controlling is carried out by the plurality of CPUs. This structure has the advantages that articles desired by customers can be obtained easily and the ease of attaching new additional devices suggests to the customers the possibility of new copying work.

The manual insertion tray (multi-sheet inserter: MSI) 16 has a capacity for about 50 sheets of paper, the size selected from A2F size to A6F size. In particular, the tray can handle large-size paper which cannot be housed in the other trays. In the past, this type manual insertion tray performs manual inserting operations one by one, so that it is not necessary for the operator to select the tray itself as long as copying paper can be preferentially sent out of the manual insertion tray whenever the manual inserting operations are made. On the contrary, the manual insertion tray 16 according to the present invention can set a plurality of copying sheets at once. Accordingly, if the sending out of the manual insertion tray 16 is carried out on the basis of the copying paper selected, the feeding of the paper may be started during the setting of the plurality of copying sheets. To settle this situation, the selection of the manual insertion tray 16 can be made by the operator.

According to the present invention, size reduction of the tray is attained by use of such a structure that a nudger roll 513, a feed roll 512 and a take-away roll 511 are incorporated in the tray. When the forward end of paper is detected by a feed-out sensor after the forward end is nipped by the take-away roll 511, the paper is stopped temporarily. By stopping the paper temporarily through the feed-out sensor, pre-registration for adjusting the transfer position is made so that scatter in paper feeding is absorbed at the feeder portion. The paper thus sent out is fed to the transfer position of the sensitive-material belt 4 through an aligning device 515.

(II-4) Duplex auto document feeder (DADF)

Figure 19:
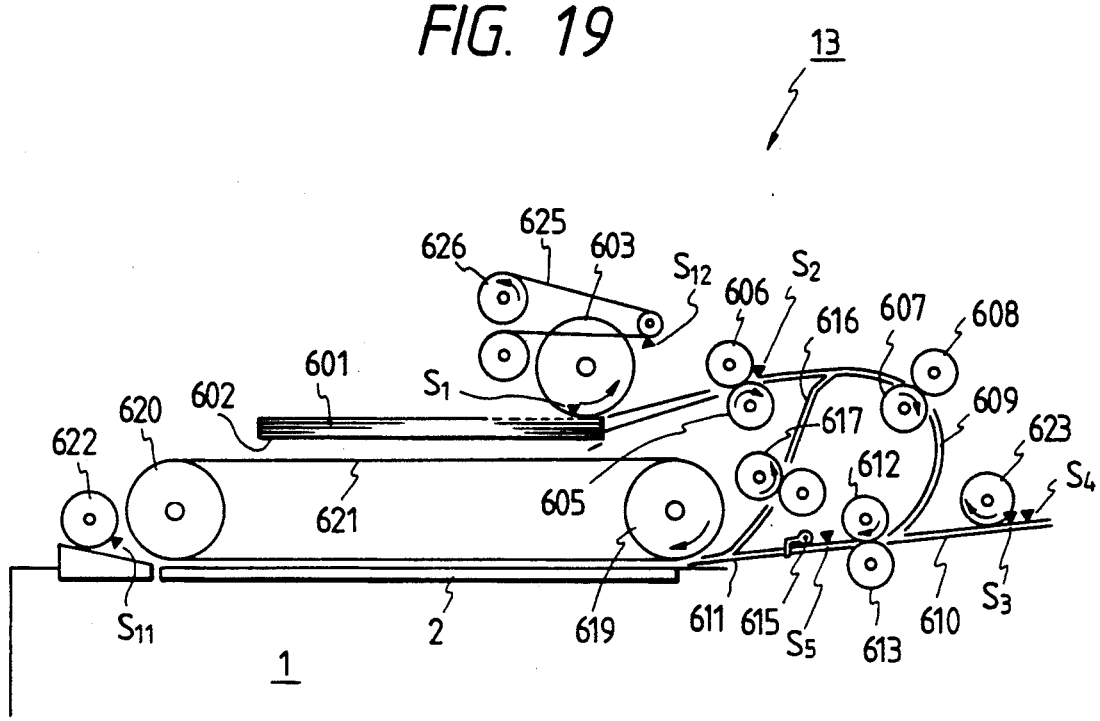
FIG. 19 is a side view of a document automatic feeder.

In FIG. 19, the DADF 13 is attached onto the glass platen 2 of the base machine 1. The DADF 13 has a document tray 602 on which documents 601 are mounted. A feed-out paddle 603 is arranged in the document feeding-out side of the document tray 602 to send out the documents 601 one after one. The document 601 is conveyed to an arc-like conveyance path 609 by a first driving roller 605, a second driving roller 606, and a follower roller 607 following the roller 606. Further, the arc-like conveyance path 609 joins a manual insertion conveyance path 610 to a horizontal conveyance path 611. A third driving roller 612 and a follower roller 613 following the roller 612 are provided in the exit of the arc-like conveyance path 609. The third driving roller 612 is arranged so as to be vertically moved by a solenoid (not shown) so that the third driving roller 612 will contact or be spaced from the follower roller 613. A stoppage gate 615 is provided in the horizontal conveyance path 611 so as to be turned by a driving motor which is not shown in the drawing.

An inversion conveyance path 616 is provided from the horizontal conveyance path 611 to the arc-like conveyance path 609. A fourth driving roller 617 is provided in the inversion conveyance path 616. Further, a belt driving roller 619 is provided on the glass platen 3 opposite to the exit of the horizontal conveyance path 611 to make it possible to reversibly drive a belt 621 provided between the belt driving roller 619 and a follower roller 620 following the roller 619. A fifth driving roller 622 is provided in the exit of the belt conveyance portion.

A pair of sixth driving rollers 623 are provided in the manual insertion conveyance path 610. The pair of driving rollers 623 are arranged in the front and rear of the base machine 1 (perpendicularly to the plane of the sheet of the drawing) to make it possible to feed two sheets of the same-size documents at once. In the drawing the reference numeral 625 designates a cleaning tape for cleaning the surface of the feed-out paddle 603 by the operation of a seventh driving roller 626.

Figure 20:
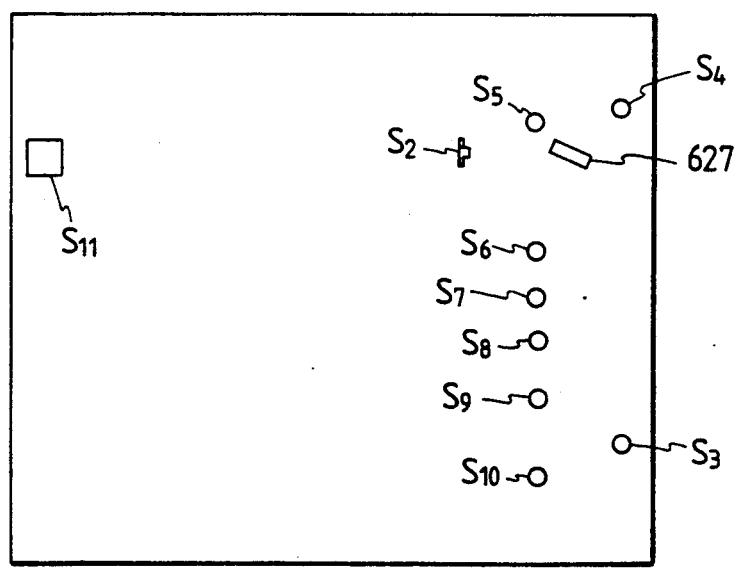
FIG. 20 is a plan view showing an example of an arrangement of sensors.

Referring to FIG. 20, photosensors $S_1$ to $S_{12}$ will be described hereunder. In FIG. 20, the photosensor $S_1$ acts as a "no paper" sensor for detecting the presence of document paper 601 on the document tray 602, the photosensor $S_2$ acts as a takeaway sensor for detecting the passage of document paper, the photosensors $S_3$ and $S_4$ act as feed sensors arranged in the front and rear of the manual insertion conveyance path 610, the photosensor $S_5$ acts as a registration sensor for detecting whether the document paper is located in a predetermined position or not at the stoppage gate 615 after the skew feeding of document paper is corrected by a skew roller 627, the photosensors $S_6$ to $S_{10}$ act as paper size sensors for detecting the size of document paper, the photosensor $S_{11}$ acts as an exhaust sensor for detecting whether the document paper is exhausted or not, and the photosensor $S_{12}$ acts as an end sensor for detecting the end of the cleaning tape 625.

Figure 21A:
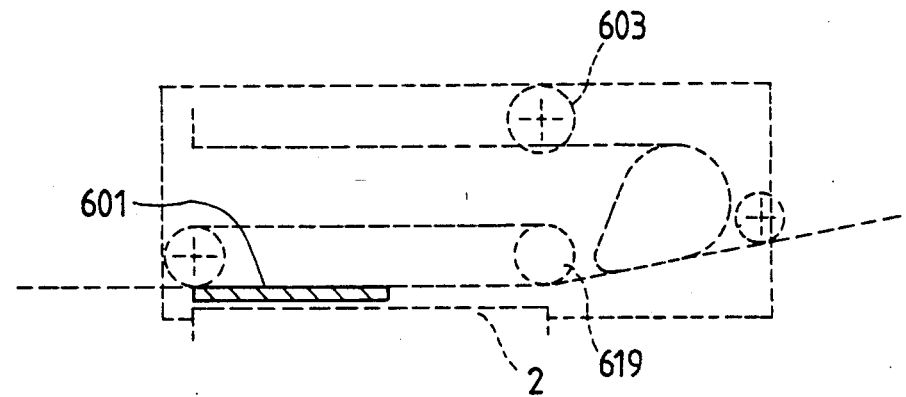
FIGS. 21(a), 21(b), and 21(c) are views for explaining the operation of the document automatic feeder.
Figure 21B:
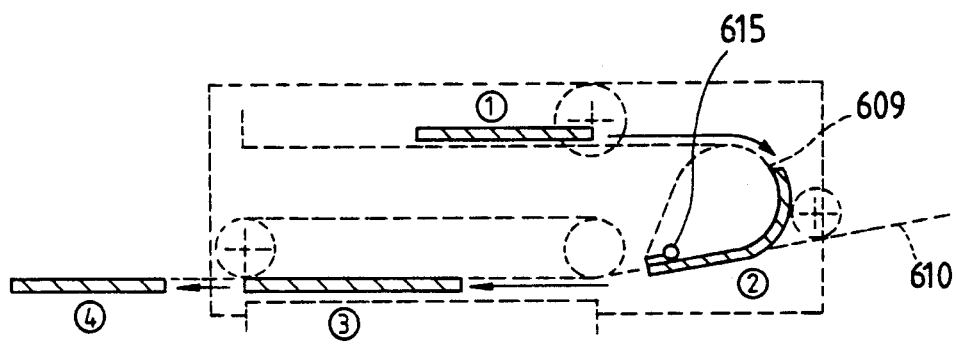

Referring to also FIGS. 21(a), 21(b), and 21(c), the operation of the DADF 13 constructed as described above will be described hereunder. FIG. 21(a) shows a platen mode in which the document 601 is mounted on the platen 2 so as to be subject to exposure. FIG. 21(b) shows a simplex mode in which documents 601 are stacked in the document tray 602 so that each of the documents is put with its surface to be copied facing up. Upon depression of the start button, the first driving roller 605 and the second driving roller 607 begin to rotate. The third driving roller 612 moves up away from the follower roller 613 and, at the same time, the stoppage gate 615 moves down to block the horizontal conveyance path 611. Accordingly, the document 601 is advanced through the arc-like conveyance path 609 and pressed against the stoppage gate 615 (steps 1 and 2). At the position of the stoppage gate 615, the end of the document is corrected by the skew foller 627 to be perpendicular to the horizontal conveyance path 611 and, at the same time, the size of the document is detected by the sensors $S_6$ to $S_{10}$.

The third driving roller 622 rotate, so that the surface of the document to be copied is inverted to be face down. Then the document is fed to a predetermined position on the platen, exposed at the position and outputted after exposure. The aforementioned operation is applied to the case where a single sheet of document is fed through the manual insertion conveyance path 610. In addition to such a function of successively feeding documents sheet by sheet, there are provided a function of feeding two sheets of the same-size documents at once (2-UP), a function of feeding a large-size document (LDC), and a computer form feeder function of feeding continuous paper used for a computer (CCF).

Figure 21C:
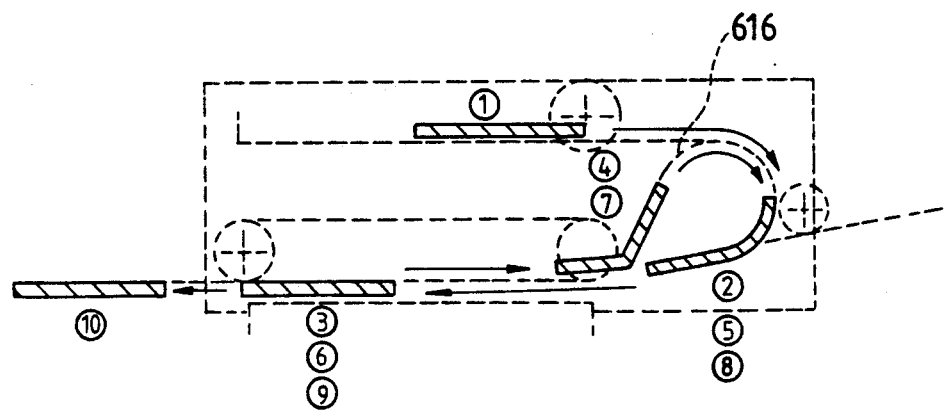

FIG. 21(c) shows a duplex mode. The exposure process for one surface of a document is the same as the process of the steps 1 to 3 shown in FIG. 21(b). After completion of the exposure process on the one surface, the belt driving roller 619 rotates in reverse. The third driving roller 612 moves up away from the follower roller 613 and, at the same time, the stoppage gate 615 moves down to block the horizontal conveyance path 611. Accordingly, the document is conveyed to the inversion conveyance path 616. Further, the document is passed through the arc-like conveyance path 609 by the fourth diving roller 617 and the second driving roller 607 and pressed against the stoppage gate 615 (steps 4 and 5). Then the third driving roller moves down to touch the follower roller 613 and, at the same time, the stoppage gate 615 moves up to open the horizontal conveyance path 611. Then the third driving roller 612, the belt driving roller 619, and the fifth driving roller 622 rotate so that the rear surface of the document is inverted to be face down. The document is fed to the predetermined position on the platen, exposed at this position, and outputted after exposed.

After completion of the exposure on the both surfaces of the document, the belt driving roller 619 rotates reversely so that the document is conveyed to the inversion conveyance path 616 again. Consequently, the document is passed along the platen 2 and outputted by the fifth driving roller 622 in the same manner as described above (steps 7 to 10). Accordingly, the outputted documents are stacked up with their first copied surfaces made to face down, in the original order of the documents in the document tray 602.

(II-5) Sorter

Figure 22:
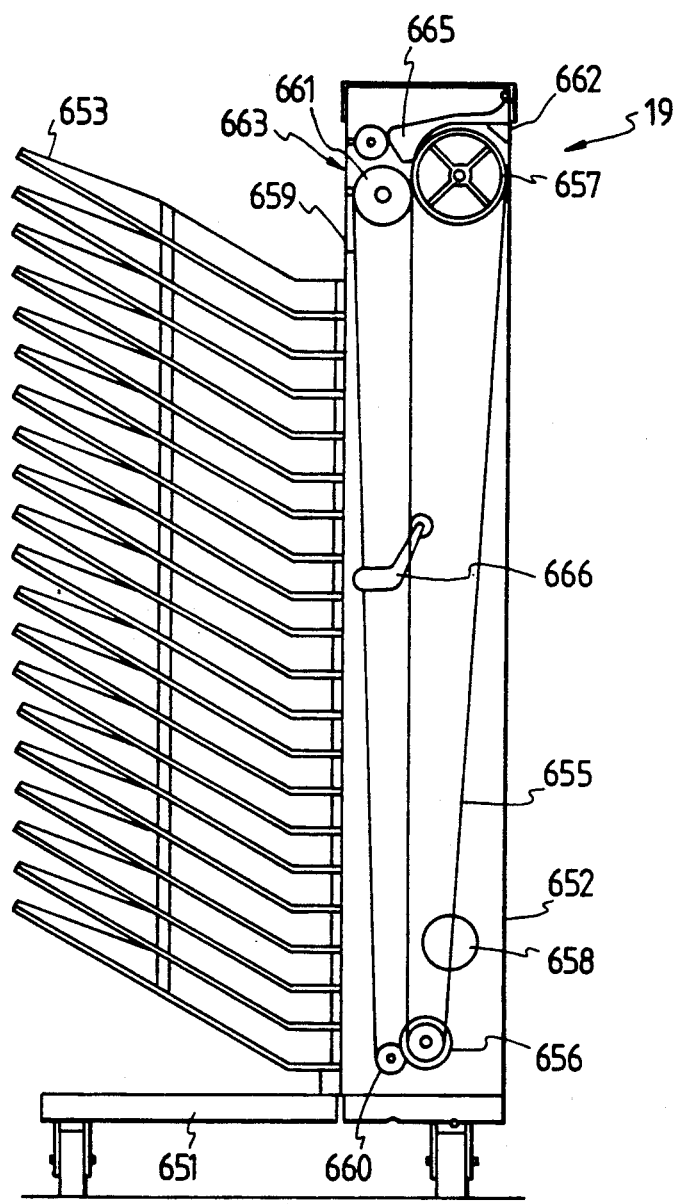
FIG. 22 is a side view showing the arrangement of a sorter.

In FIG. 22, the sorter 19 has a sorter body 652 and twenty bins 653 on a movable truck 651. The sorter body 652 includes a belt driving roller 656 for driving a conveyance belt 655, a follower roller following the roller 656, a chain driving sprocket 659 for driving a chain 659, and a follower sprocket 660 following the sprocket 659. The belt driving roller 656 and the chain driving sprocket 660 are operated by a sorter motor 658.

Figure 23:
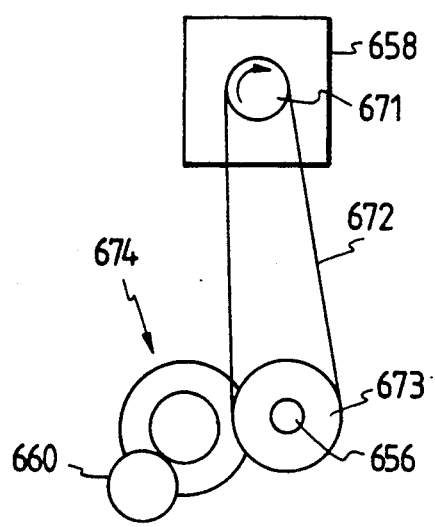
FIG. 23 is a view for explaining a sorter driving system.

A paper entrance 662, a paper exit 663 and a switching gate 665 operated by a solenoid (not shown) are provided in the upper portion of the conveyance belt 655. An indexer 666 for distributing copying paper to each bin is mounted to the chain 659. As shown in FIG. 23, the rotation of a drive shaft 671 of the sorter motor 658 is transmitted to a pulley 673 through a timing belt 672. The rotation of the pulley 673 is transmitted to the belt driving roller 656 and, at the same time, transmitted to the chain driving sprocket 660 through a gearing device 674.

Figure 24A:
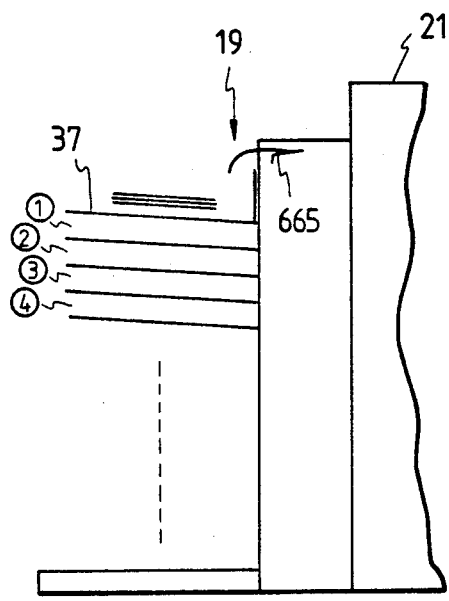
FIGS. 24(a), 24(b), 24(c), and 24(d) are views for explaining the operation of the sorter.
Figure 24B:
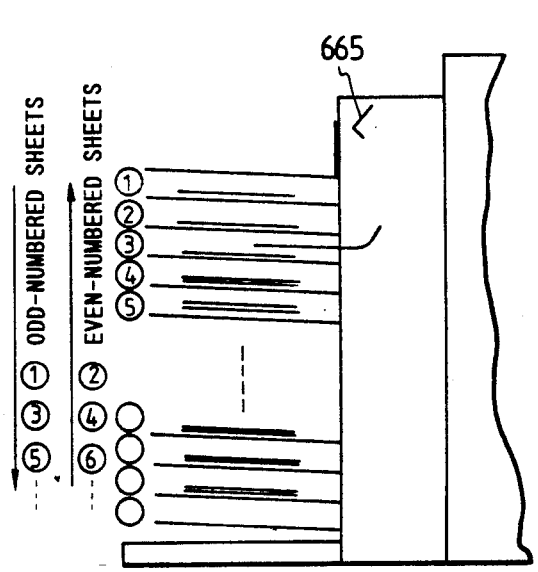
Figure 24C:
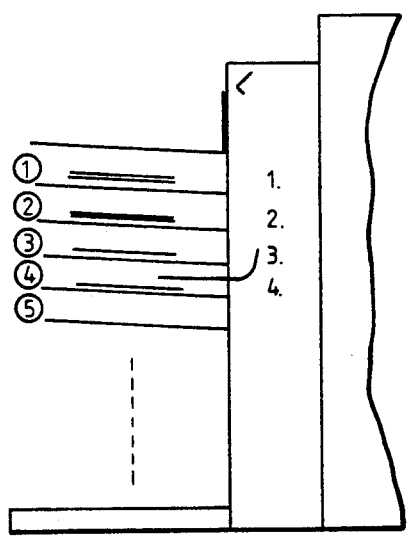
Figure 24D:
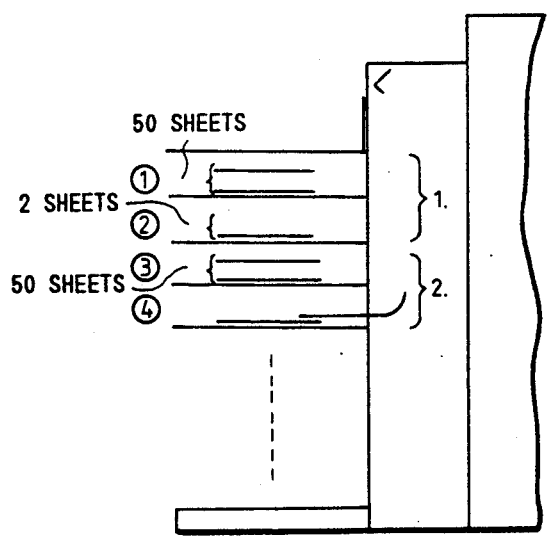

The operation of the sorter will be described with reference to FIGS. 24(a) through 24(d). FIG. 24(a) shows a non-sort mode in which the switching gate 665 is placed in a non-sort position to feed copying paper to the uppermost output tray. FIG. 24(b) shows a sort mode in which the switching gate 665 is turned to a sort position to feed odd-numbered sheets of paper to odd-numbered bins stepwise from the upper bin downward and feed even-numbered sheets of paper to even-numbered bins stepwise from the lower bin upward. By such means, the time require for sorting can be shortened. FIG. 24(c) and 24(d) show a stack mode. FIG. 24(c) shows the case where four sheets of documents are copied onto every four sheets of copying paper. FIG. 24(d) shows the case where the number of sheets of paper exceeds the maximum capacity of each bin. When, for example, the number of sheets of paper exceeds 50, the next bin can be used for housing an excess of the sheets of paper.

(III) User Interface (U/I)

(III-1) Use of the display unit in the user interface

Figure 25A:
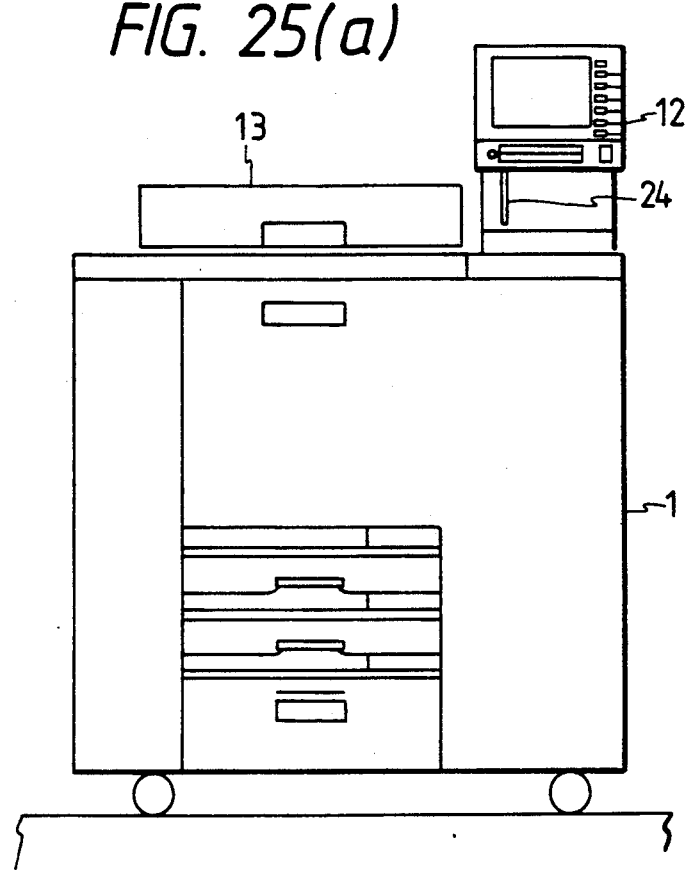
FIGS. 25(a), 25(b), and 25(c) are views showing the condition in which a user interface using a display unit is mounted to the base machine.
Figure 25B:
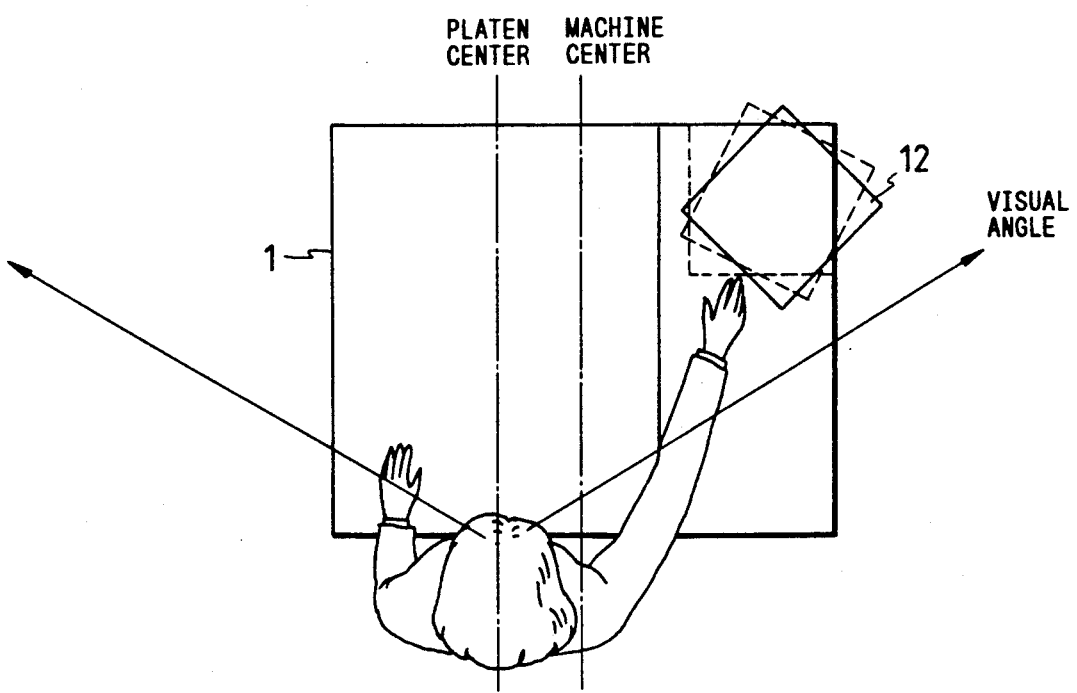
Figure 25C:
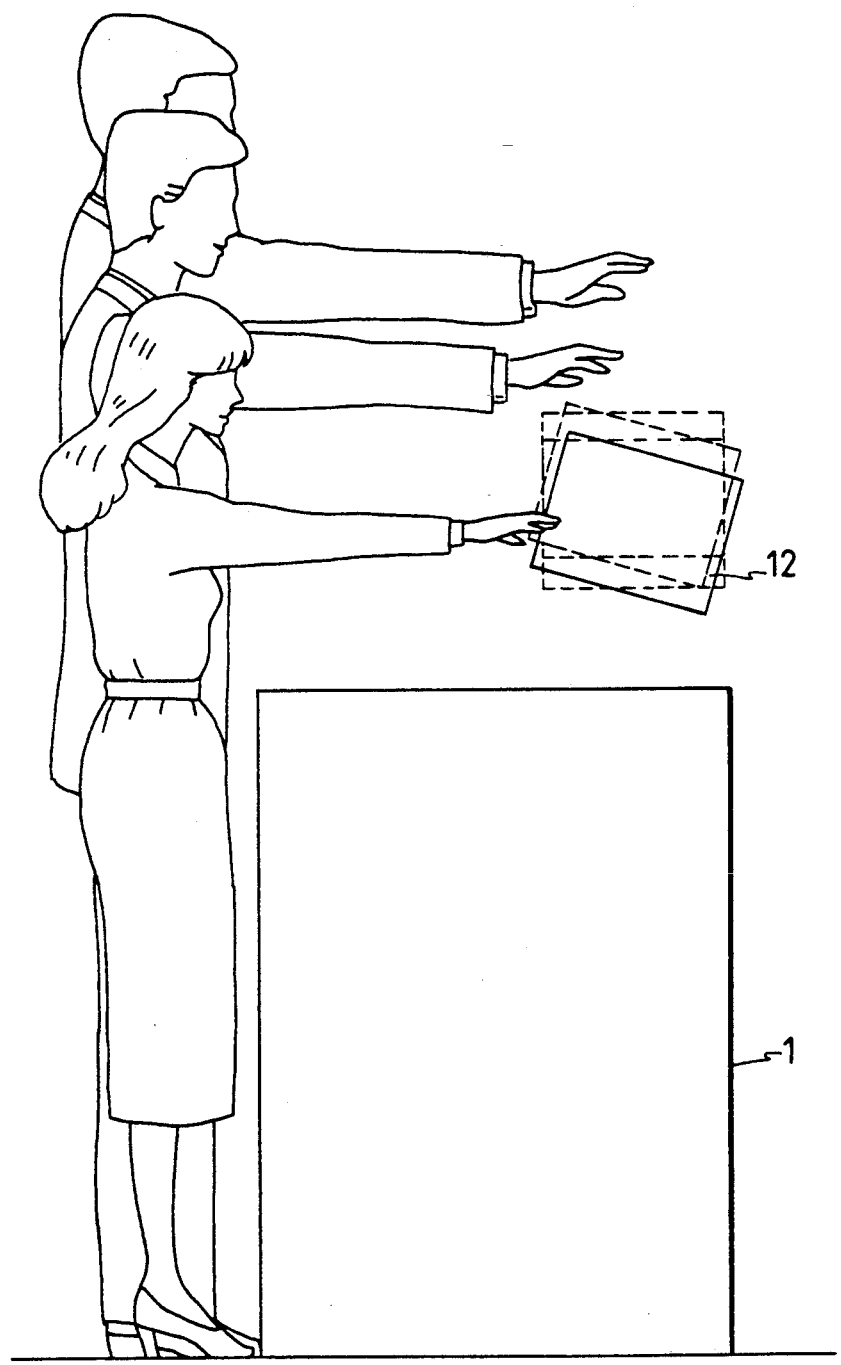
Figure 26:
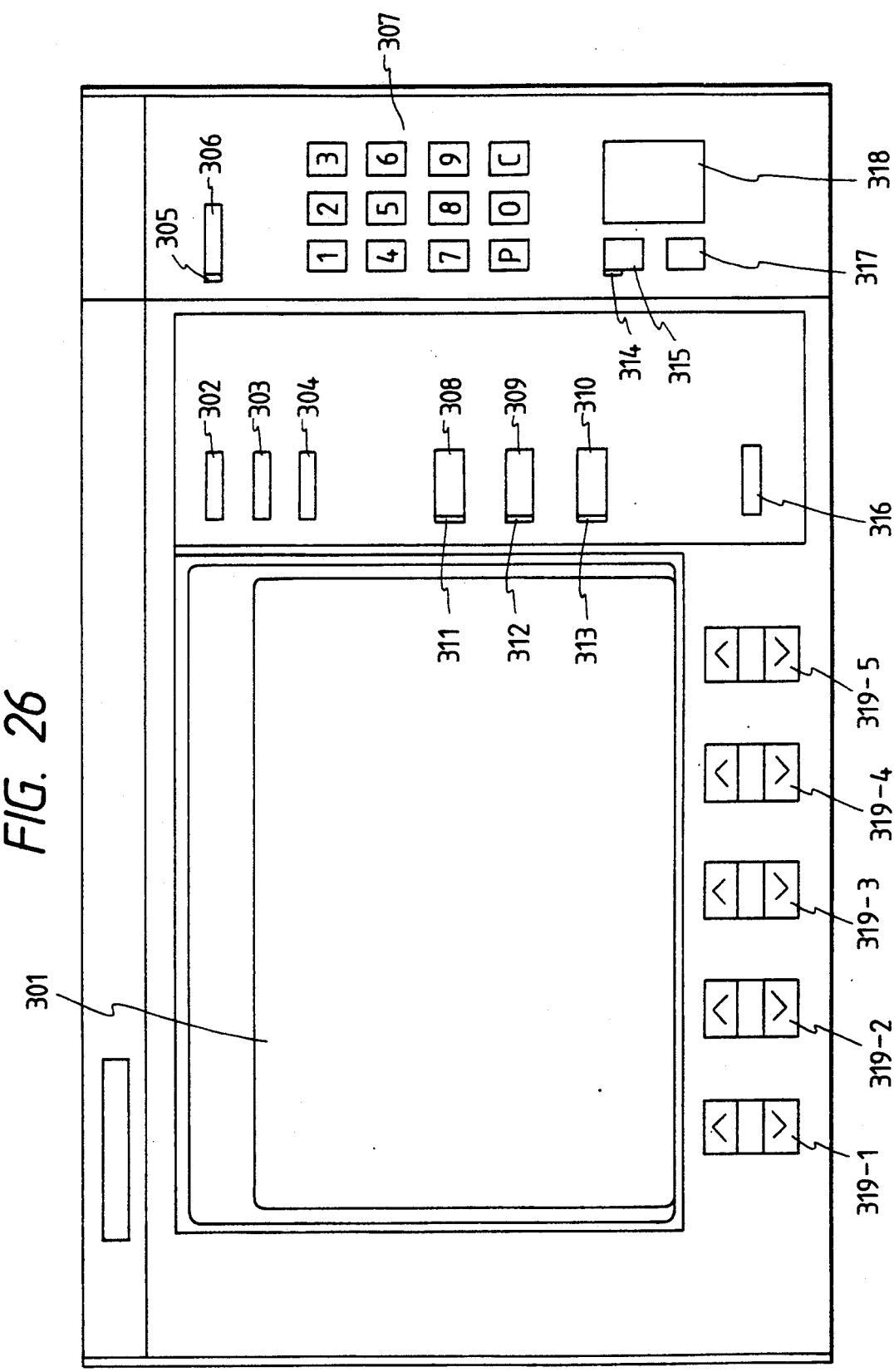
FIG. 26 is a view showing the outside appearance of the user interface using a display unit.

FIG. 25(a) to 25(c) are views showing the mount condition of a user interface using a display unit. FIG. 26 is a view showing the appearance of the user interface using a display unit.

(A) Features in Mount Position

The present invention has a feature in that a stand-type display unit is employed instead of a conventional console panel as described above. The display unit of this type can be attached to the upper portion of the duplicator body (base machine) 1 in a three-dimensioned manner as shown in FIG. 25(a). In particular, by arranging the user interface 12 in the right back corner of the duplicator body 1 as shown in FIG. 25(b), the size of the duplicator can be planned regardless of the user interface 12. Accordingly, size reduction of the apparatus can be attained. Further, the height of the platen in the duplicator, that is, the apparatus height, is planned to be equal to waist height which is favorable for setting a document. This height gives a limitation to the apparatus height. As described above, the conventional console panel is mounted on the upper portion of the duplicator body at a height equal to this height, so that the operational portion and display portion for selecting functions and setting execution conditions are at a long distance from the eyes. On the contrary, the user interface 12 according to the present invention is arranged at a level higher than the platen as shown in FIG. 25(c) or in other words the user interface 12 is arranged at a level near the level of the eyes. Accordingly, for an operator, the user interface 12 is easy to see and easy to handle. Moreover, by mounting the display unit near to eye level, the lower portion of the display unit can be effectively utilized as a mount space of a user interface control substrate and a card device 24. Accordingly, not structural change is required for installing the card device 24.

The card device 24 can be installed without any change of the outside appearance and, the same time, the display unit can be improved in the position and height so as to be easy to see. The display unit may be fixed at a predetermined angle or may be movable within a variable angle range. Another distinction from the conventional console panel mounted at the front of the platen in two dimensions is that the front direction of the display unit can be changed easily. Accordingly, by turning the screen of the display unit slightly upward corresponding to the eyes of the operator as shown in FIG. 25(c) and by turning it to the left side (just toward the eyes of the operator), the user interface 12 is easier to watch and easier to handle. In particular, in the case of small-size apparatus using the aforementioned construction, the operator can set a document and can handle the user interface while he stays in the central position of the apparatus.

(B) Features on Screen

On the other hand, the quantity of information increases as the number of functions increases. To make things simple and easy, a wide display area is required. Even in the case where the display unit is employed, the requirement for such a wide display area makes it difficult to satisfy the requirement for reduction of size. If a small-size display is employed, it becomes difficult to provide all the necessary information on one screen both from the viewpoint of display density and from the viewpoint of making a screen easy to watch and easy to understand for an operator.

Therefore, in the case where a display unit is used in a user interface, not only the size of the display unit must be established to be small from the viewpoint of balance but also it is desired to exercise ingenuity in display control. According to the present invention, various measures for an easily understandable display are made by use of various kinds of display forms and various kinds of display control systems compared with LEDs and liquid crystal display units used in the conventional console panel.

For example, the user interface according to the present invention is constructed so that display screens are switched corresponding to the copy mode classified into three, "basic copy," "applied copy," and "special copy," to display menus for selecting functions and for setting execution conditions in accordance with the mode and that the cascade (cursor) of the display screen is moved by key instructions to make it possible to designate selection branches and input execution condition data.

When the user interface is constructed as described above, it is necessary to have three screens as the target of setting. Because only one screen can be displayed at one time, the set conditions of the other screens may be unknown. The present invention employs a simple screen arrangement by which the set conditions of other screens can be seen at a glance when an attempt to check all of the set conditions is made during display of any one of the three screens.

If necessary, the pop-up display (superposing display or window display) of details is carried out in accordance with the selection branches of the menus to thereby attain the expansion of display contents. As a result, even if there are a large number of functions to be selected and a large number of conditions to be set, the display screen can be sharpened to improve operation property. As screen division arrangement, area division in each screen, luminance adjustment and display form such as gray display form are adopted. The operational portion is simplified in construction by a suitable combination of operation keys and LEDs to diversify and simplify display controlling means, display contents, and input means, to, in combination, solve the problem in realizing both the reduction in size and increase in functions.

The outside appearance of the user interface with the CRT display unit based on aforementioned feature is shown in FIG. 26. In this embodiment, key/LED boards are arranged on the under and right side front surface portions of the CRT display unit 301. With respect to the screen arrangement, a selection mode screen is divided into a plurality of areas including a selection area. Further, the selection area is divided vertically into cascade areas which can be set selectively. Therefore, cascade keys 319-1 to 319-5 for selectively setting the cascades are arranged under the selection area. Further, mode selection keys 308 to 310 for switching the selection mode screen, other keys (302 to 304, 306, 307, 311 to 314) and LEDs (305, 311 to 314) are arranged on the right side. Because the keys and LEDS are reduced in number and arranged on the right side and under side of the CRT display unit 301 as described above, the size of the user interface can be established to be only slightly larger than the size of the CRT display unit and, consequently, a small-size user interface can be provided.

(III-2) Arrangement of display screen

In the user interface according to the present invention, the CRT display unit is utilized so effectively that the arrangement of key/LED boards can be simplified. In particular, ingenuity is exercised in screen division for the purpose of making the screen simple and easy to see to implement the functions of selective setting, checking, and message transmission.

In respect to the screen, there are provided a selection mode screen for selecting the copy mode, a review screen for checking the set condition of the copy mode, an entirely automatic screen for executing a copying operation in a standard mode, an information mode for giving information about the copy mode, a jam screen for exactly indicating the position of a jam (trouble) when the jam occurs, and the like. Further, the selection mode screen is divided into three parts corresponding to the contents of the functions, because it is difficult to display a lot of functions on one screen and because generally used functions and special functions are included in the functions to be displayed. The screens obtained by division can be suitably selected by the mode selection keys 308 to 310 to be displayed, so that a necessary function can be selectively set from each screen. Further, the inside in each of these screens is suitably divided into a selection area, a set condition display are for displaying the set conditions of other modes, a message area and the like, to transmit proper information to the user corresponding to the operational conditions.

(A) Selection Mode Screen

Figure 27C:
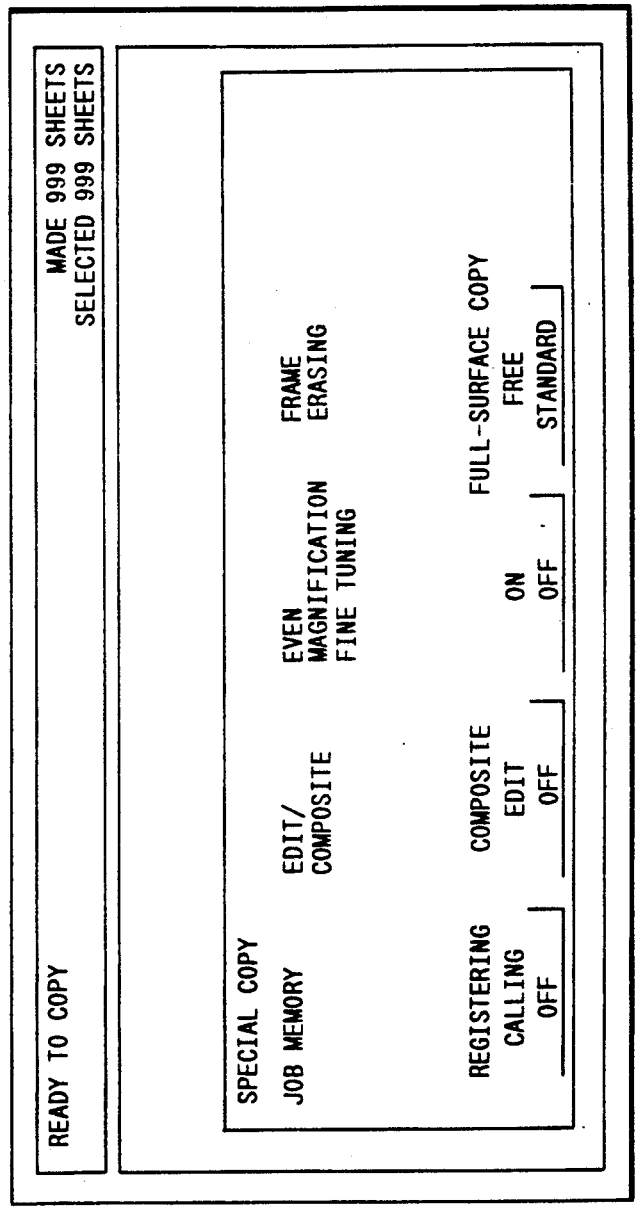

FIG. 27 is a view for explaining the selection mode screen. Three screens of "basic copy," "applied copy," and "special copy" as shown in FIGS. 27(a) to 27(c) are set as the selection mode screen. The three screens are alternatively selected by the operation of the mode selection keys 308 to 310 to be displayed on the CRT display unit. Of these screens, the "basic copy" screen is used for displaying generally and frequently used functions, the functions being into classified into groups. The "applied copy" screen is used for displaying secondarily frequently used functions, the function being classified into groups. The "special copy" screen is used for displaying the remaining, special functions which are classified into groups. The "special copy" screen is used for displaying the remaining, special functions which are classified into groups.

Each of the selection mode screens is partitioned into a message area A composed of two lines inclusive of the second line from the top on the screen, a set condition display area B composed of three lines, and a selection area "C" composed of nine lines. J-code messages for informing contradiction in copy executive conditions, U-code messages for informing hardware trouble needing to contact a service man, C-code messages for giving various kinds of warnings to the operator, and the like, are displayed in the message area A. Of these messages, the J-code massages are issued when an erroneous copy mode is detected just after the operation of the start key 318, by reference to a table provided for checking the combination of copy execution conditions against the set contents of each cascade. The conditions of selection of other modes, such as for example the conditions of selection of "applied copy" and "special copy" on the "basic copy" screen, are displayed in the set condition display area B. In the case where the state of the cascade in the selection area C is a default (the lowermost step), the cascade is displayed.

Cascade names are displayed in the upper step of the selection area C. Each of the cascade areas is separated into a default area and other areas, the default area being arranged in the lowermost step of the cascade area, the other areas being arranged in the upper steps thereof. Consequently, any suitable matter can be selected from the five cascade areas individually by the operation of the cascade keys. Accordingly, if there is no selection operation, the default area is selected so that a completely automatic copy mode having all default values is selected. Selective setting in the selection area is made by the cascade keys 319-1 to 319-5 disposed under the five corresponding cascade areas obtained by vertical division. The right side of the message area A is used as a count portion for displaying a set count and a mode count. The lower line of the set condition display area B is used as a maintenance information portion for informing the current level of the toner bottle, the supply of toner and the like. The contents of the cascade areas in the respective selection mode screens will now be described.

(a) Basic Copy:

As shown in FIG. 27(a), the "basic copy" screen is composed of cascades of "Paper Tray," "Scale-Down/-Scale-Up," "Duplex Copy," "Copy Density" and "Sorter."

In the "Paper Tray," "automatic" is selected as a default. In this case, a tray housing paper of the same size as the select document size will be automatically selected. Any suitable one of the manual insertion tray, the huge capacity tray, the upper tray, the middle tray, and the lower tray can be selected by operation of the cascade keys. Paper size, kind and icon (pictorial symbols) are displayed in the respective tray columns to make it easy to discriminate the paper housed in the respective trays. There are provided two setting methods, that is, a method of setting paper to be fed in the longitudinal direction and a method of setting paper to be fed in a direction perpendicular to the longitudinal direction.

In "Scale-Down/Scale-Up," "even magnification" is selected as a default. Any suitable one of "auto" and "fixed/free" modes can be selected by the operation of the cascade keys. In the "auto" mode, the magnification is set automatically corresponding to the paper size selected. The magnification (linear magnification) can be set within a range of 50% to 200% stepwise in increments of 1%. In the "fixed/free" mode, various settings are displayed by the operation of the cascade keys, so that a fixed magnification can be selected, for example, from the seven steps of 50.7%, 70%, 81%, 100%, 121%, 141% and 200% and variable magnification can be selected from the multiple values changing stepwise at intervals of 1%.

Single sided copying is selected as a default. Otherwise, any one of Duplex→single-side, duplex→duplex, and single-side→duplex can be selected in the relation of document→copy. For example, duplex→single-side is selected to make a single-sided copy from a double-sided document and, similarly, simplex→duplex is selected to make a double-sided copy from a single-sided document. In the case where a double-sided copy is to be made, after one side has been copied on the copying paper, it is fed to the duplex tray. Then the copying paper is sent out of the duplex tray again so that the other side may be copied.

The default value of "Copy Density" is "auto," although any one of, for example, seven density levels can be set. Also in the photographic mode, any one of seven density settings can be selected.

The default value of "Sorter" is "copy receiver," although any one of "gather" and "stack" can be selected. In the "gather" mode copies are distributed into each bin of the sorter. In the "stack" mode copying paper is accumulated in order.

(b) Applied Copy:

As shown in FIG. 27(b), the "applied copy" screen is composed of cascades of "Special Document," "Binding Margin," "Color," "Paper Insertion" and "Exhaust Surface."

In the "Special Document" mode, a function (LDC) for making a copy from a document of large size such as A2/B3, a function (CFF: computer form feeder) for making a copy from a continuous computer output document by means of counting holes of the document, and a two-sheet function (2-UP) for copying two sheets of the same-size documents onto a single sheet of paper can also be selected.

In the "Binding Margin" mode, a binding margin in the right side of the copy or in the left side of the copy can be selected from the range of 1 mm to 16 mm. The margin for right binding and left binding can be set.

The default value of "Color" is "black," although "red" can be selected.

The "Paper Insertion" function causes a blank sheet of paper to be inserted between copies in the case of OHP copy.

The "Exhaust Surface" function enables either the front surface or rear surface to be selected as the surface of the document that faces up on output.

(c) Special Copy:

As shown in FIG. 27(c), the "special copy" screen is composed of a cascade of "Job Memory," "Edit/Composite," "Even Magnification Fine Tuning" and "Frame Erasing."

The "Job Memory" function is a page program using cards for registering a plurality of jobs and for calling any suitable one of the registered jobs. By pushing the start key after calling a job, automatic copying is carried out. In the "Job Memory," the calling and the registration can be selected outside of the default values.

In the "Edit/Composite" function, an editor function and a composite function can be selected outside of the default value. The editor function is a function for inputting data for editing by use of an editor or the like. In the editor function, any suitable one of "partial color," "partial photograph," "partial erasing," and "marking color" can be selected on a pop-up screen. The "partial color" is used for copying a designated area with a color and copying the other area with black. The "partial photograph" is used for copying a photograph to a designated area. The "partial erasing" is used to prevent a designated area from having copied. The "marking color" function is used for designating an area to be marked with a thin color. When, for example, an area to be marked is designated by the "marking color," a recording can be made with a thin color overlapping on the designated area as if the effect of marking is attained.

The "Composite" function is a function for making one copy from two documents by use of the duplex tray. In the "Composite" function "sheet composite" and "parallel composite" can be selected. The "sheet composite" function makes one copy from a first document and a second document by superimposing the whole images of the two documents on one sheet. In the "sheet composite" mode, different colors can be used for the first document and second document, respectively. The "parallel composite" is a function for making one copy from two documents by arranging the whole of the second document to the first document side by side.

The "Even Magnification Fine Tuning" function selects magnification within a range of 99% to 101% stepwise at intervals of 0.15%. The function can be selected the outside of default values.

The "Frame Erasing" function excludes peripheral picture information of a document as if the picture information of the original has a frame at the periphery. In the "Frame Erasing" mode, 2.5 mm-wide framing is used as a default value. The setting of any suitable framing size or a full-surface copy mode without framing (frame erasing) can be selected outside of the default values.

(B) Other Screens:

FIGS. 28(a) to 28(d) shows screens other than the selection mode screens.

(a) Review Screen:

The review screen is provided to display the conditions of copy modes selected from the selection mode screen divided into three parts. As shown in FIG. 28(b), the set conditions of the cascades of the selection mode screen divided into three are displayed on one screen. In the review screen, selection items, that is, cascade names and selected modes, that is, selection branches, are displayed. For example, in the case where the selected mode is the default mode, "gray or black" is employed. For example, in the case where the selected mode is not the default mode, "inversion display" with general luminance for the background is employed. By discriminating the non-default state from the default state, the selection branches are made prominent particularly in the case of the non-default mode changed from the entirely automatic mode.

In respect of the arrangement of the screen, three steps are displayed to separate the three copy modes of "basic copy," "applied copy," and "special copy". The display positions in the screen correspond to the positions of the mode selection keys, so that the changing operation from the review screen to the respective mode screen can be made easily. The operator can check the set conditions of the respective cascades by reference to the display, so that handling property can be improved to reduce copy error.

(b) Entirely Automatic Screen:

The entirely automatic screen is a screen as shown in FIG. 28(a). When the electric supply is powered on, the preheat key 306 is operated (released) in the preheat mode, or the all clear key 316 is operated, the completely automatic screen appears in which all of the cascades of the respective selection mode screens are set at the default values. After a document is set on the platen, the number of copies is set by the ten key keypad and the start key 318 is pushed in accordance with the instructions displayed on the screen, copy paper of the same size as the size of the document is selected automatically and the copying operations are repeated for the set number of copies.

Figures 28C, 28D:
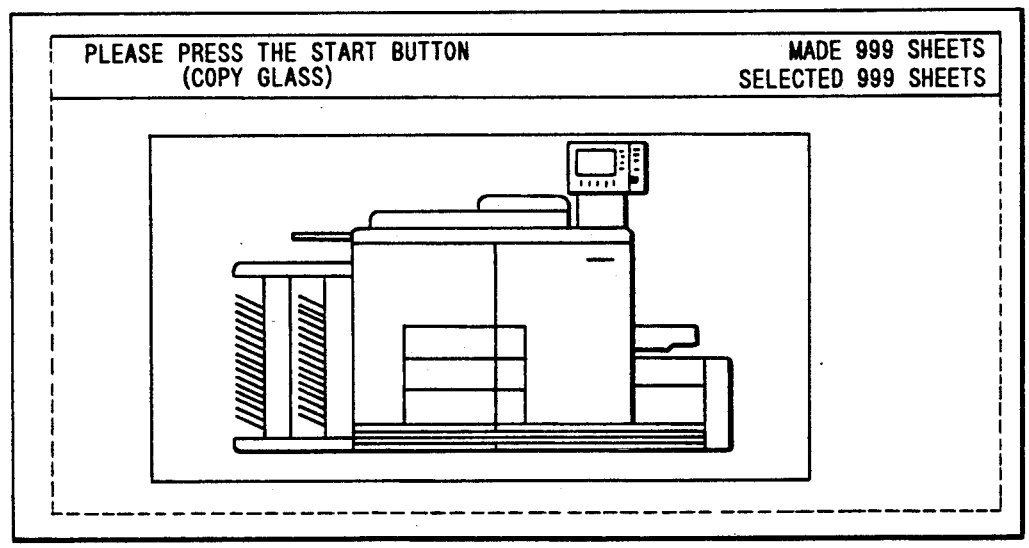

(c) Information Screen:

The information screen, as shown in FIG. 28(c), is a screen for giving explanatory information such as how to make a copy and what a copy mode means. The menu of the explanatory information is displayed by the operation of the information key 302. Further, individual explanatory information is displayed by inputting any suitable one of information codes displayed on the screen.

(d) Jam Screen:

The jam screen is displayed, overlapped on the current screen displayed during execution of a copying operation as shown in FIG. 28(d). The contents of the jam screen become clearer as the luminance of the document screen is excessively reduced.

Figure 29A:
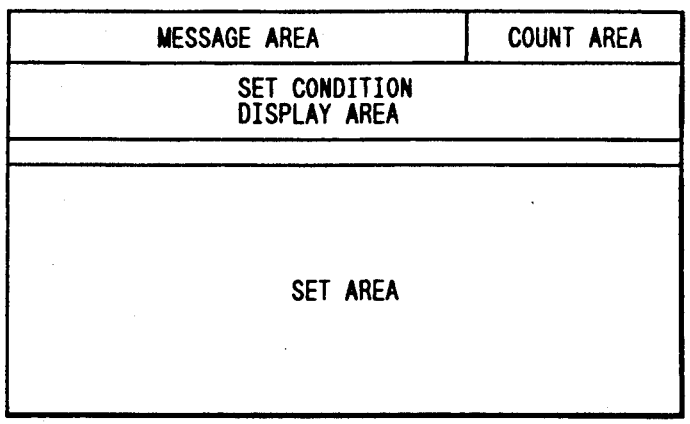
FIGS. 29(a), 29(b), and 29(c) are views showing examples of screen layout.
Figure 29B:
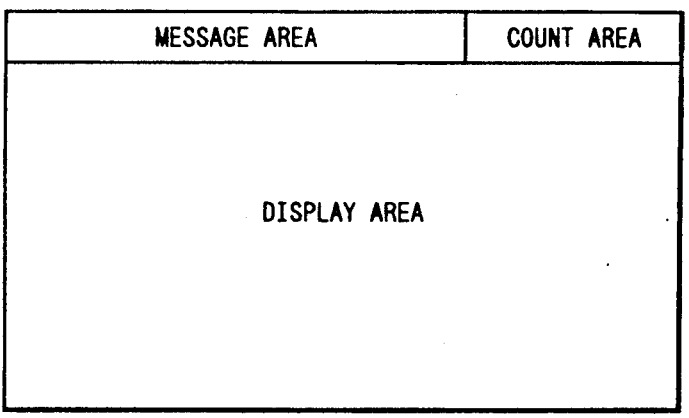
Figure 29C:
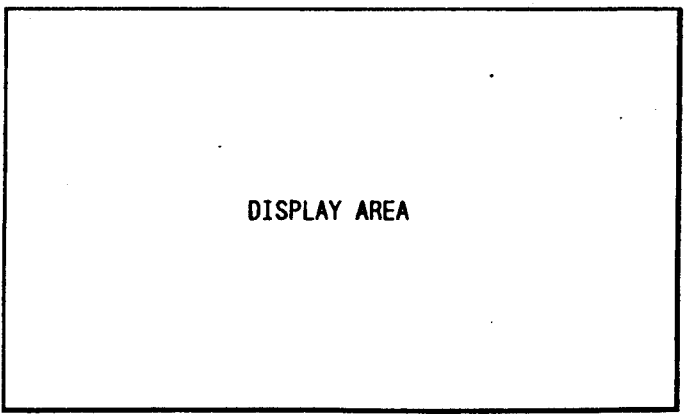

(C) Display Form:

FIGS. 29(a) to 29(c) are views showing various screen layouts. As described above by reference to FIGS. 27 and 28, excessive or unnecessary information is temporally removed by division into a plurality of screens to be selectively displayed, so that information in one screen can be simplified. These screens are classified into screen layouts as shown in FIGS. 29(a) to 29(c). Specifically, FIG. 29(a) shows a screen layout in the selection mode screen, FIG. 29(b) shows a screen layout in the review mode screen, the fully automatic mode, the editor input mode, the job program mode, or the like, and FIG. 29(c) shows a screen layout in the preheat mode, the burning prevention mode, the information mode, the diagnostic mode or the like.

According to the present invention, a screen that is informative, simple and easy to read is formed by changing the display form corresponding to the display regions of these layouts, the input set conditions, and the like. For example, in the case of the selection mode screen in the layout as shown in FIG. 29(a), the message area (containing the count area), the set condition display area (containing the maintenance information area), and the selection area which are formed by division of the screen have different display forms. For example, in the message area containing a count portion, a string of characters of the message are displayed at high luminance against a black background so that the same expression as that of a back-lit type console panel can be employed to make the display appear natural and simple. In the set condition display area, the background may be displayed by halftone like meshes or by dots arranged at a predetermined uniform density. The display portion for cascade names may be oppositely displayed with characters having dark against a light background.

In this display, a three-dimensional appearance can be obtained more effectively by expressing the respective cascade names by card images and by edging the card images. The lower line in the set condition display area may be used as a maintenance information area for informing the full capacity of the toner bottle, the supply of toner, and the like, but the information is different in nature from the set condition display information. Therefore, the same display form as that of the massage area is employed in the maintenance information area so that the difference can be recognized clearly.

On the other hand, in the selection area, the surroundings are displayed by half tone images; the whole of the cascade display area may be displayed with gray which is low in luminance; and the selection branches and the cascade names may be displayed in reverse. Furthermore, in addition to the display, the background of the area of the selection branches may be displayed at a high luminance. Further, in the paper tray cascade in the basic copy screen, the selection branches of paper-out trays may be displayed so that characters are light and the background is black.

The completely automatic screen as shown in FIG. 28(*a*) refers to the screen layout as shown in FIG. 29(*a*). In this screen, the background of the display area is displayed in the form of dark meshes while the area for expressing operational instructions such as "Set Document" is displayed in the form of light meshes with the boundary being accentuated by edging, so that the sharpness of the display can be improved. As described above, it is a matter of course that various changes and combinations as to the display form of the background may be made suitably.

In particular, a feeling of three-dimensional viewing can be attained by making edging as shown in the drawing, for the boundary of the area in which the background is displayed with a high luminance with low luminance gray halftones or predetermined dot density being used to show fine effects of light and darkness. The image of the cards are provided to the operator so that the operator can work easily and simply in the same manner as if ordering items by cards. As described above, by performing edging display while changing the display form of the background for the respective areas, the display contents of the respective areas can be discriminated clearly to provide screens that are easy to watch. Also in respect to the display of characters, reversal display and blinking display can be used for the purpose of directing the attention of the user to particular display information.

The present invention is also characterized in the display of icons (pictorial symbols) for the selection branches, and the use of cascade names and other character strings, as well as ingenuity is the selection of the difference in luminance between character and background as described above. For example, in the basic copy screen, pictorial symbols are added to the heads of cascade names "Scale-Down/Scale-Up," "Duplex Copy," "Copy Density," and "Sorter". Further, in the selection branches of "Paper Tray," pictorial symbols are added to the tails of the displayed paper sizes of the lower, middle, and upper trays. The icons transmit information to the user visually and symbolically to intensify the impression of character strings. Accordingly, the use of icons has the advantage that necessary information can be transmitted to the user more exactly and intuitively in some cases, when compared to the use of only character strings.

(III-3) Key/LED board

As described above, the user interface according to the present invention is composed of a CRT display unit and key/LED boards. Because the screen of the CRT display unit is used for displaying the selection branches and the selection thereof, the key/LED boards are arranged to minimize the number of required keys and LEDs.

Accordingly, in order to utilize the CRT display unit effectively as described above, the arrangement of display contents is made by division of the screen to be displayed on the CRT unit and by division of the area in each screen, thus to attain a plurality of easy to watch screens. For example, the selection mode screen is divided into "basic copy," "applied copy," and "special copy" screens to be displayed selectively and, futhermore, the selection area of each screen is divided into five cascade areas to that the selective setting of functions can be made in each of the cascade areas. The selection/setting of functions can be made by eight keys; mode selection keys 308 to 310 for switching screens and cascade keys 319-1 to 319-5 for selecting cascade areas. Accordingly, after any one of "basic copy," "applied copy" and "special copy" is selected by the mode selection keys 308 to 310, all functions can be selected automatically or by the operation of the cascade keys 319-1 to 319-5 and the ten key keyboard 307 for minimal input.

Each of the cascade keys 319-1 to 319-5 is composed of a pair of move keys for moving up and down the set cursor in a corresponding cascade area for the purpose of selection/setting of functions. In respect to the selection mode screen, only one screen selected from the three screens by the mode selection keys 308 to 310 can be displayed. Therefore, the LEDs 311 to 313 are used for indicating which of the mode selection keys 308 to 310 has designated the screen. In short, when a selection mode screen is displayed by the operation of any one of the mode selection keys 308 to 310, a corresponding one of the LEDs 311 to 313 is lit.

As the number of functions increases, it becomes difficult for the operator to learn all functions and to handle them well. Therefore, the information key 302 is used for providing an explanatory screen for every copy mode. This information function is carried out as follows. Assuming that the information key 302 is operated, a list of information codes is displayed on an information index screen as shown in FIG. 28(*c*). When one of the information codes designated by the screen is selected by the operation of the ten keypad 307, a corresponding information pop-up screen appears as an explanatory screen for the designated copy mode.

The selection mode screen is divided into three parts and various functions defined in the three screens are selected and set. It is desirable to be able to review all set conditions inclusive of the set conditions of other screens. The review key 303 is used for checking all set conditions by calling a review screen. When the key is operated, a review screen as shown in FIG. 28(*b*) is called to display the set conditions related to all screens of "basic copy," "applied copy," and "special copy".

The dual language key 304 is a key for switching the language in the display screen. It may well be that a plurality of users using different languages will use a common machine. Upon such circumstances, display data and font memories using two languages, for example, Japanese and English, are provided so that any suitable one of Japanese and English will be selected/-displayed by switching the display data and the font memories by the operation of the dual language key 304. It is to be understood that the invention is not limited to the specific embodiment and that three or more languages may be selected by the operation of the dual language key 304.

The preheat key 306 is used for setting a preheat mode to shut down the device if it is not used in a preset time period and thus save electric power while shifting rapidly from the shut down state to the copying state. The switching between a prehead mode and an entirely automatic mode is made by the operation of the preheat key 306. Accordingly, the LED 305 is used for indicating which of the two modes is selected.

The all clear key 316 is used for clearing the duplicator or in other words the all clear key 316 is used for changing the mode to the completely automatic mode which is set by default in the respective selection mode screens. Accordingly, the completely automatic mode screen is displayed by the operation of the all clear key 316. As shown in FIG. 28(a), the contents of the screen inform the operator that the currently used copy mode is the completely automatic mode.

The interrupt key 315 is used to make an emergency copy during a continuous copying operation. When the interrupt processing started by the interrupt key 315 is finished, the interruption is released automatically to return the machine to its former condition. The LED 314 is used for indicating whether the interrupt key 315 is has been used to set an interrupt state or a released state. The stop key 317 is used for stopping copying.

The start key 318 is used for starting copying after the selection of functions and the setting of execution conditions.

(III-4) Construction of user interface control system

Figure 30:
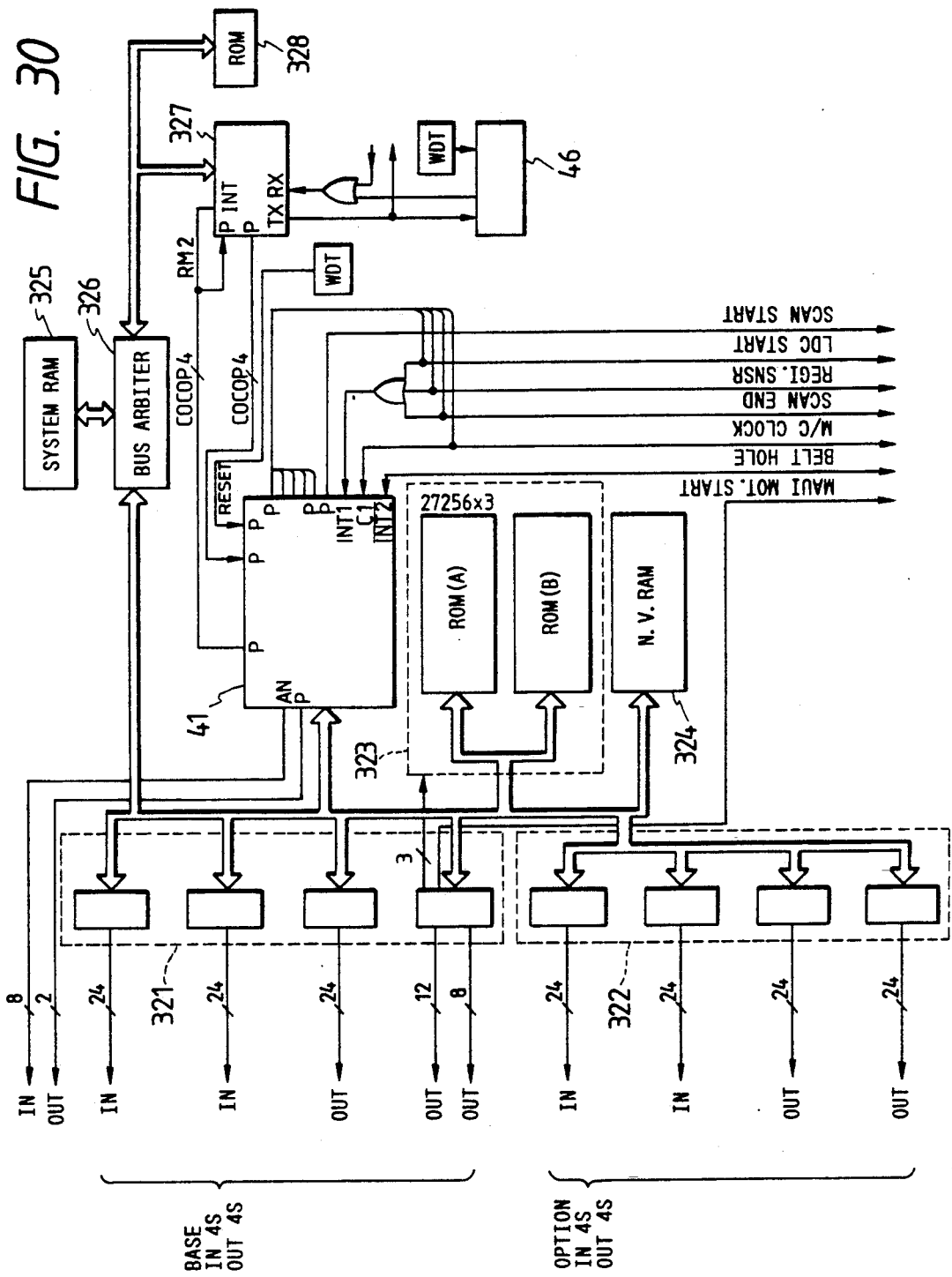
FIG. 30 is a diagram showing the relationship between a U/I CPU and a main CPU connected by a serial communication path.
Figure 31:
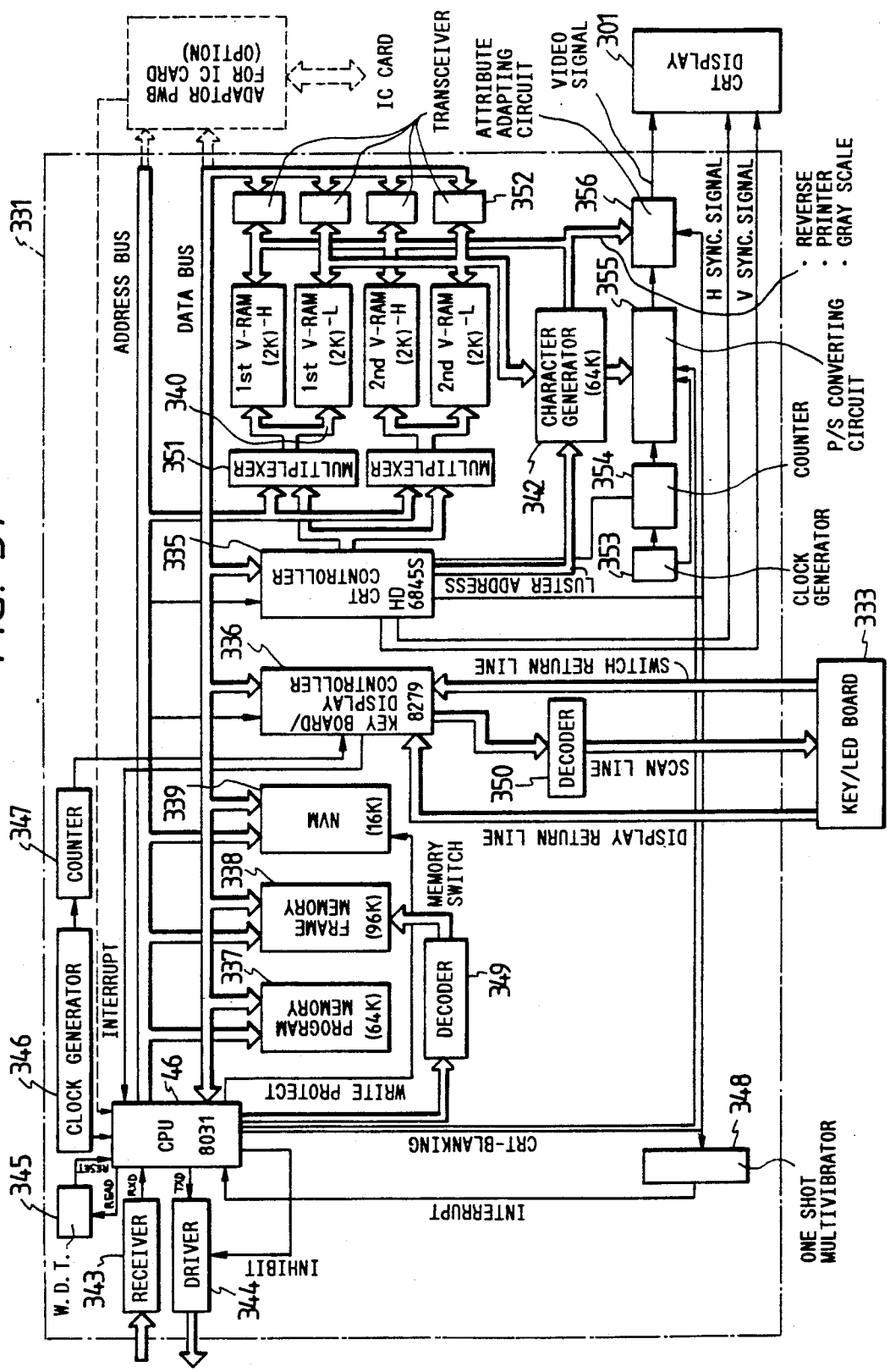
FIG. 31 is a diagram showing the hardware arrangement of the user interface.
Figure 32:
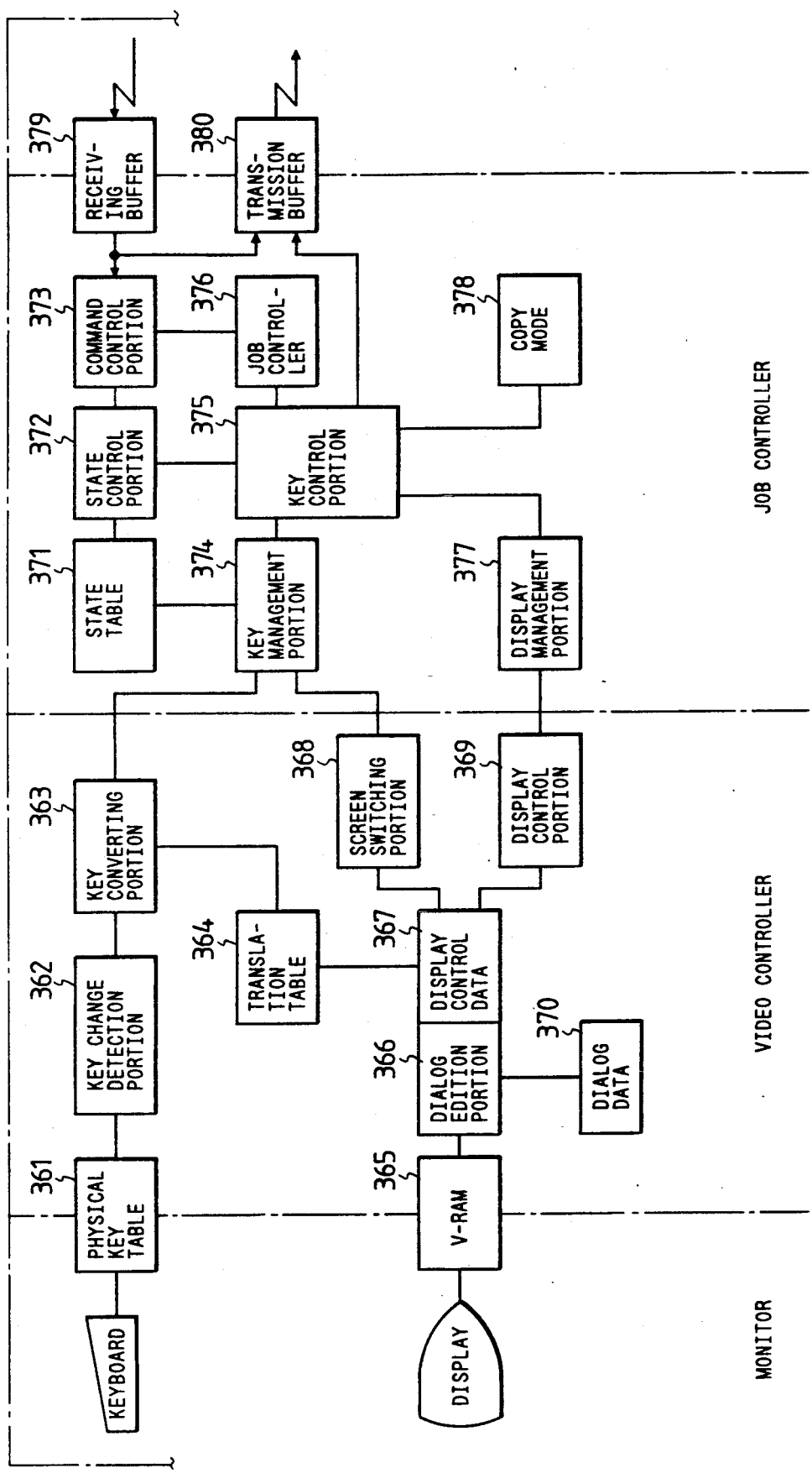
FIG. 32 is a diagram showing the software arrangement of the user interface.
Figure 33:
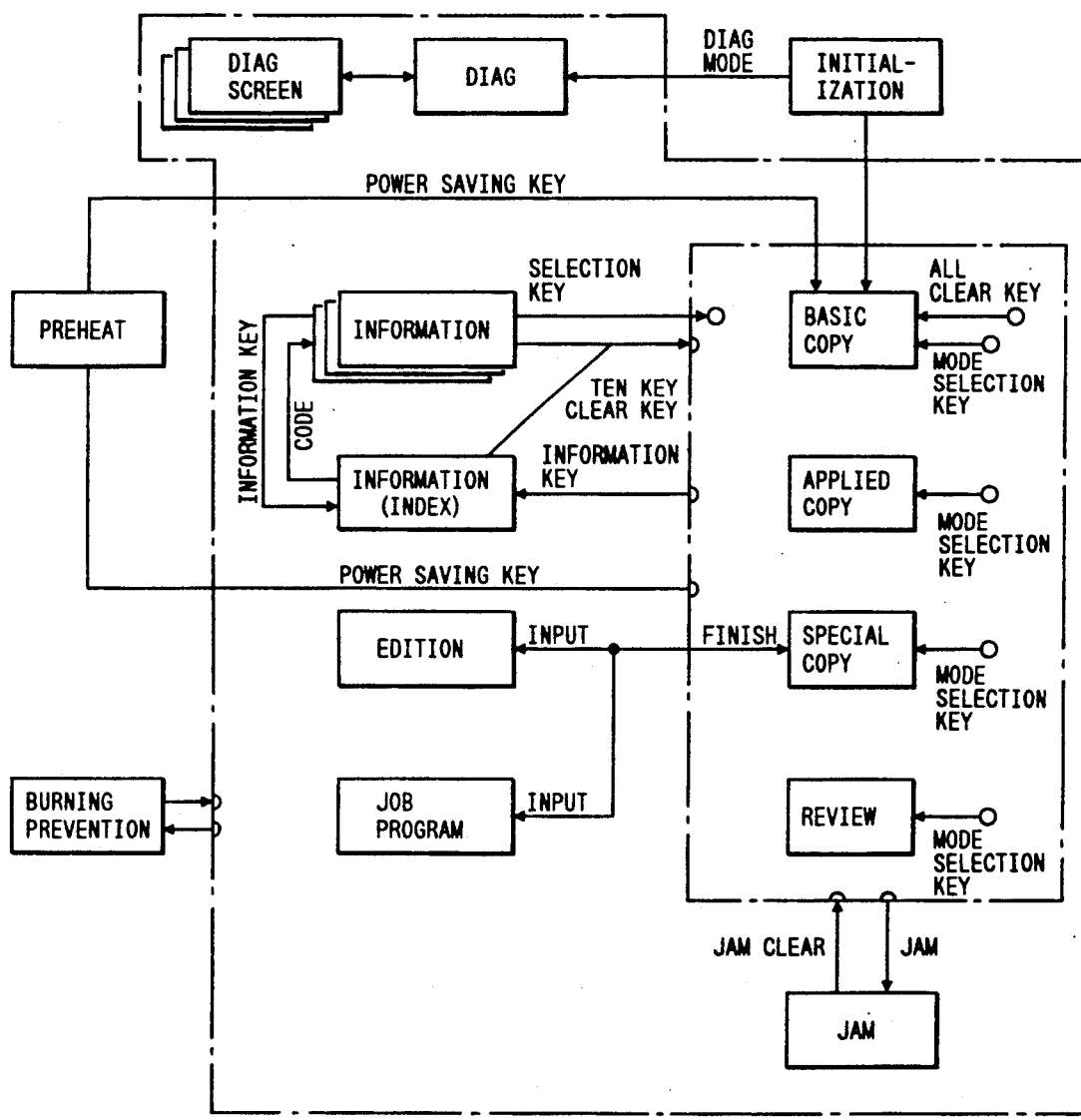
FIG. 33 is a diagram for explaining the switching control of screens.

FIG. 30 is a diagram showing the relationship between the U/I CPU and the main CPU connected by serial communication. FIG. 31 is a diagram showing the hardware arrangement of the user interface. FIG. 32 is a diagram showing the software arrangement of the user interface. FIG. 33 is a diagram showing screen switching control.

(A) Hardware Arrangement

As shown in FIG. 30, the main CPU 41 has an ROM 323, an NVRAM (nonvolatile memory) 324, an interface 321 for exchanging data with the base machine, and an interface 322 for exchanging data with the additional devices (OPTION). The bus is connected to a communication control circuit 327 through a bus arbiter 326 so that the main CPU 41 can communicate with the U/I CPU 46 and other CPUs on s serial communication line through the communication control circuit 327.

The ROM 323 stored programs including sub-systems such as a sequence manager as explained above, an imaging module, a copy handling module, and the like. The bus arbiter 326 includes a system RAM 325 that holds data sent from the main CPU 41 to another CPU and data received from another CPU so that the main CPU 41 can exchange data asynchronously with respect to the timing of serial communication. The ROM 328 stores communication programs for performing data exchange on a serial communication line by the communication control circuit 327. As another method, the main CPU 41 may be constructed so that all of the communication functions related to the bus arbiter 326 and communication control circuit 327 can be conducted by the main CPU 41. The sequence manager sub-system in the main CPU 41 monitors the conditions of respective sub-systems by serial communication. Upon reception of a copy mode signal from the user interface, the sequence manager sub-system gives work instructions to the respective sub-systems so that copying work can be carried out efficiently in predetermined timing.

As shown in FIG. 1, the user interface system provided with the U/I CPU 46 is composed of a CRT substrate 331, a CRT display unit 301, and a key/LED board 333. The CRT substrate 331 has a U/I CPU 46 for general control, a CRT controller 335 for controlling the CRT display, and a keyboard/display controller 336 for controlling the key/LED board 333. In respect to memories, the CRT substrate 331 further has a program memory (ROM) 337 for storing frame data, a RAM 339 including a nonvolatile memory part for storing tables and display control data and for providing a work area, a pair of V-RAMs (video RAMs) 340, a character generator 342, and the like.

The transmission/reception of data between the main CPU 41 and the U/I CPU 46 in the CRT substrate 331 is made by a serial communication line through a driver 334 and a receiver 343. In the drawing, TXD is a transmission signal from the CRT substrate 331 and RXD is a receiving signal to the CRT substrate 331. A clock generator 346, for example, a quartz oscillator of 11.0592 MHz., generates a fundamental frequency of, for example, 0.9216 MHz by dividing the frequency of 11.0592 MHz by 1/12 in the inside of the U/I CPU 46. In the communication of the U/I CPU 46, a transfer clock is set by dividing the fundamental frequency into a number of parts (1 to 256, programmable) by an inside timer. Accordingly, the fundamental frequency of 0.9216 MHz may be divided to provide transfer clock of 9600 Hz (9600 BPS as a transmission bit rate).

The U/I CPU 46 receives a machine state signal from the main CPU 41 and receives an operation signal of the key/LED board 333 from the key board/display controller 336, so that the U/I CPU 46 performs the functions of switching screens to be displayed on the CRT display unit 301, setting copy modes, and generating messages to be displayed on the CRT display unit 301.

The input processing of the operation signal of the key/LED board 333 is made as follows. When the start key 318 is operated, the current copy mode is checked. If the mode is not erroneously sey, the U/I CPU 46 transmits the copy mode to the main CPU 41. If the copy mode is erroneously set the U/I CPU 46 generates a J-code message and processes the message to be displayed on the CRT display 301.

In the display processing of the CRT display 301, a code for the character generator is set corresponding t the display screen and is written in the V-RAM 340. Information for setting the code for the character generator has been stored in the frame memory 338, After the code is written in the V-RAM 340, dot data is read from the character generator 342 under the control of the CRT controller 335 in synchronization with the raster address and is then converted into serial data by a parallel-to-serial converting circuit 355 to be displayed on the CRT display unit 301.

A watchdog timer (W.D.T.) 345 serves to check the excursion (excursive running) of the U/I CPU 46. When a specific address, for example, any address in the data area of from 7000 to 77 FF, is read by the U/I CPU 46, the watchdog timer 345 is reset. Accordingly, a measure counter of the U/I CPU 46 can be made by providing a program arranged so that the specific address is read in 150 μs, because, in the case of the excursion of the U/I CPU 46, the specific address cannot be read in 150 is so that the watchdog timer (W.D.T.) 345 is not reset.

The keyboard/display controller 336 produces a key/LED scanning time of 4.98 μs as follows. The output of the clock generator 346 which is inputted into the U/I CPU 46 is multiplied by ¼ by a counter 347 to obtain a clock frequency of 2.7648 MHz. Then the clock frequency is further multiplied by 1/27 by a prescaler to obtain a frequency of 102 kHz. Thus, the key/LED scanning time of 4.98 μs is produced. If the scanning time is too long, two much time is required for detecting the input and the problem arises in that the input data cannot be fetched when the key operation time of the operator is short. On the contrary, if the scanning time is too short, the frequency in operation of the CPU becomes so high that the throughput becomes low. Accordingly, it is necessary to select an optimum scanning time on consideration of such circumstances.

(B) Software Arrangement

As shown in FIG. 32 with respect to the software arrangement, the user interface is composed of a monitor having the functions of I/0 control, task control and communication protocol, a video controller having the functions of key input control and screen output control, job selection judgment, mode decision and the like. In respect to key input, physical key information is processed by the video controller. Then the job controller exercises job control while recognizing the mode and checking the condition of acceptance. In respect to screen display, the job controller makes screen control on the basis of information as machine state information and selection mode information and issues an interface command to the video controller, so that the video controller executes the command to perform screen edition and drawing. A key change detection portion 362 as will be explained later and other blocks for performing data processing, data generating and data controlling are respectively taken as a predetermined program unit (module). Although these constituent units (modules) are used for the convenience of explanation, it is a matter of course that some module may be partly constituted by a plurality of modules and that some module may be totally constituted by a plurality of modules.

In the video controller, the key change detection portion 362 serve to detect double by depression and continuous key depression by reference to the physical key table 361. A key converting portion 363 serves to convert the currently depressed and thus detected physical key into a logical key (logical information) and request the job controller to check the condition of key acceptance of the logical key (current key). The translation table 364 serves as a reference table by which the key converting portion 363 converts the physical key. Logical information associated with the cascade key varies according to the screen. Accordingly, the conversion of the physical key into the logical key is controlled by reference to the display screen information of the display control data 367.

The screen switching portion 368 receives a key acceptance signal and a logical key from the job controller or receives a logical key directly from the key converting portion 363 in the inside of the video controller. If the received logical key is a screen switching key used for calling a "basic copy" screen or a "applied copy" screen or used for developing a pop-up screen by cascade movement, that is, if the logical key is not related to mode updating and state updating, the display screen number which is one of the display control data 367, is updated to a corresponding screen number. Therefore, logical keys for developing such a pop-up screen are stored in the form of a table in the screen switching portion 368 in advance. In the case where one of the logical keys is operated and other keys are not operated for 750 msec, the display control data 367 is updated to develop a corresponding pop-up screen. In the process of selecting a selection branch, there is the case where a certain selection branch to develop a pop-up screen is selected temporarily by the operation of cascade keys. In this case, the aforementioned processing is carried out to prevent such a pop-up screen from developing in error. Accordingly, when the inputting through other keys is made in 750 msec, the logical key is ignored as a temporary key though it is provided to develop a pop-up screen. In the case of updating states, such as upon the occurrence of a jam, updating copy modes such as cascade movement, and updating messages and count values, the display control portion 369 receives an interface command from the job controller and analyzes the command to update the display control data 367.

The display control data 367 serves as data for controlling display for every screen, such as display screen number, display variable information in the screen, and the like. The dialog data 370 serves as a hierarchical structure data base having fundamental frames for every screen, display data for every frame, and reference addresses (addresses of the display control data 367 in which display variable information is stored) of variable data among display data. The dialog edition portion 366 reads from the dialog data 370 the fundamental frame and display data of a screen displayed on the basis of the screen number included in the display control data 367, decides display variable data corresponding to the display variable information included in the display control data 367, and edits the screen, so that the display screen is drawn and developed on the V-RAM 365.

In the job controller, the key management portion 14 serves to check whether acceptance of a logical key is enabled or not, by reference to the state table 371. If the acceptance of a logical key is enabled, the key management portion 14 settles the key information to be fed to the key control portion 375 upon condition that other key information should not be inputted for 750 msec. The key control portion 375 directs key acceptance processing to perform the updating of the copy mode 378, the mode checking, and the issuing of a copy execution command. Further, the key control portion 375 determines the machine condition and delivers the display control information to the display management portion 377 to perform display control. The copy setting information for any one of "basic copy," "applied copy," and "special copy" is set in the copy mode 378.

The display management portion 377 issues an interface command to the video controller on the basis of the processing result of the key management portion 14 or the key control portion 375 to start an interface routine (the display control portion 369). The state control portion 372 judges the state change from the key acceptance condition and the machine state information, such as the occurrence of jam or a failure, the opening of interlocking, and the like, and updates the state table 371 for key acceptance on the basis of the judgment. State data, such as job state, machine state, run state, state case, mode information and the like, are set in the state table 371. For example, states, such as "ordinary job or interrupt job" and the like, are set in the job state. States, such as initialization, progress, soft-down, soft-down pause, standby, purge standby, jam, and the like, are set in the machine state. Conditions in the aforementioned, respective states are set in the run case. The key acceptance condition is checked by these state data.

The job control portion 376 receives machine operation information after the star key is operated. Then job controller 376 issues a command for machine control on the basis of the machine operation information to perform necessary control operation to cause a copying operation to be executed for a sheet of document paper. The command control portion 373 serves to give both the state management portion 372 and the job control portion 376 the state of the receiving command transmitted from the machine body.

During execution of a job, the command control portion 373 also serves to receive a command for execution of the job control portion 376 and transmits the command to the machine body. Accordingly, when the start key is operated, the key control portion sets a command corresponding to the copy mode in a transmission buffer 380 so that a copying operation is executed while commands for the operation state of the machine are successively received by a receiving buffer 379. By reporting this command to the job control portion 376 through the command control portion 373, a command for execution of the next copy is issued whenever one copy is finished, before a command for stopping the machine is issued at termination of a predetermined number of copies.

When a command informing of the occurrence of jam is received in execution of a copying operation, the jam state is recognized by the state management portion 372 through the command control portion 373, so that the state table 371 is updated and, at the same time, an interface command for jam screen control is issued from the display management portion 377 to the video controller through the key control portion 375.

In respect to the interface command, commands related to trays, specifically related to, for example, the number, the paper size and the direction of the trays, commands related to additional devices, specifically related to, for example, the names and presence of the devices, and commands related to a second developer, specifically related to, for example, the presence and color of the developer, and the like, are used as registration commands. Further, commands related to, for example, the cascade, the set number, the binding margin and the like are used as ordinary set commands. Further, commands related to, for example, box display, coordinate display, and the like are used as edition set commands. Commands related to, for example, call numerical values, registration numerical values, and the like are used as job set commands. Commands related to, for example, ordinary message, state display, mode display, remaining toner display, collected toner display, no paper display, and the like are used as display commands. Commands related to, for example, jam, jam clear, information change, preheat, interrupt, return, change, and the like are used as mode commands. In addition, there are provided display control commands, machine operating state commands, initialize commands, diagnostic commands and the like. In the display control portion 369 of the video controller, these commands are analyzed to update the display control data 367. For example, the registration commands serve to perform initialization of each screen, the ordinary set commands serve to perform displaying of cascade set conditions and erasing of unnecessary cascades in an ordinary set screen, displaying of set count and displaying of binding margin value, and the mode change commands serve to perform displaying of every mode screen and switching on/off of LEDs (not shown).

Upon the aforementioned circumstances, the operation of the cascade keys is as follows. At the point of time a cascade key is turned off, has been pushed continuously for 750 msec, or the cascade key has been pushed for 125 msec further continuously, the key is shifted by one rank with these points of time as a turning-point if the key can be accepted. If the key cannot be accepted in its destination, one-rank skipping is made to select the next key. This operation is as follows. By moving up the cascade, a corresponding logical code is delivered to the job controller as a key receipt and then fed back to the video controller from the job controller as display data.

The exchange of screens is carried out with each condition of FIG. 33 as a turning-point. When initialization is finished after the duplicator is powered on, the "basic copy" screen is displayed if there is no instruction to shift the mode to a diagnostic mode. The "basic copy" screen can be also displayed by the operation of any one of the all clear key, the mode selection key for basic copy, and the preheat key in the preheat screen. The "applied copy" screen, the "special copy" screen, and the "review" screen can be displayed by switching the current screen by the operation of the respective mode selection keys. Only when the current screen is one of these screens can the start key be accepted to make a copying operation possible.

When the edition or job program is selected in the "special copy" screen, the current screen is switched to a screen for inputting the program. When the loading of the program is finished, the current screen is returned to the former "special copy" screen. The current screen can be shifted from these screens to an information screen by the operation of the information key and the inputting of the code thereof. The current screen can be shifted to a preheat screen by the operation of the preheat key (power saving key). In the case where a jam has occurred, a jam screen is displayed so as to be overlapped on the selection mode screen currently displayed during execution of the copying operation. When one of the aforemention screens has been displayed for a predetermined time with no key input, the current screen is shifted to a burning prevention screen by the operation of a timer. In this case, the current screen can be shifted to the former screen by key operation.

In the following, an example of processing corresponding to the operation due to the operator and the condition of the machine is described.

When the duplicator is powered on and initialized, the key management portion 374 gives the screen switching portion 368 an instruction to display the initial screen upon condition that the state table 371 is in an initial state with no key input. Receiving this instruction, the screen switching portion 368 in the video controller sets the display screen of the display control data 367 in the initial screen.

In the case where the "basic copy" screen is registered as the initial screen in the display control data 367, the dialog editor portion 366 reads the "basic copy" frame from the dialog data 370. This frame shows the addresses of the display control data 367 for every area. Accordingly, the dialog editor portion 366 reads the display control data 367 by reference to these addresses, edits them and draws the "basic copy" screen on the V-RAM 365. At the same time, the LED of "basic copy" is lit. When the mode selection key of "applied copy" or "special copy" in the keyboard is operated, the key management portion 374 checks the key acceptance condition and gives the screen switching portion 368 an instruction to display a corresponding screen in the same manner as described above. If the initial screen is registered a the completely automatic screen in the display control data 367, the completely automatic screen is displayed. This setting is made in the diagnostic mode.

When, in such screen display conditions, cascade keys are operated by the operator to update the physical key table 361, the physical key is detected by the key change detected portion 361 and converted into a logical key by the key converting portion 363. In respect to the cascade key, the conversion into the logical key varies according to the screens. Accordingly, the conversion into the logical key is carried out while the reference position of the translation table 364 is controlled by the screen information of the display control data 367. When, for example, the cascade key 19-3 in FIG. 26 is operated, the conversion occurs as follows. If the current screen is a "basic copy" screen as shown in FIG. 27(a), the key is converted into a logical key of duplex copy cascade. If the current screen is a "applied copy" screen as shown in FIG. 27(b), the key is converted into a logical key of color cascade.

The key management portion 374 judges from the state table 371 whether the key can be accepted or not. In this case, the key management portion 374 permits acceptance of the key on condition that the key should be a cascade key in the selection mode screen, so that the key is fed to the key control portion 375 and further to the state control portion 372. The key control portion 375 updates the copy mode 378 by reference to this key and, at the same time, delivers the cascade display information to the display management portion 377 in which an interface command is generated and issued to the display control portion 369. The display control portion 369 receives the interface command and updates the cascade set information of the display control data 367. Thereafter, this content is reflected in the screen by the dialog editor portion 366 as explained above. When the switching between the selection mode screens and the setting of the respective cascades are made as described above, the set conditions are displayed on the display unit and, at the same time, the copy mode 378 and the stat table 371 of the job controller are updated.

When the start key is then operated, the key control portion 375 checks the copy mode 378 and issues a corresponding copy execution command. The issuance of the copy execution command is carried out through the transmission buffer 380, so that the copy execution command is transmitted to the main CPU through the serial communication in the mode setting, an interface command for display control is generated and issued from the display management portion 377 to control messages.

With the issuance of the copy execution command as a turning point, the job control portion 376 controls the copying operation for every copy. When, for example, the machine state commands are sequentially receive by the receiving buffer 379 after the machine starts its copying operation, the commands are analyzed by the command control portion 373 which reports the analyzed commands to the state management portion 372 and the job control portion 376. The job control portion 376 receives the machine state commands sequentially and issues commands necessary for the operation of the machine for ever copy before the copying operation is finished with respect to the set number of copies. The commands are sequentially set in the transmission buffer 380 through the command control portion 373. On the other hand, the state management portion 372 updates the state table 371 according to the machine state commands. Accordingly, in this state, the acceptance of keys such as mode selection keys and cascade keys is inhibited in the key management portion 374.

When a jam occurrence command is received from the machine because of the occurrence of jam, the information related to the jam is delivered to the job control portion 376 and the state management portion 372 through the command control portion 373. As the result, the state table 371 is updated in the jam occurrence state so that the job is discontinued. Then the key control portion 375 recognizes the position of the jam and delivers the position information to the display management portion 377. On the basis of the position information, the display management portion 377 generates and issues an interface command having a jam-zone parameter subjoined thereto, for example, in accordance with a mode classification method using jam processing codes. Then the display control portion 369 processes the command and updates the display control data 367 to display a jam screen. As a result, a jam screen having a jam zone is formed on the display unit so as to be overlapped or overwritten on the original screen while the luminance of the original screen is reduced by one order of magnitude.

In respect to the machine state commands, the residual quantity of toner, the condition of the collection bottle, paper-out, the opening of interlocking and other states are recognized by the key control portion 375, so that controlling of the message area, maintenance information area, count portion, and the like is carried out through the display management portion 377.

The diagnostic mode is given by a specific operation, for example, of pushing the all clear at the same time while powering on the electric supply. Also, this mode is recognized by the key control portion 375 through the key management portion 374. Then a diagnostic command is issued through the display management portion 377 to control the diagnostic screen. Registration and setting related to the specific area of the display control data 367 are permitted in this mode, though such registration and setting are not permitted in other modes. For example, the setting as to whether the completely automatic screen is displayed or not is one of the settings permitted in the diagnostic mode.

(C) Keys/LEDs and Display Control in the Display Unit

Figure 35:
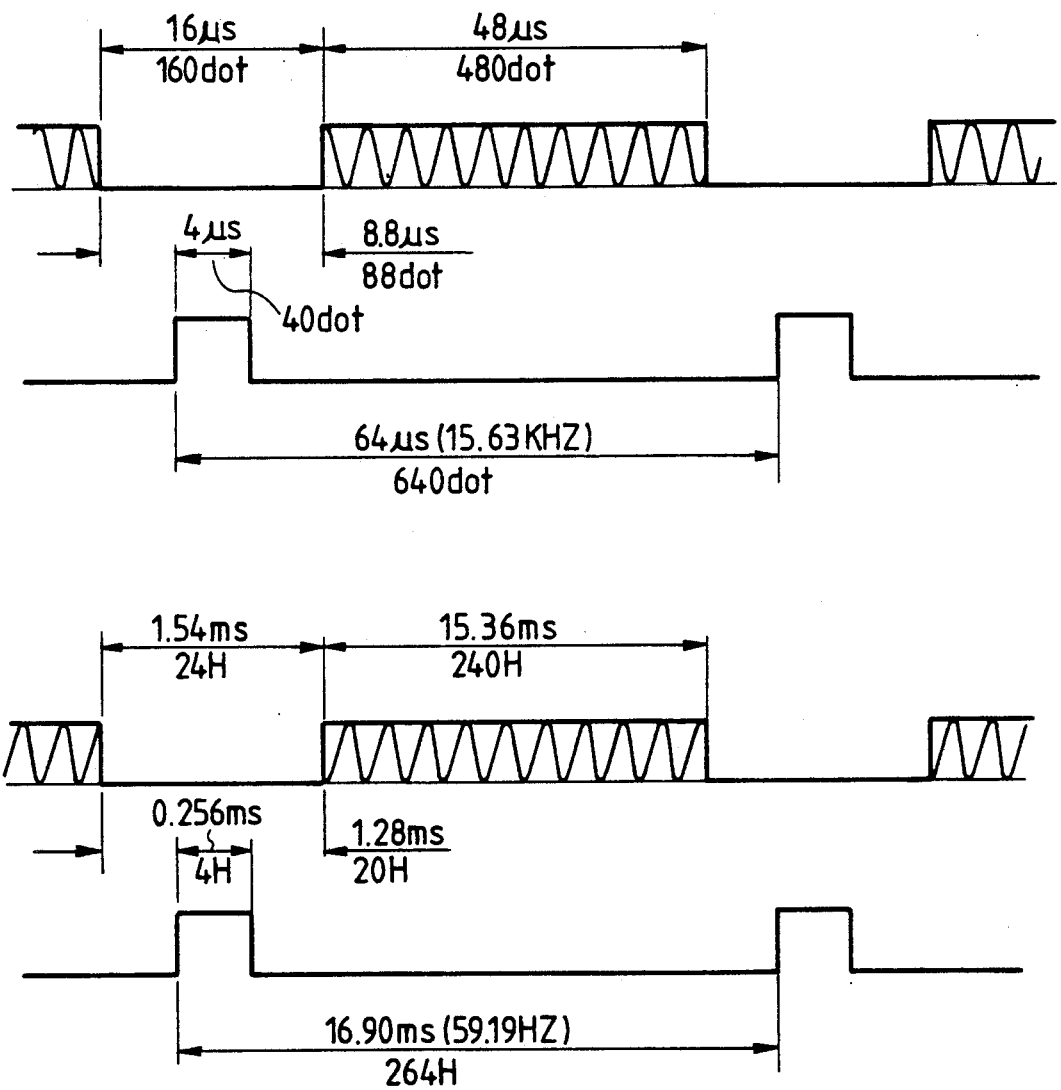
FIG. 35 is a view showing display timing.

FIG. 34(a) is a view showing an example of a set map for keyboard scanning; FIG. 34(b) is a view showing an example of a set map for LED scanning; and FIG. 35 is a view showing display timing.

As described above, the scanning time of 4.98 msec obtained by the clock frequency of 102 kHz is produced by the keyboard/display controller 336 to process the keys/LEDs. In the case of key scanning, as shown in FIG. 34(a), eight scannings of "0" to "7" form one cycle and each scanning is formed by one-byte data of "0" to "7." Similarly, the ON/OFF control of the LEDs is carried out by reference to a scanning map as shown in FIG. 34(b).

For example, the CRT display unit 301 used herein is of a type having a 9-inch size, a paper-white display color, and is subjected to nonglare surface treating. Assuming that a 480×240 matrix of dots having a pitch 0.33 mm×0.46 mm is arranged in a display area of 160 mm×110 mm on a screen of this size with the dot arrangement of a character port defined as 8×16, then the number of character ports is established to be 60×15. Further assuming that Kanjis and Kanas are respectively expressed by a matrix of 16 dots×16 dots and alphabetical, numeric, and symbolic characters are respectively expressed by matrices of 8 dots×16 dots, then Kanjis and Kanas can be respectively formed by use of two character ports so that Kanjis/Kanas of 30×15 can be displayed. On the other hand, four tone steps of "ordinary intensity," "gray 1," "gray 2" and "black" can be used for every tile, so that display of "reverse," "blinking" and the like can be made. The input signal timing in such display as follows. Assuming that the dot frequency fa is 10 MHz (total dot number: 480×240). video data are processed for 48 μs with the horizontal synchronizing signal cycle of 64 μs and, at the same time, the video data are processed for 15.36 μs with the vertical synchronizing signal cycle of 16.90 μs.

The clock generator circuit 353 generates a clock signal that sets the frequency of the dots sent out from the parallel-to-serial converting circuit 355. The clock signal is frequency-divided by the counter 354 to generate the read-out cycle of the parallel dot data read from the character generator 342. Accordingly, the dot data having a plurality of bits from the character generator 342 are inputted into the parallel-to-serial converting circuit 355 in accordance with the output clock of the counter 354 and are then converted into serial data to be delivered to an attribute adding circuit 356. The attribute adding circuit 356 receives a blanking signal from the CRT controller 335 and controls the video signal corresponding to attribute data in a display period. A one-shot circuit 348 generates an interrupt signal for the U/I CPU 46 from a vertical synchronizing blanking signal, which is included in the blanking signal sent out from the CRT controller 335.

Figure 37:
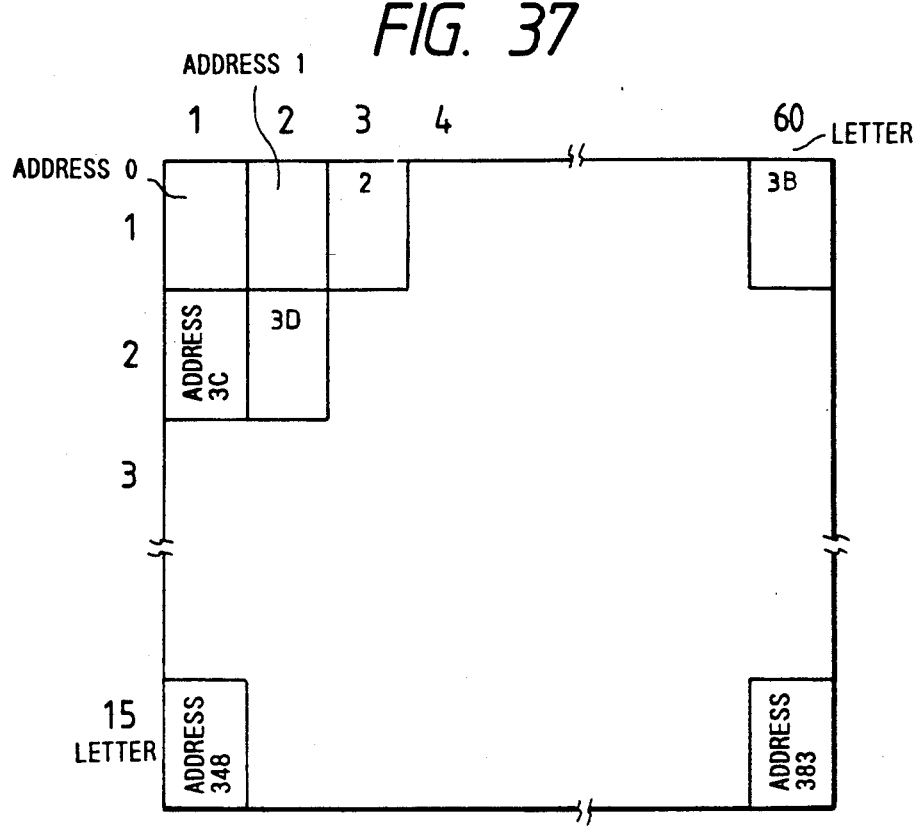
FIG. 37 is a view showing the correspondence between addresses in the first V-RAM and positions on the CRT display.
Figure 38:
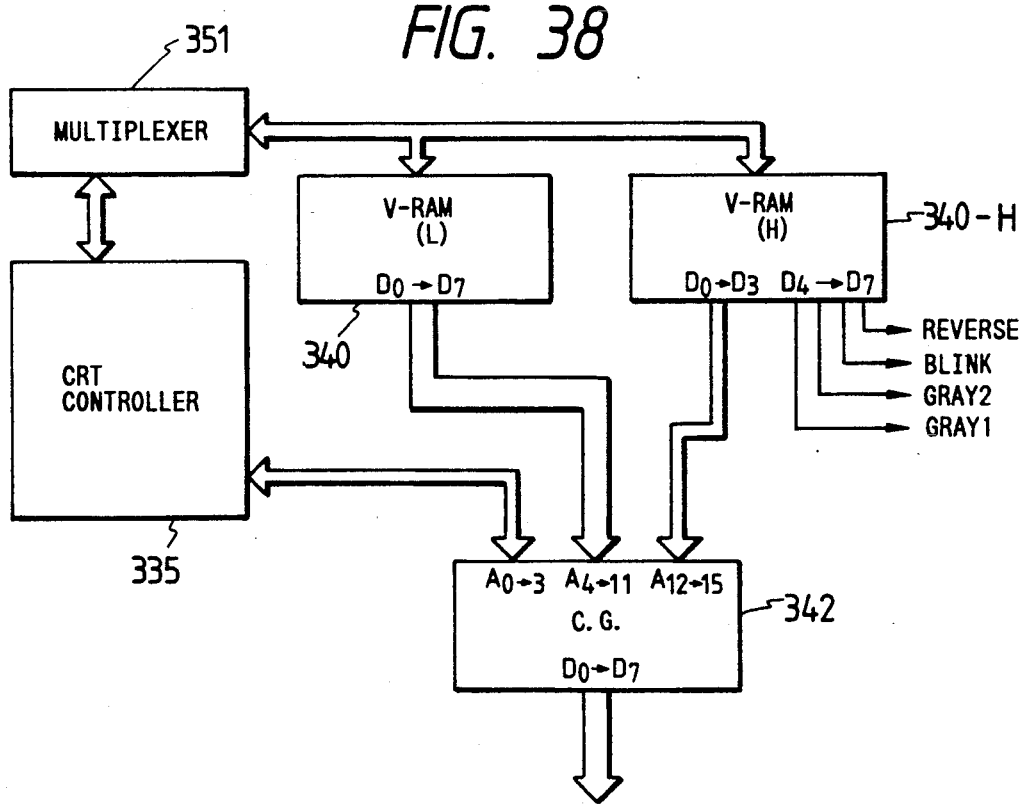
FIG. 38 is a diagram for explaining a circuit for reading out a character generator.
Figure 39:
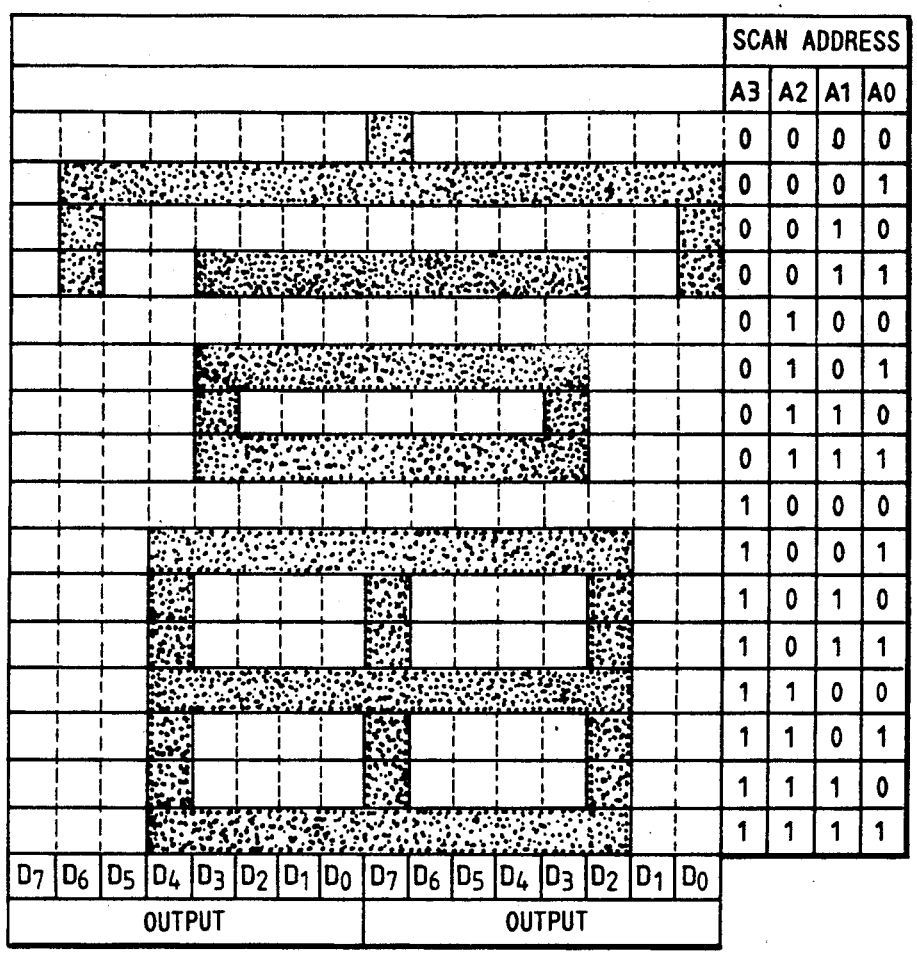
FIG. 39 is a view showing an example of the correspondence between dot pattern/data and scanning addresses.

FIG. 36 is a view showing an example of the address correspondence in V-RAMs; FIG. 37 is a view showing the correspondence between addresses in the V-RAMS and positions on the CRT display; FIG. 38 is a diagram of circuit for reading out a character generator; and FIG. 39 is a view showing an example of the correspondence between dot pattern/data and scanning address.

The video data written in the V-RAM 340 are composed of 16 bits per one character port. Of these bits, 12 bits are used for expressing a character code and the remaining 4 bits is used for expressing an attribute. Therefore, the V-RAM 340 is arranged so that the lower 8 bits of the character code are written in RAM-L and the upper 4 bits of the character code and the 4 bits of the attribute are written in RAM-H, corresponding to the display address on the CRT screen. Further, the V-RAM 340 has a capacity for storing these bits.

The addresses in the V-RAM 340 are controlled by the U/I CPU 46 and the CRT controller 335 respectively independently as shown in FIG. 36. The writing of the video data in the V-RAM 340 is made through the U/I CPU 46. On the other hand, the displaying of the video data onto the CRT display unit 301 is made through the CRT controller 335. Character generator codes and attributes are respectively written in the addresses "0," "1," ... Accordingly, the CRT controller 335 reads the data "D0→D7" (L-side), "D0→D4" (H-side) in the corresponding address in synchronization with the display timing by the circuit as shown in FIG. 38 and, at the same time, generates a raster address "RA" to have access to the character generator to send out the data "D0→D7" of the scanning line of each character port to the parallel-to-serial converting circuit 355. For example, the dot pattern of Kanji " " can be expressed as shown in FIG. 39. Because the Kanji is formed by two character ports as stated preliminarily, the output "D0→D7" forming the left half of the Kanji and the output "D0→D7" forming the right half of the Kanji are sent out successively from the character generator 341 corresponding to the scanning address "A0→A3".

Figure 40:
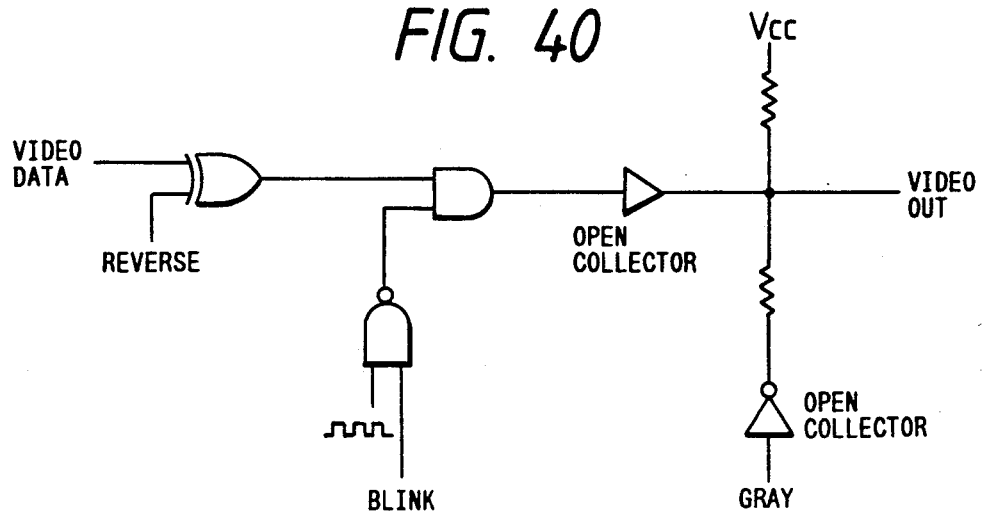
FIG. 40 is a diagram showing an example of the arrangement of a video signal control circuit in accordance with attribute data.

The attribute of 4 bits is read corresponding to the output of the character ports. FIG. 40 is a diagram showing an example of the arrangement of a video signal control circuit in accordance with attribute data. As shown in FIG. 40, the attribute is controlled as follows. The video data and the attribute data of reverse signal are logically processed by an EXOR circuit. In the case where the reverse signal is on (high level), the video data is reversed. Further, by processing the output of the EXOR circuit by an AND circuit, the video signal is so controlled that in the case where the blinking signal is on, the video signal is alternately switched on and off by the clock, and the signal level is changed by the gray signal.

As explained above, for the selection mode screen the background is changed for the purpose of discriminating the division areas or discriminating noticeable areas such as a cascade position and the like. Gray display and reverse display are used for these purposes. Furthermore, as shown in FIG. 28, the display form control of the background is caused by the dot pattern of the character port. In short, the display form of the background in the display areas of "Set document," "Set count," and "Start," and the display form of the background in the outside thereof are discriminated from each other by changing the dot density of the character port.

The video signal displayed on the CRT screen as described above is read from any one of the first and second V-RAMs selected by changing the start address of the CRT controller 335 dynamically. Therefore, an input port for both a blanking start signal and a display period signal and an output port for a display-enabled signal are respectively provided for the U/I CPU 46. In the U/I CPU 46, an interrupt is made with the blanking start signal at the falling edge at the start of the blanking period and, further, the CRT display condition is recognized with the display period signal. In addition, an instruction to permit display on the CRT and an instruction to forbid display on the CRT are issued with the display—enable signal.

(III-5) Display of the set state of multiple screens

Figure 41:
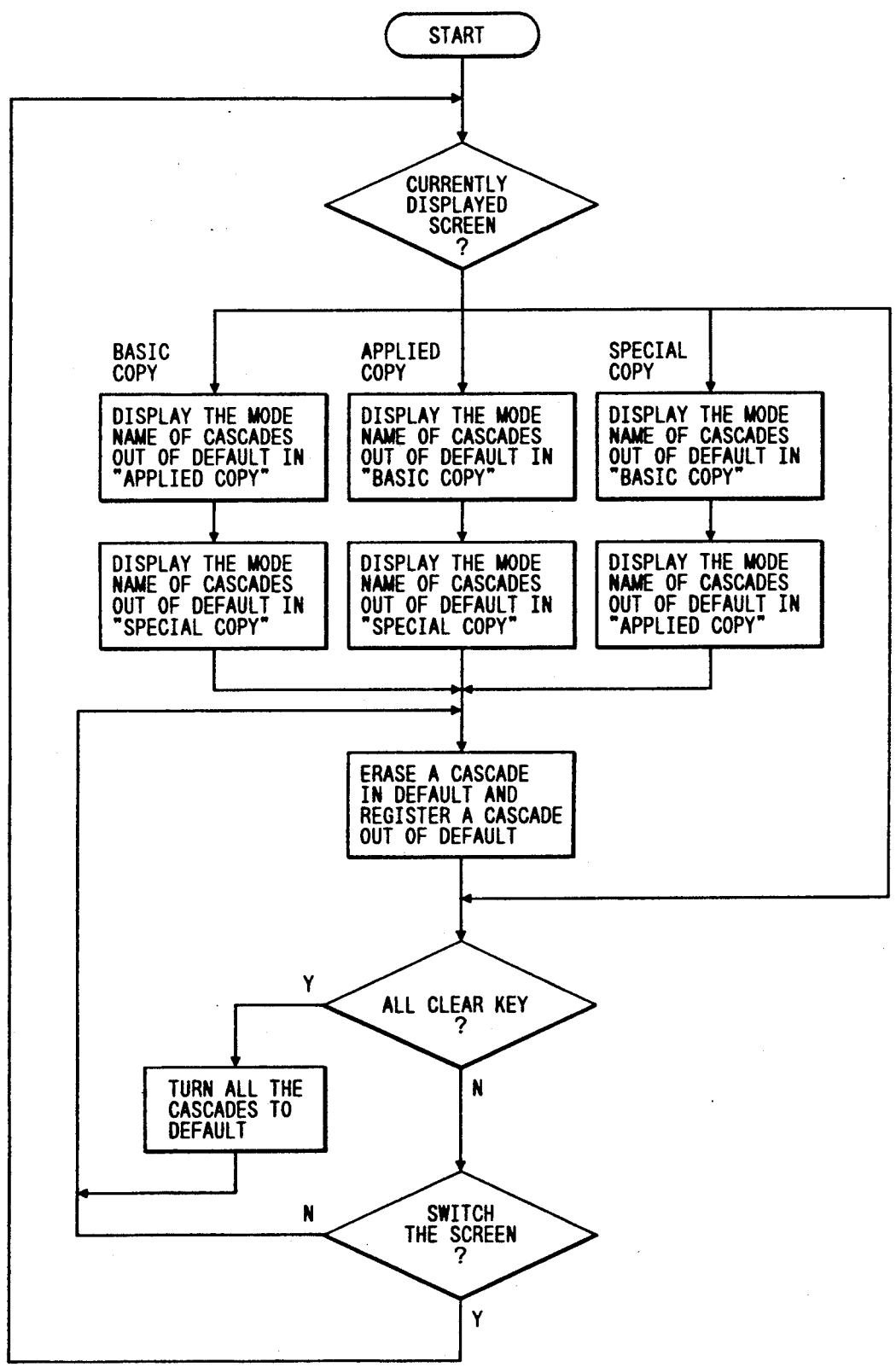
FIG. 41 is a flowchart for explaining a flow of the operation for changing the set condition display area.
Figure 42:
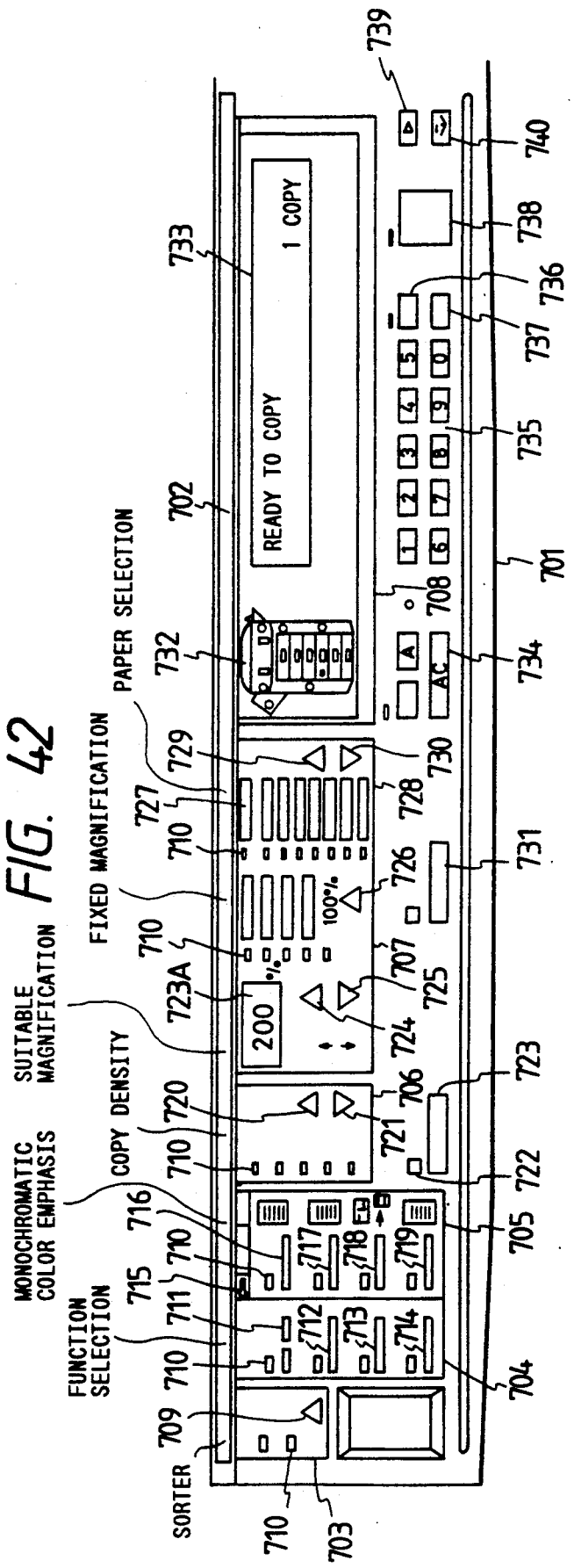
FIG. 42 is a view showing an example of a conventional user interface using a console panel.

FIG. 41 is a flowchart for explaining the flow of the operation for changing the set state display area.

In the ordinary function selecting procedure, when the power switch is turned on, the initial screen (completely automatic screen) as shown in FIG. 28(a) is displayed during the period of waiting for the next key input to judge the contents of the operation thereof. When any key of the ten key keypad 307 is operated here, the machine makes a decision that the key input is for setting the number of copies in an entirely automatic operation, so that the copy mode and its execution condition are transmitted to the main CPU 41 by the operation of the start key. On the basis of the copy mode and its execution condition, the main CPU controls the start of the copying operation to start the copying operation with the set number of copies.

When a mode selection key (308 to 310), not a key of the ten key keypad 307, is operated in the initial screen, a selection mode screen corresponding to the key is displayed on the basis of judgment as to whether the key is the "basic copy" mode selection key 310, the "applied copy" mode selection key 309, or the "special copy" mode selection key 308. Then, before completion of the setting of each cascade in the corresponding mode screen, the cascade setting operation is made by the cascade keys 319-1 to 319-5, while judging whether another mode selection key is continuously operated or not. If another mode is selected, the procedure of mode selection and cascade setting is continued in the same manner as described above. If any key of the ten key keypad 307 is operated without mode selection, the machine makes a decision that the key input is for setting the number of copies, so that the copy mode and its execution condition are transmitted to the main CPU 41 by the operation of the start key. On the basis of the copy mode and its execution condition the main CPU 41 controls the start of the copying operation, so that the copying operation with the set number of copies is started.

In the aforementioned function selection and setting procedure, the contents of the set state display area in each selection mode screen can be rewritten through the following procedure.

First, the currently displayed screen is identified. If the screen is the "basic copy" screen, the mode names "applied copy" and "special copy" are displayed in the set state display area. If the screen is the "applied copy" screen, the mode names "basic copy" and "special copy" are displayed in the set state display area. If the screen is the "special copy" screen, the mode names "basic copy" and "applied copy" are displayed in the set state display area.

If the set state is then changed by the operation of the cascade keys on the currently displayed screen, a cascade in default is erased and then a cascade out of default is registered with respect to a corresponding set state of another mode. On the other hand, when the all clear key is operated, all the cascades set to the proper default values.

It is to be understood that the present invention is not limited to the aforementioned embodiment and that various changes may be made. For example, though the aforementioned embodiment has shown the case where a CRT display unit is used in the user interface, the invention is applicable to the case where other display units such as a plasma display, an EL display, a liquid crystal display, a fluorescence display tube, and the like may be used and further to the case where a touch panel is attached to the machine body. Although the embodiment has shown the case where the display unit is located in the back right corner, the invention is applicable to the case where it may be located in the back left corner. Although the embodiment has shown the case where accentuated display is made by controlling the display form of the CRT display unit, the invention is applicable to the case where a color display may be made by use of a color display unit. Although the embodiment has shown the case where the selection mode screen is divided into the message area, the set state display area, and the selection area in downward order, it is a matter of course that the selection area may be allocated to the middle with the message area and the set state display area being allocated to the sides thereof. Further, though the embodiment has shown the case where the mode selection keys are arranged corresponding to the number of screens, the invention is applicable to the case where only one mode selection key may be provided to perform switching between screens.

As clear from the above description, in accordance with the present invention, a plurality of screens for separately selecting multiple functions of a recording apparatus such as a duplicator are formed, but an area for briefly displaying the set conditions of other screens is provided in each screen. Accordingly, setting can be made easily with all of the set conditions, inclusive of the set conditions of the other screens, being continuously checked, though the operation related to the set conditions may be made with the screens switched one by one. As a result, the number of setting errors are reduced and an improvement in setting operation can be attained.

Further, a review screen for displaying the whole set condition is provided so that the current screen can be freely switched to the review screen. Accordingly, the whole set condition can be checked on one screen without switching among three screens. Further, by displaying the set condition, one screen can be divided easily to form a multiple screen. As a result, sufficient display space can be provided for displaying respective function selection information, so that the display of function selection information is easy to understand and use can be made of icons (pictorial symbols), large characters, pop-up screens, and the like, for better readability and emphasis.

Moreover, by dividing the selection mode into a plurality of screens for the purpose of making the display more simple it is also possible to use a compact CRT, e.g., a 9 inch display. As a result, an inexpensive and compact user interface can be provided.

Furthermore when one of the multiple screens obtained by division is displayed, an area for displaying the set conditions of other screens can be provided in the screen to display necessary information to make it possible to grasp all of the set conditions or the set conditions of the respective screens can be displayed on one screen in the form of a table. Accordingly, the set conditions can be checked at a glance, so that improvement in operation property and reduction of copy errors can be attained. Because the selection of functions and the setting of execution conditions are carried out for every screen obtained by division while the screen is displayed selectively, the operation input for every screen can be made by arranging keys necessary for the operation input for one screen. As a result, the keyboard can be simplified in construction. In addition, by changing the display form corresponding to whether the set position is in default or not, the set conditions out of default can be checked easily.

What is claimed is:

1. A system for controlling a display unit displaying one of a plurality of screens, the display unit adapted for use as an operator interface in a recording apparatus, comprising:

means for selecting one of a plurality of function modes;

display control means for controlling the display unit to selectively display one of said plurality of screens, wherein said plurality of screens includes a selection-mode screen corresponding to each one of said plurality of function modes, each corresponding selection-mode screen including:

a set condition area, and a selection area having a plurality of function settings, said plurality of function settings corresponding to a selected function mode and establishing operating conditions for the recording apparatus;

means proximate said display unit for defining a state for each one of said plurality of function settings; and screen control means for controlling the display unit to display in said selection area the state of each one of said plurality of corresponding to said selected one of said plurality of function modes, and for controlling the display unit to display in said set condition area the state of function settings for at least another one of said plurality of function modes.

2. The system according to claim 1, wherein each function setting of said plurality of function settings includes a default value and at least one selected value.

3. The system according to claim 2, wherein said display control means controls said display unit to display only said at least one selected values for each respective function settings.

4. The system according to claim 1, wherein said display unit is a cathode ray tube.

5. The system according to claim 4, wherein said cathode ray tube is mounted at the eye level of the operator.

6. The system according to claim 4, wherein each of said corresponding selection-mode screen further includes a message area, and wherein said screen control means controls said display unit to display operator messages in said message area.

7. The system according to claim 5, wherein said cathode ray tube is adapted to be adjustable by the operator to vary a view angle of the cathode ray tube.

8. The system according to claim 6, wherein said screen control unit controls said display unit to display said operator messages with a contrasting peripheral border.

9. The system according to claim 6, wherein said operator messages are displayed having a visual contrast between background and character data to improve the readability of the messages.

10. The system according to claim 1, wherein the recording apparatus is a photocopier.

11. The system according to claim 1, wherein said selecting means comprises a column of mode-selection keys located lateral to the display unit, and wherein said defining means comprises a row of cascade keys located vertical to the display unit.

12. The system according to claim 11, wherein said plurality of function settings corresponding to said selected function mode are displayed in said selection mode area as columnar alternatives above said row of cascade keys.

13. A system for controlling a display unit displaying one of a plurality of screens, the display unit adapted for use as an operator interface in a photocopier, comprising:

means for selecting one of a plurality of copy modes;

display control means for controlling the display unit to selectively display one of said plurality of screens, wherein said plurality of screens includes a selection-mode screen corresponding to each one of said plurality of copy modes, each corresponding selection-mode screen including:

a set condition area, and a selection area having a plurality of function settings, said plurality of function settings corresponding to a selected copy mode and establishing operating conditions for the photocopier;

means proximate said display unit for defining a state for each one of said plurality of function settings; and screen control means for controlling the display unit to display in said selection area the state of each one of said plurality of function settings corresponding to said selected one of said plurality of copy modes, and for controlling the display unit to display in said set condition area the state of function settings for at least another one of said plurality of copy modes.

14. The system according to claim 13, wherein each function setting of said plurality of function settings includes a default value and at least one selected value.

15. The system according to claim 13, wherein said display unit is a cathode ray tube.

16. The system according to claim 15, wherein said cathode ray tube is mounted at the eye level of the operator.

17. The system according to claim 13, wherein each of said corresponding selection-mode screen further includes a message area, and wherein said screen control means controls said display unit to display operator messages in said message area.

* * * * *

UNITED STATES PATENT AND TRADEMARK OFFICE
CERTIFICATE OF CORRECTION

PATENT NO. : 5,182,796
DATED : January 26, 1993
INVENTOR(S) : Yoshinaru Shibayama et al.

It is certified that error appears in the above-identified patent and that said Letters Patent is hereby corrected as shown below:

Title Page:
    Item [57] Abstract, line 6, after "comprising" delete --,--.

Claim 3, column 47, line 29, change "values" to --value--.

Claim 6, column 47, line 36, delete "of".

Claim 17, column 48, line 49, delete "of".

Signed and Sealed this

Fifteenth Day of March, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,182,796
DATED : January 26, 1993
INVENTOR(S) : Yoshinaru Shibayama et al.

It is certified that error appears in the above-indentified patent and that said Letters Patent is hereby corrected as shown below:

Claim 3, column 47, line 30, change "settings" to --setting--.

Signed and Sealed this

Fourth Day of October, 1994

BRUCE LEHMAN

Attest:

Attesting Officer

Commissioner of Patents and Trademarks